(12) United States Patent
Xu et al.

(10) Patent No.: US 11,198,178 B2
(45) Date of Patent: Dec. 14, 2021

(54) METAL 3D PRINTING METHOD AND METALLIC 3D PRINTED MATERIALS

(71) Applicant: POLYVALOR, LIMITED PARTNERSHIP, Montreal (CA)

(72) Inventors: Chao Xu, Montreal (CA); Daniel Therriault, St-Laurent (CA); Louis Laberge Lebel, Montreal (CA); Gilles L'Esperance, Candiac (CA); Arslane Bouchemit, Montreal (CA)

(73) Assignee: POLYVALOR, LIMITED PARTNERSHIP

(*) Notice: Subject to any disclaimer, the term of this patent is extended or adjusted under 35 U.S.C. 154(b) by 440 days.

(21) Appl. No.: 16/103,958

(22) Filed: Aug. 16, 2018

(65) Prior Publication Data
US 2019/0054536 A1 Feb. 21, 2019

Related U.S. Application Data

(60) Provisional application No. 62/546,277, filed on Aug. 16, 2017.

(51) Int. Cl.
*B22F 3/22* (2006.01)
*B22F 3/10* (2006.01)
*B33Y 70/00* (2020.01)
*B33Y 10/00* (2015.01)
*B22F 10/10* (2021.01)

(52) U.S. Cl.
CPC ............ *B22F 3/227* (2013.01); *B22F 3/1021* (2013.01); *B22F 10/10* (2021.01); *B33Y 10/00* (2014.12); *B33Y 70/00* (2014.12); *B22F 2999/00* (2013.01)

(58) Field of Classification Search
CPC ........ B22F 3/227; B22F 10/10; B22F 3/1021; B22F 2999/00; B22F 10/00; B33Y 70/00; B33Y 10/00
See application file for complete search history.

(56) References Cited

U.S. PATENT DOCUMENTS

| | | | | |
|---|---|---|---|---|
| 2010/0096596 A1* | 4/2010 | Lewis | ................... | C09D 11/10 252/500 |
| 2016/0288414 A1* | 10/2016 | Ozbolat | .............. | A61F 2/30942 |
| 2017/0081534 A1* | 3/2017 | Shah | ................... | B29C 64/165 |

OTHER PUBLICATIONS

Ahn, B. Y., Duoss, E. B., Motala, M. J., Guo, X., Park, S. I., Xiong, Y., Yoon, J., Nuzzo, R. G., Rogers, J. A., Lewis, J. A. "Omnidirectional Printing of Flexible, Stretchable, and Spanning Silver Microelectrodes", Science, 2009, 323(5921), 1590-1593.
Ahn, B. Y., Shoji, D., Hansen, C. J., Hong, E., Dunand, D. C., Lewis, J. A. "Printed Origami Structures", Adv. Mater., 2010, 22(20), 2251-2254.

(Continued)

*Primary Examiner* — Rebecca Janssen
(74) *Attorney, Agent, or Firm* — Lavery, De Billy, LLP; Isabelle Pelletier

(57) ABSTRACT

A metallic ink for solvent-cast 3D printing, the ink comprising a solution or a gel of a polymer in a volatile solvent, and heat-sinterable metallic particles dispersed in the solution or gel, wherein the particles are present in a particles:polymer weight ratio of more than about 85:15, is provided. There is also provided a method of manufacturing this ink and a method of manufacturing a solvent-cast metallic 3D printed material using this ink.

17 Claims, 33 Drawing Sheets

(56) References Cited

OTHER PUBLICATIONS

Basalah, A., Shanjani, Y., Esmaeili, S., Toyserkani, E. "Characterizations of additive manufactured porous titanium implants", J. Biomed Mater Res., Part B, 2012, 100, 1970-1979.

Beaulieu, P. Ph.D Thesis, "Developpement de nouvelles poudres d'acier a outils pour des applications de resistance a l'usure a haute temperature", Polytechnique Montreal, 2012.

Bernasconi, R., Cuneo, F., Carrara, E., Chatzipirpiridis, G., Hoop, M., Chen, X., Nelson, B. J., Pane, S., Credi, C., Levi, M., Magagnin, L. "Hard-magnetic cell microscaffolds from electroless coated 3D printed architectures", Mater. Horiz., 2018, 5, 699-707.

Bodkhe, S., Turcot, G., Gosselin, F. P., Therriault, D. "One-Step Solvent Evaporation-Assisted 3D Printing of Piezoelectric PVDF Nanocomposite Structures",ACS Appl. Mater. Interfaces, 2017, DOI: 10.1021/acsami.7b04095.

Chen, I. W., Wang, X. H. "Sintering dense nanocrystalline ceramics without final-stage grain growth", Nature, 2000, 404(6774), 168-171.

Chizari, K., Daoud, M. A., Ravindran, A. R., Therriault, D. "3D Printing of Highly Conductive Nanocomposites for the Functional Optimization of Liquid Sensors", Small, 2016, 12(44), 6076 6082.

Chou, R., Milligan, J., Paliwal, M., Brochu, M. "Additive manufacturing of Al-12Si alloy via pulsed selective laser melting", JOM, 2015, 67, 590-596.

Compton, B. G., Lewis, J. A. "3D-Printing of Lightweight Cellular Composites",Adv. Mater., 2014, 26(34), 5930-5935.

Dadbakhsh, S., Speirs, M., Van, H. J., Kruth, J. P. "Laser additive manufacturing of bulk and porous shape-memory NiTi alloys: From processes to potential biomedical applications", MRS Bull., 2016, 41(10), 765-774.

Degarmo, E. P., Black, J. T., Kohser, R. A., Klamecki, B. E. "Materials and process in manufacturing". 9th Ed, John Wiley and; Sons, Inc., 2003.

Dewidar, M. M., Dalgarno, K. W., Wright, C. S. "Processing conditions and mechanical properties of highspeed steel parts fabricated using direct selective laser sintering", Proc. Inst. Mech. Eng., Part B, 2003, 217(12), 1651-1663.

Dewidar, M. M., Khalil, K. A., Lim, J. K. "Processing and mechanical properties of porous 3 16L stainless steel for biomedical applications", Trans. Nonferrous Met. Soc. China, 2007, 17(3), 468-473.

Elahinia, M., Moghaddam, N. S., Andani, M. T., Amerinatanzi, A., Bimber, B. A., Hamilton, R. F. "Fabrication of NiTi through additive manufacturing: A review", Prog. Mater Sci., 2016, 83, 630-663.

Farahani, R. D., Dube, M., Therriault, D. "Three-dimensional printing of multifunctional nanocomposites manufacturing techniques and applications", Adv. Mater., 2016, 28, 5794-5821.

Francis, L. Aerial view of the Montreal's Olympic stadium, http://francislepine.photoshelter.com/image/100005iyrD3WYZ28, (accessed May 2017).

Gong, H., Rafi, K., Gu, H., Ram, G. D. J., Starr, T., Stucker, B. "Influence of defects on mechanical properties of Ti—6Al-4 V components produced by selective laser melting and electron beam melting", Mater. Des., 2015, 86, 545-554.

Gu, D. D., Meiners, W., Wissenbach, K., Poprawe, R. "Laser additive manufacturing of metallic components materials, processes and mechanisms", Int. Mater. Rev., 2012, 57(3), 133-164.

Gu, D., Hagedorn, Y. C., W. Meiners, Y. C., Meng, G., Batista, R. J. S., Wissenbach, K., Poprawe, R. "Densification behavior, microstructure evolution, and wear performance of selective laser melting processed commercially pure titanium", Acta Mater., 2012, 60(9), 3849-3860.

Guo, S. Z., Gosselin, F., Guerin, N., Lanouette, A. M., Heuzey, M. C., Therriault, D. "Solvent-Cast Three-Dimensional Printing of Multifunctional Microsystems", Small, 2013, 9(24), 4118-4122.

Guo, S. Z., Heuzey, M. C., Therriault, D. "2GUO, S. Z., Heuzey, M. C., Therriault, D. Langmuir, 2014, 30 (4), 1142-1150.", Langmuir, 2014, 30(4), 1142-1150.

Hong, D., Chou, D. T., Velikokhatnyi, O. I., Roy, A., Lee, B., Swink, I., Issaev, I., Kuhn, H. A., Kumta, P. N. "Binder-jetting 3D printing and alloy development of new biodegradable Fe—Mn—Ca/Mg alloys", Acta Biomater., 2016, 45, 375-386.

Hong, E., Ahn, B. Y., Shoji, D., Lewis, J. A., Dunand, D. C. "Microstructure and Mechanical Properties of Reticulated Titanium Scrolls", Adv. Eng. Mater., 2011, 13(12), 1122-1127.

Hong, S., Yeo, J., Kim, G., Kim, D., Lee, H., Kwon, J., Lee, H., Lee, P. Ko, S. H. "Nonvacuum, Maskless Fabrication of a Flexible Metal Grid Transparent Conductor by Low-Temperature Selective Laser Sintering of Nanoparticle Ink", ACS Nano, 2013, 7(6), 5024-5031.

Hu, J., Yu, M. F. "Meniscus-Confined Three-Dimensional Electrodeposition for Direct Writing of Wire Bonds", Science, 2010, 329(5989), 313-316.

Hyun, W. J., Lim, S., Ahn, B. Y., Lewis, J. A., Frisbie, C. D., Francis, L. F. "Screen Printing of Highly Loaded Silver Inks on Plastic Substrates Using Silicon Stencils", ACS Appl. Mater. Interfaces, 2015, 7(23), 12619-12624.

Jakus, A. E., Taylor, S. L., Geisendorfer, N. R., Dunand, D. C., Shah, R. N. "Metallic architectures from 3D-printed powder-based liquid inks", Adv. Funct. Mater., 2015, 25, 6985-6995.

Kempen, K., Yasa, E., Thijs, L., Kruth, J. P., Van Humbeeck, "Microstructure and mechanical properties of Selective Laser Melted 18Ni-300 steel.", J. Phys. Procedia, 2011, 12, 255-263.

Ladd, C., So, J. H., Muth, J., Dickey, M. D. "3D Printing of Free Standing Liquid Metal Microstructures", Adv Mater, 2013, 25(36), 5081-5085.

Lebel, L. L., Aissa, B., Khakani, M. A. E., Therriault, D. "Ultraviolet-Assisted Direct-Write Fabrication of Carbon Nanotube/Polymer Nanocomposite Microcoils", Adv. Mater., 2010, 22(5), 592-596.

Lessing, J., Glavan, A. C., Walker, S. B., Keplinger, C., Lewis, J. A., Whitesides, G. M. "Inkjet Printing of Conductive Inks with High Lateral Resolution on Omniphobic "R F Paper" for Paper-Based Electronics and MEMS", Adv. Mater., 2014, 26(27), 4677-4682.

Lewis, J. A., Gratson, G. M. "Direct writing in three dimensions", Mater. Today, 2004, 7(7), 32-39.

Martin, J. H., Yahata, B. D., Hundley, J. M., Mayer, J. A., Schaedler, T. A., Pollock, T. M. "3D printing of high-strength aluminium alloys", Nature, 2017, 549, 365-369.

Mendoza-Sanchez, B. M., Gogotsi, Y. "Synthesis of Two-Dimensional Materials for Capacitive Energy Storage", Adv. Mater, 2016, 28, 6104-6135.

Mohammed, M. G., Kramer, R. "All-Printed Flexible and Stretchable Electronics", Adv. Mater., 2017, 29(19), DOI: 10.1002/adma. 201604965.

Olakanmi, E. O., Cochrane, R. F., Dalgarno, K. W. "A review on selective laser sintering/melting (SLS/SLM) of aluminium alloy powders: Processing, microstructure, and properties", Prog. Mater. Sci., 2015, 74, 401-477.

Peng, E., Wei, X., Herng, T. S., Garbe, Yu, D., Ding, J. "Ferrite-based soft and hard magnetic structures by extrusion free-forming", RSC Adv., 2017, 7, 27128-27138.

Peniche-Covas, C., Arguelles-Monal, W., Roman, J. S. "A kinetic study of the thermal degradation of chitosan and a mercaptan derivative of chitosan", Polym. Degrad. Stab., 1993, 39, 21-28.

Postiglione, G., Natale, G., Griffini, G., Levi, M., Turri, S. "Conductive 3D microstructures by direct 3D printing of polymer/carbon nanotube nanocomposites via liquid deposition modeling", Composites, Part A, 2015, 76, 110-114.

Rim, Y. S., Bae, S. H., Chen, H., Marco, N. D., Yang, Y. "Recent progress in materials and devices toward printable and flexible sensors", Adv. Mater., 2016, 28, 4415-4440.

Seyda, V., Kaufmann, N., Emmelmann, C. "Investigation of aging processes of Ti—6Al—4V powder material in laser melting", Phys. Procedia, 2012, 39, 425-431.

Skylar-Scott, M. A., Gunasekaran, S., Lewis, J. A. "Laser-assisted direct ink writing of planar and 3D metal architectures", Proc. Natl. Acad Sci., 2016, 113, 6137-6142.

Therriault, D., Shepherd, R. F., White, S. R., Lewis, J. A. "Fugitive Inks for Direct-Write Assembly of Three-Dimensional Microvascular Networks", Adv. Mater., 2005, 17(4), 395-399.

Therriault, D., White, S. R., Lewis, J. A. "Chaotic mixing in three-dimensional microvascular networks fabricated byd irect-write assembly", Nat. Mater., 2003, 2(4), 265-271.

(56) References Cited

OTHER PUBLICATIONS

Thijs, L., Kempen, K., Kruth, J. P., Van Humbeeck, J. "Fine-structured aluminium products with controllable texture by selective laser melting of pre-alloyed AlSi10Mg powder", Acta Mater., 2013, 61(5), 1809-1819.

Thijs, L., Verhaeghe, F., Craeghs, T., Van Humbeeck, J., Kruth, J. P. "A study of the microstructural evolution during selective laser melting of Ti—6Al—4V", Acta Mater., 2010, 58(9), 3303-3312.

Van Bael, S., Chai, Y. C., Truscello, S., Moesen, M., Kerckhofs, G., Van Oosterwyck, H., Kruth, J. P., Schrooten, J. "The effect of pore geometry on the in vitro biological behavior of human periosteum-derived cells seeded on selective laser-melted Ti6Al4V bone scaffolds", Acta Biomater., 2012, 8(7), 2824-2834.

Wang, X., Xu, S., Zhou, S., Xu, W., Leary, M., Choong, P., Qian, M., Brandt, M., Xie, Y. M. "Topological design and additive manufacturing of porous metals for bone scaffolds and orthopaedic implants: a review", Biomaterials, 2016, 83, 127-141.

Winey, K. I., Vaia, R. A., "Polymer Nanocomposites", MRS bull., 2007, 32(04), 314-322.

Wu, Q., Maire, M., Lerouge, S., Therriault, D., Heuzey, M. C. "3D printing of microstructured and stretchable chitosan hydrogel for guided cell growth", Adv. Biosyst.,2017, 1, 1700058.

\* cited by examiner

METAL 3D PRINTING METHOD AND METALLIC 3D PRINTED MATERIALS

CROSS REFERENCE TO RELATED APPLICATIONS

This application claims benefit, under 35 U.S.C. § 119(e), of U.S. provisional application Ser. No. 62/546,277, filed on Aug. 16, 2017.

FIELD OF THE INVENTION

The present invention relates to the 3D printing of metallic materials. More specifically, the present invention is concerned with solvent-cast 3D printing of metallic inks, followed by sintering and, optionally, metal infiltration.

BACKGROUND OF THE INVENTION

Additive manufacturing (AM) technologies, which build 3D structures layer-by-layer, is a cost-effective method for manufacturing diverse metallic structures. Metallic structures fabricated by three-dimensional (3D) printing are used in a broad range of applications such as medical applications (e.g., artificial bones), microwave applications (e.g., antennas), and microelectro-mechanical systems (MEMS, e.g., sensors, micro-electrodes, and batteries for energy storage). These applications benefit from the high mechanical, electrical and electromagnetic properties of metals and the design freedom, mass customization, and ease of use of 3D printing.

The most common commercial technologies for metals 3D printing are powder-bed approaches such as selective laser sintering/melting (SLS/SLM) and electron beam melting (EBM). In these technologies, a fine micro scale metal powder is tightly compacted to form a powder bed. A high-intensity laser (SLS/SLM) or electron beam (EBM) selectively scans the powder particles to fuse them layer-by-layer. Once completed, the fused part is removed from the powder bed and thoroughly cleaned to remove loose or partially sintered powder particles. The bonds within the produced structure can be obtained by metallic sintering (SLS) as well as metallic or binder melting (SLM and EBM). Typical materials used in these methods are titanium alloys, while a few studies reported the SLS of steel. The nature of these powder bed methods prevents the manufacturing various architectures such as enclosed and fine porous structures. Further, these high-power intensity laser systems can be expensive and a safety hazard. Indeed, these high temperature fabrication processes require costly laser systems, a large amount of powder to form the powder bed, and several operator protection setups. Moreover, the numerous heat cycles due to repeated laser strikes change the mechanical and chemical properties of the loose powder particles neighboring the structure's span. In fact, they can cause the loss of alloying elements, a dramatic change in temperature (which can lead to metallurgy defects and residual stresses), and excessive oxidation. As a result, some of the powder cannot be reused. Furthermore, the mechanical properties of the produced parts are usually limited by metallurgical defects such as porosities, cracking, oxide inclusions and loss of alloying elements.

Researchers attempted to address the shortcomings of the above powder bed processes with direct energy deposition (DED), in which a focused energy beam is utilized to fuse the metallic materials as they are being deposited. High resolution and freeform 3D metallic structures were manufactured using this technique. However, this method is compatible with only a narrow range of low melting point metals such as silver. Although the mechanical properties were not reported, given that water evaporation and the sintering of silver powders had to be accomplished within the limited time of laser scanning, the incomplete sintering might lead to poor mechanical properties of the final product. Furthermore, since this is a laser assisted process, it is suffers from the common laser induced limitations, like excessive oxidation and the loss of alloying elements. Also, while this method was used to print complex wire-type geometries, it is susceptible to oxidation and porosity, and is unable to fabricate mechanically strong and highly dense structures.

Solvent-cast 3D printing (SC-3DP) is a process, in which no laser or powder bed is required, that creates microstructures by depositing a liquid ink on a substrate, layer-by-layer, and even in freeform. The inks used for SC-3DP contain a volatile solvent that evaporates rapidly after extrusion from the deposition nozzle, leading to a rigid filamentary structure. Various ink solutions have been developed for solvent-cast 3D printing. Ink functions, such as conductivity and mechanical properties, can be modulated by adding micro- or nano-fillers including carbon nanotubes (CNTs), nano-days and metal microparticles.

The low-cost 3D printing of highly dense metallic structures featuring complex geometries still represent a significant scientific and technological challenge. There is also an increasing need for 3D printing of metallic structures in an environmentally-friendly way.

SUMMARY OF THE INVENTION

In accordance with the present invention, there is provided:
1. A metallic ink for solvent-cast 3D printing, the ink comprising:
   a solution or a gel of a polymer in a volatile solvent, and
   heat-sinterable metallic particles dispersed in the solution or gel,
   wherein the particles are present in a particles:polymer weight ratio of more than about 85:15.
2. The ink of item 1, wherein the particles are present in a carbon particles:polymer weight ratio of:
   about 86:14, about 87:13, about 88:12, about 89:11, about 90:10, about 91:9, about 92:8, about 93:7, about 94:6, or about 95:5 or more, and/or
   about 99:1, about 98:2, about 97:3, about 96:4, about 95:5, about 94:6, about 93:7, about 92:8, about 91:9, or about 90:10, or less.
3. The ink of item 1 or 2, wherein the particles are present in a carbon particles:polymer weight ratio between about 90:10 to about 99:1.
4. The ink of any one of items 1 to 3, wherein the particles are present in a carbon particles:polymer weight ratio of about 95:5 to about 99:1.
5. The ink of any one of items 1 to 4, wherein the heat-sinterable metallic particles are steel, cast iron, titanium, silver, copper, zinc, gold, platinum, aluminum, nickel, bronze, or brass particles.
6. The ink of any one of items 1 to 5, wherein the heat-sinterable metallic particles are steel particles.
7. The ink of any one of items 1 to 6, wherein the heat-sinterable metallic particles are microparticles.
8. The ink of any one of items 1 to 7, wherein the heat-sinterable metallic particles are between about 0.1 µm and about 100 µm in size.

9. The ink of any one of items 1 to 8, wherein the heat-sinterable metallic particles are between about 5 µm and about 50 µm in size.

10. The ink of any one of items 1 to 9, wherein the heat-sinterable metallic particles are spheroidal.

11. The ink of any one of items 1 to 10, wherein the heat-sinterable metallic particles are spherical.

12. The ink of any one of items 1 to 11, comprising between about 10 and about 50 w/w % of the solvent (based on the total weight of the ink).

13. The ink of any one of items 1 to 12, wherein the polymer is poly(lactic acid), polystyrene, poly(methyl acrylate), poly(methyl methacrylate), poly(n-butyl acrylate), poly(2-hydroxyethyl methacrylate), poly(glycidyl methacrylate), poly(acrylic acid), poly(N—N-dimethylacrylamide), poly(1-vinyl anthracene), poly(2-vinyl pyridine), poly(4-vinyl pyridine), poly(N-vinyl carbazole), poly(N-vinyl carbazole), poly(N-vinyl imidazole), poly(vinyl benzyl chloride), poly(4-vinyl benzoic acid), poly(vinyl acetate), polycaprolactone, poly(11-[4-(4-butylphenylazo)phenoxy]-undecyl methacrylate) (poly(AzoMA)), poly(ferrocenyldimethylsilane), polyisoprene, polybutadiene, polyisobutylene, poly propylene glycol, poly(ethylene glycol), or a polysaccharide, or a mixture thereof.

14. The ink of any one of items 1 to 13, wherein the polymer is poly(lactic acid).

15. The ink of any one of items 1 to 14, wherein the solvent is dichloromethane (DCM), chloroform (CHCl$_3$), tetrahydrofuran (THF), acetone, methanol (MeOH), ethanol (EtOH), or water.

16. The ink of any one of items 1 to 15, wherein the solvent is dichloromethane, chloroform, tetrahydrofuran, acetone, methanol, or ethanol.

17. The ink of any one of items 1 to 16, wherein the solvent is dichloromethane.

18. The ink of any one of items 1 to 13, wherein the polymer is a polysaccharide.

19. The ink of time 18, wherein the polymer is chitosan.

20. The ink of item 18 or 19, wherein the solvent is water.

21. The ink of item 20, wherein the solvent further comprises an acid or a base.

22. The ink of item 21, wherein the solvent further comprises acetic acid, lactic acid, citric acid or a mixture thereof.

23. The ink of item 22, wherein the solvent is water comprising acetic acid alone or together with lactic acid and citric acid.

24. The ink of claim 23, wherein the solvent is water comprising:
   70 vol % acetic acid alone or together with 10 vol % lactic acid and 3 wt % citric acid, or
   80 vol % acetic acid,
   the vol % being based on the total volume of the water and acids and the wt % being based on the total weight of the water and acids.

25. The ink of any one of items 1 to 24, wherein the ink further comprises one or more additive.

26. A 3D printer ink cartridge, the cartridge comprising a container having an ink outlet, the container comprising the ink of any one of any one of items 1 to 25.

27. The cartridge of item 26, wherein the cartridge is adapted to be installed on a 3D printer.

28. The cartridge of item 26 or 27, wherein the cartridge is adapted to be fitted to a nozzle for delivering the ink, so that, for ink dispensing, the ink is extruded through the ink outlet and through the nozzle.

29. The cartridge of any one of items 26 to 28, wherein the cartridge is designed so that when a pressure is applied by a 3D printer, the ink is extruded through the ink outlet 30. A method of method of manufacture of the ink of any one of items 1 to 25, the method comprising the steps of:
   a) providing a solution or a gel of the polymer in the solvent,
   b) providing heat-sinterable metallic particles in a particles:polymer weight ratio of more than about 85:15,
   c) dispersing the particles in the solution or gel of the polymer, thereby producing the ink.

31. The method of item 30, wherein step a) comprises mixing the polymer in the solvent until the polymer is dissolved or the gel is formed.

32. The method of item 30 or 31, wherein the polymer concentration of the solution or gel is:
   about 2 wt %, about 3 wt %, about 4 wt %, about 5 wt %, about 6 wt %, about 7 wt %, about 8 wt %, about 9 wt %, or about 10 wt % or more and/or
   about 30 wt %, about 35 wt %, about 20 wt %, about 15 wt %, or about 10 wt % or less, based on the total weight of the solution or gel.

33. The method of any one of items 30 to 32, wherein the polymer concentration of the solution or gel is about 20 wt %, based on the total weight of the solution or gel.

34. The method of any one of items 30 to 33, wherein the particles are dispersed by ball milling in step c).

35. The method of any one of items 30 to 34, further comprising adding solvent, or removing part of the solvent 36. The method of any one of items 30 to 35, further comprising adding one or more additives to:
   the solvent before it is used to form the solution or gel of the polymer,
   the solution or gel of the polymer, and/or
   the ink.

37. The method of item any one of items 30 to 36, further comprising the step of packaging the ink in a 3D printer ink cartridge.

38. A method of manufacturing a solvent-cast metallic 3D printed material, the method comprising the steps of:
   a) providing the metallic ink for solvent-cast 3D printing of any one of items 1 to 25,
   b) using a 3D printer, extruding the ink through a nozzle into a controlled pattern;
   c) allowing solvent evaporation, thereby producing a printed material;
   d) removing the polymer from the printed material by heating the printed material to a polymer degradation temperature or above, thereby leaving the particles arranged into the controlled pattern; and
   e) heat-sintering the particles, thereby producing the solvent-cast metallic 3D printed material.

39. The method of item 38, wherein step a) includes the method of any one of items 30 to 37.

40. The method of item 38 or 39, wherein step b) is carried out at about room temperature.

41. The method of any one of items 38 to 40, wherein step c) is partly or completely carried out at about room temperature.

42. The method of any one of items 38 to 40, wherein step c) is partly or completely carried out under a flow of air.

43. The method of any one of items 38 to 41, wherein steps d) and e) are performed in a single heat treatment.

44. The method of item 42, wherein the heat treatment comprises increasing the temperature to a sintering temperature and then holding the temperature at the sintering temperature.
45. The method of item 43 or 44, wherein a heating rate up to a temperature T between:
    about the polymer degradation temperature and
    up to about 100'C above the polymer degradation temperature,
    is lower than a heating rate from the temperature T to the sintering temperature.
46. The method of item 45, wherein the heating rate up to the temperature T is from about 1 to about 5° C./min.
47. The method of item 45 or 3816 wherein the heating rate from the temperature T to the sintering temperature is from about 7 to about 15° C./min.
48. The method of any one of items 38 to 47, wherein a sintering temperature in step e) is between:
    about 400° C. below the melting point of the particles and
    about 200° C. below the melting point of the particles.
49. The method of any one of items 38 to 48, wherein a sintering time is from about 30 minutes to about 12 h.
50. The method of any one of items 38 to 49, wherein a sintering time is from about 6 h to about 12 h.
51. The method of any one of items 38 to 50, wherein a sintering time is from about 30 minutes to about 6 h.
52. The method of any one of items 38 to 51, wherein step d) and e) are carried out in an inert atmosphere.
53. The method of any one of items 38 to 52, further comprising the step f) of partly or completely filling the pores created in-between the particles by the removal of the polymer in step d) with a second metal or alloy, the second metal or alloy having a melting point lower than the melting point of the metal or alloy constituting the particles.
54. The method of item 53, wherein the second metal or alloy is steel, cast iron, titanium, silver, copper, zinc, gold, platinum, aluminum, nickel, bronze, or brass
55. The method of item 53 or 54, wherein the second metal or alloy is copper.
56. The method of any one of items 53 to 55, wherein step f) comprises contacting part of the solvent-cast metallic 3D printed material with the second metal or alloy, the second metal or alloy being in the molten state, and allowing the second metal or alloy to diffuse by capillarity into the pores.
57. The method of any one of items 53 to 56, wherein step f) comprises placing a piece of the second metal or alloy on top of the solvent-cast metallic 3D printed material and then heating at a temperature above the melting point of the second metal or alloy.
58. The method of any one of items 53 to 57, wherein an excess of the second metal or alloy is used.
59. The method of any one of items 53 to 58, wherein step f) is carried out in an inert atmosphere.
60. A solvent-cast metallic 3D printed material, shaped into a controlled pattern and made of particles of a metal or alloy peripherally attached to one another
61. The material of item 60, wherein the pores in-between the particles are completely or partially filled with a second metal or alloy.

BRIEF DESCRIPTION OF THE DRAWINGS

In the appended drawings.

DETAILED DESCRIPTION OF THE INVENTION

Figure 1A:
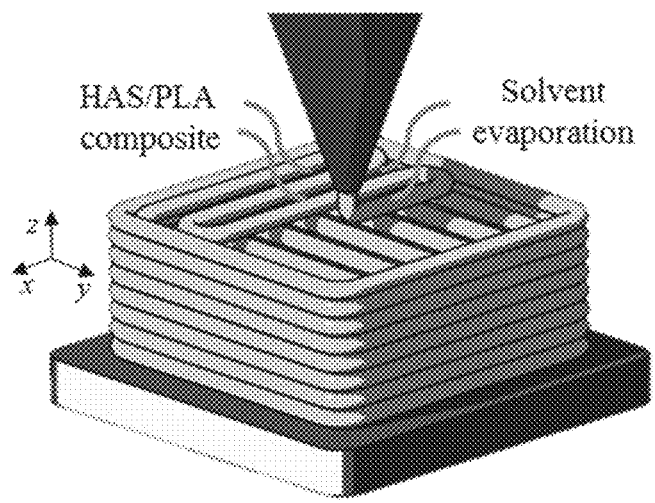
FIG. 1A) is a schematic of the fabrication process of a 3D metallic scaffold showing the solvent-cast 3D printing: the metallic ink is extruded through a micronozzle and the solvent evaporates after extrusion.

The present invention relates to solvent-cast 3D printing.

In solvent-cast 3D printing, an ink containing a volatile solvent is deposited in a controlled pattern using a 3D printer. A 3D printer is a machine (typically computer-controlled robot) that is able to create a 3D object, usually from a model designed by a computer aided design (CAD), by laying down successive thin layers of a 3D printing ink. To make a solvent-cast 3D printed structure, the ink is extruded through a moving micronozzle, thereby depositing the ink in the desired pattern. Usually, this pattern is multilayered. After extrusion, the solvent from the ink usually quickly evaporates (generally at room temperature) producing a solid 3D printed structure.

In the present invention, this 3D printed structure can be further modified via sintering followed or not by metal infiltration.

Metallic Ink for Solvent-Cast 3D Printing

Turning now to the invention in more details, there is provided a metallic ink for solvent-cast 3D printing, the ink comprising:
- a solution or a gel of a polymer in a volatile solvent, and
- heat-sinterable metallic particles dispersed in the solution or gel, wherein the particles are present in a particles:polymer weight ratio of more than about 85:15.

Herein, a "metallic ink for solvent-cast 3D printing" is an ink that is useful for manufacturing a 3D printed metallic material by solvent-cast 3D-printing.

As noted above, the ink comprises the particles and the polymer in a certain weight ratio range. For certainty, this weight ratio is expressed as follows: weight ratio=weight of metallic particles:weight of polymer. A ratio of 85:15 thus means that the ink comprises 85 wt % of the particles and 15 wt % of the polymer, both percentages being based of the total weight of the polymer and the particles (i.e. excluding the weight of the solvent and any other potential additives).

In embodiments, the particles are present in a carbon particles:polymer weight ratio of:
- about 86:14, about 87:13, about 88:12, about 89:11, about 90:10, about 91:9, about 92:8, about 93:7, about 94:6, or about 95:5 or more and/or
- about 99:1, about 98:2, about 97:3, about 96:4, about 95:5, about 94:6, about 93:7, about 92:8, about 91:9, or about 90:10, or less.

In embodiments, the particles are present in a particles:polymer weight ratio of about 86:14, about 87:13, about 88:12, about 89:11, about 90:10, about 91:9, about 92:8, about 93:7, about 94:6, about 95:5, about 96:4, about 97:3, about 98:2, or about 99:1. In preferred embodiments, the particles are present in a particles:polymer weight ratio between about 90:10 to about 99:1, more preferably about 95:5 to about 99:1.

Herein, "heat-sinterable metallic particles" are particles made of one or more metal (preferably in elemental form) or alloy that are capable of being sintered by heat. Heat sintering is a process of compacting and forming a solid structure made of a material by heating without melting the material to the point of liquefaction. Hence, sintering involves the heating of the material to a temperature near, but not reaching, its melting point for a time sufficient for the material to become compact and form a solid mass. When applied to the present heat-sinterable metallic particles, sintering results in the fusion of the particles via "necks" formed between the particles. In other words, the particles do not coalesce, but rather peripherally attach to one another.

Non-limiting examples of heat-sinterable metallic particles include particles of the metal of groups 3 (including the lanthanides and the actinides) to 16 of the periodic table and their alloys. Of note, the elements B, C, Si, Ge, N, P, As, Sb, O, S, Se, Te, F, Cl, Br, and I, while being part of groups 12 to 16 of the periodic table are not metals and thus are not "metals of groups 3 to 16 of the periodic table". More specific examples of metals and alloys include steel, cast iron, titanium, silver, copper, zinc, gold, platinum, aluminum, nickel, bronze, and brass. Preferably, the heat-sinterable metallic particles are particles of steel or titanium, more preferably steel. A preferred steel is a high-alloy steel (HAS), i.e. a steel containing more than about 4 w/w % of alloyants other than carbon.

The heat-sinterable metallic particles are preferably microparticles. Herein, microparticles are particles between about 0.1 μm and about 200 μm and in size. Preferably, the heat-sinterable metallic particles have preferably a size between about 0.1 μm and about 100 μm, more preferably between about 5 and about 50 μm, and most preferably with a size of about 20 μm. Typically, smaller particles are preferred to minimize clogging in fine nozzles, however they may require higher extrusion pressures during printing. Of note, when using larger particles, the nozzle used for 3D printing must have an inner diameter large enough to accommodate the particles and also the surface of the 3D printed material may be rougher.

The heat-sinterable metallic particles can be of any regular or irregular shape. Preferably, the particles are spheroidal, and more preferably spherical. Indeed, smooth spheroidal/spherical shapes tend to minimize the area/volume ratio, which reduces the friction between the particles and facilitates the extrusion. Herein, the terms 'spheroidal' and 'spherical' are not limited to perfectly spheroidal/spherical particles, but rather also encompass particles that present irregularities while being substantially spheroidal/spherical in shape.

The polymer is a polymer that is soluble or that forms a gel, preferably at room temperature, in the solvent. In embodiments, the polymer is poly(lactic acid), polystyrene, poly(methyl acrylate), poly(methyl methacrylate), poly(n-butyl acrylate), poly(2-hydroxyethyl methacrylate), poly (glycidyl methacrylate), poly(acrylic acid), poly(N—N-dimethylacrylamide), poly(1-vinyl anthracene), poly(2-vinyl pyridine), poly(4-vinyl pyridine), poly(N-vinyl carbazole), poly(N-vinyl carbazole), poly(N-vinyl imidazole), poly(vinyl benzyl chloride), poly(4-vinyl benzoic acid), poly(vinyl acetate), polycaprolactone, poly(11-[4-(4-butylphenylazo) phenoxy]-undecyl methacrylate) (poly(AzoMA)), poly(ferrocenyldimethylsilane), polyisoprene, polybutadiene, polyisobutylene, poly propylene glycol, poly(ethylene glycol), or a polysaccharide, such as chitosan, or a mixture thereof.

Polysaccharides, and in particular chitosan, are typically in the form of a gel in the ink of the present invention, while the other polymers mentioned above are typically in the form of solutions.

In preferred embodiments, the polymer is poly(lactic acid). Herein, the term "poly(lactic acid)" refers to a poly (lactic acid) homopolymer or a mixture thereof. The poly (lactic acid) homopolymers include those derived from d-lactic acid, l-lactic acid, or a mixture thereof. Poly(lactic acid) is typically prepared by the catalyzed ring-opening polymerization of the dimeric cyclic ester of lactic acid, which is referred to as "lactide." Poly(lactic acid) may also be made by living organisms such as bacteria or isolated from plant matter that include corn, sweet potatoes, and the like. Poly(lactic acid) made by such living organisms may have higher molecular weights than those made synthetically. In preferred embodiment, the poly(lactic acid) is that sold under number PLA 4032D by Natureworks LLC. This polymer is preferably used in the form of a solution in the ink of the present invention.

In alternative preferred embodiments, the polymer is chitosan. Chitosan is produced commercially by deacetylation of chitin, which is the structural element in the exoskeleton of crustaceans (such as crabs and shrimp) and cell walls of fungi. The degree of deacetylation (% DD) can vary and, in commercial chitosans, ranges from 60 to 100%, preferably the chitosan is about 90% deacetylated. On average, the molecular weight of commercially produced chitosan ranges from a few thousand to several hundred thousand Daltons. Chitosan is preferably used in the form of a gel in the ink of the present invention.

The solvent may be any volatile solvent capable of dissolving the polymer or forming a gel of the polymer as well as being capable of dispersing particles without reacting with the particles, even at temperatures involved in sintering of the particles. In preferred embodiments, the solvent is dichloromethane (DCM), chloroform ($CHCl_3$), tetrahydrofuran (THF), acetone, methanol (MeOH), ethanol (EtOH) or water.

The solvent may also further include an acid or a base, preferably an acid. Preferably, the acids and bases are used when water is the solvent for the polymer (preferably chitosan) in the ink. In such cases, the acids and bases change the pH and/or the rheological properties (in particular, the viscosity) of the ink. In particular, acids decrease both the pH and the viscosity of chitosan hydrogels. The acids and bases are preferably weak acids and bases. Weak bases and acids are defined as bases and acids that do not ionize fully in an aqueous solution. Typically, weak acids have a $pK_a$ between about −2 and about 12, preferably between about 2 and about 8, and more preferably between about 3 and about 6.5. Typically, weak bases have a $pK_b$ between about −2 and about 13, preferably between about −2 and about 2, and the base has more preferably a $pK_b$ of about 0.2 These acids and bases are preferably organic. These acids and bases are preferably non-toxic. Non-limiting examples of acids include acetic acid, lactic acid, citric acid as well as mixtures thereof. A preferred acid is acetic acid alone or together with one or more other acids such as lactic acid and/or citric acid. Preferably, the total acid concentration ranges from about 40 to about 90 wt % (based on the total weigh of the solvent and the acid(s)). Preferably, the solvent for the ink is water and comprises:

70 vol % acetic acid alone or together with 10 vol % lactic acid and 3 wt % citric acid, or 80 vol % acetic acid, the vol % being based on the total volume of the water and acids and the wt % being based on the total weight of the water and acids.

In embodiments where the polymer (for example poly (lactic acid)) is used in the form of a solution, the solvent is preferably dichloromethane, chloroform, tetrahydrofuran, acetone, methanol, or ethanol, more preferably dichloromethane.

In alternative embodiments where the polymer (for example chitosan) is used in the form of a gel, the solvent is preferably water, and more preferably water with an acid as described above.

In particular embodiments, the ink comprises a gel of chisotan in water (hydrogel) containing one or more non-toxic acids, preferably 70 vol % acetic acid alone or together with 10 vol % lactic acid and 3 wt % citric acid, or more preferably 80 vol % acetic acid alone. In such cases, the ink could be used to print biomaterials and materials for biomedical applications as well as any other electrically conductive materials for which the use of toxic solvents is not allowed or is undesirable.

Higher solvent concentrations in the ink yield thinner inks, while lower concentrations yield thicker inks that dry more quickly. Thicker inks that dry more quickly tend to retain better their shape after 3D printing. Hence, a skilled person will adjust the solvent content to obtain an ink with the desired performances, i.e. and ink that is thin enough to be extruded through the nozzle of a 3D printer, while being think enough to hold its shape after extrusion. In embodiments (preferably with poly(lactic acid) as the polymer), the ink comprises between about 10 and about 50 w/w % solvent (based on the total weight of the ink). In alternative embodiments where the polymer is chitosan, the ink comprises between about 10 and about 25 w/w %, for example about 12.4 solvent w/w %, based on the total weight of the ink.

In embodiments, the ink further comprises one or more additives. Non-limitative examples of such additives include:
 glycerol (with a view to conferring flexibility to the 3D printed structure),
 pigments to change the color of the ink,
 short carbon fibers, fiberglass, and/or boron nitride to change the mechanical properties of the ink, and/or
 carbon black spheres, graphene, or metal nanowires such as silver, copper, and/or nickel nanowires to change the electrical properties of the ink.

Preferred additives are metal nanowires such as silver, copper, and/or nickel nanowires.

3D Printer Ink Cartridge

In another aspect, the present invention provides a 3D printer ink cartridge, the cartridge comprising a container having an ink outlet, the container comprising the ink as described in the previous section.

In embodiments, the cartridge is adapted to be installed on a 3D printer.

In embodiments, the cartridge is adapted to be fitted to a nozzle for delivering the ink, so that, for ink dispensing, the ink is extruded through the ink outlet and through the nozzle.

In embodiments, the cartridge is designed so that when a pressure is applied by a 3D printer, the ink is extruded through the ink outlet.

Method of Manufacture of an Ink for Solvent-Cast 3D Printing

In another aspect, the present invention provides a method of manufacture of the above ink for solvent-cast 3D printing, the method comprising the steps of:
 a) providing a solution or a gel of a polymer in a solvent,
 b) providing heat-sinterable metallic particles in a particles:polymer weight ratio of more than about 85:15, and
 c) dispersing the particles in the solution or gel of the polymer, thereby producing the ink.

In this method, the ink, the polymer, the solvent, the solution or gel, the particles, their concentrations, their preferred embodiments, etc. are as described above.

As the polymer is soluble in the solvent or can form a gel with the solution, the solution or gel in step a) can be prepared simply by mixing the polymer in the solvent until the polymer is dissolved or the gel is formed. In embodiments, the polymer concentration of this solution or gel is:
 about 2 wt %, about 3 wt %, about 4 wt %, about 5 wt %, about 6 wt %, about 7 wt %, about 8 wt %, about 9 wt %, or about 10 wt % or more and/or
 about 30 wt %, about 35 wt %, about 20 wt %, about 15 wt %, or about 10 wt % or less,
based on the total weight of the solution or gel. In preferred embodiments where the polymer is PLA, the polymer concentration of this solution or gel is about 20 wt %, based on the total weight of the solution or gel. In preferred embodiments where the polymer is chitosan, the polymer concentration of this solution or gel is about 4 wt %, based on the total weight of the solution or gel.

The dispersion of the particles in step c) can be effected by any dispersion technique known to the skilled person. No matter which dispersion technique is used, it should be carried out with sufficient energy and for sufficient time so that particles are dispersed in the solution or gel. In preferred embodiments, dispersion is achieved ball milling for example for a few minutes.

In embodiments, the method further comprises the step of adding solvent, or removing part of the solvent (for example by partial evaporation). This allows adjusting the solvent content in the ink to achieve a desired ink viscosity. Preferred solvent contents are as noted in the previous sections.

In embodiments, the method further comprises, the step of adding one or more additives to the solvent before it is used to form a solution or gel of the polymer, to the solution or gel of the polymer or to the ink. The step at which this additive is added and how it is mixed may vary depending on the additive. In preferred embodiment, the additive is added to the solution or gel of polymer before step c), and mixed in the ink during step c). In alternative embodiments, the additive is mixed into the ink after step c). When a base or acid is used in the solvent, it is preferably added to the solvent before it is used to produce the solution or gel of the polymer (i.e. prior to step a)).

In embodiments, the method further comprises, the step of packaging the ink in a 3I printer ink cartridge.

Method of Manufacturing a Solvent-Cast Metallic 3D Printed Material

In another aspect, the present invention provides a method of manufacturing a solvent-cast metallic 3D printed material, the method comprising the steps of:
  a) providing the above described metallic ink for solvent-cast 3D printing containing a polymer and heat-sinterable metallic particles;
  b) using a 3D printer, extruding the ink through a nozzle into a controlled pattern;
  c) allowing solvent evaporation, thereby producing a printed material;
  d) removing the polymer from the printed material by heating the printed material to a polymer degradation temperature or above, thereby leaving the particles arranged into the controlled pattern; and
  e) heat-sintering the particles, thereby producing the solvent-cast metallic 3D printed material.

Herein, a "controlled pattern" refers to a pattern with a controlled morphology, such as that obtained by 3D printing from a model. Controlled patterns do not include random pattern such as those obtained by simple extrusion, electrospinning or other such methods. However, controlled patterns include porous patterns, fully-filled patterns, interlocked patterns and overhung patterns as well as patterns involving so-called freeform printing, i.e. patterns including one or more structures printed in the vertical direction with no adjacent supporting layers (e.g. a column). The controlled pattern is typically a layered pattern.

In embodiments of this method, providing step a) includes the method of manufacture of a solvent-cast 3D printing ink described in the previous section.

The speed of the extrusion (in step b)) depends on many interrelated ink- and printer-related factors. These factors include the inner diameter of the nozzle, the applied pressure, the displacement speed of the nozzle, the volatility of the solvent, particle concentration, and the viscosity of the ink. For any given ink and desired nozzle diameter, the remaining printer-related factors are adjusted to allow successful deposition into the desired pattern. Exemplary 3D printing conditions include:
  an applied pressure between about 0.2 and about 4.2 MPa,
  a displacement speed of the nozzle ranging from about 0.3 to about 10 mm/sec, and/or
  an inner diameter of the nozzle ranging from about 100 µm to about 410 µm.

In embodiments, step b) is advantageously carried out at about room temperature.

It is to be understood that solvent evaporation (in step c) typically begins as soon as the ink is extruded out of the nozzle in step b). In embodiments, the solvent has completely evaporated from 3D printed material before heating in step d), i.e. step c) is entirely carried out at about room temperature. In other embodiments, some residual solvent evaporates from the 3D printed material during the heating involved in step d), i.e. part of step c) is carried out at about room temperature and then the remaining of step c) is carried at a temperature above room temperature.

During step c), an airflow (for example from a fan) can be used to speed up solvent evaporation. This is particularly suitable when inks that are somewhat slow to dry, for example because they comprise a less volatile solvent, such as water.

Step c) results in a solid particles/polymer composite material disposed in the controlled pattern.

In step d), the polymer is removed from the 3D printed material by heating the material at or above the polymer degradation temperature. The polymer degradation temperature will vary depending on the nature of the polymer. The polymer degradation temperature of a polymer is a well-known to skilled persons and readily available or, failing that, can be easily determined by heating the polymer and observing the temperature at which it degrades. For example, the polymer degradation of PLA is about 225° C.

In step e), the particles (resulting from step d)) are heat-sintered. In other words, the particles are heated to a sintering temperature for a time sufficient for the particles to peripherally become attached to one another thus forming a solid mass. The sintering temperature is a temperature at which sintering occurs. It will vary according to the nature of the particles. The sintering temperature of a metal or alloy is well-known to skilled persons and readily available or, failing that, can be easily determined by heating the metal or alloy and observing the temperature at which sintering is observed.

Typically, the sintering temperature is a temperature approaching, but not reaching, the melting point of the particles. For example, the sintering temperature may be as low as about 400° C. below the melting point of the particles or as high as about 200° C. below the melting point. The sintering time (i.e. the length of time at which the materiel is held at the sintering temperature) will be adjusted according to the desired properties for the solvent-cast metallic 3D printed material produced. If a more porous material is desired, especially in view of carrying out optional step f) below, the sintering time may be shorter, for example from about 30 minutes to about 6 h, preferably about 1 h. If a more robust material is desired, the sintering time may be longer, for example from about 6 h to about 12 h, preferably about 6 h.

It should be noted the polymer degradation temperature is lower than the sintering temperature. Also, if desired, steps d) and e) can advantageously be performed by a single heat treatment in which the temperature is increased to sintering temperature (thus passing the polymer degradation temperature) and then held at the sintering temperature. Typically, there is no need to stabilize the temperature and/or hold the temperature at or around the polymer degradation temperature. In embodiments, the heating rate will vary during the heat treatment, for example being slower up until about the polymer degradation temperature is reached and being faster afterwards until the sintering temperature is reached. For example, the heating rate up to about the polymer degradation temperature or above (e.g. up to about 100° C. above the polymer degradation temperature) may be from about 1 to about 5° C./min, preferably about 1° C./min. The heating rate thereafter, up to the sintering temperature may be from about 7 to about 15° C./min, preferably about 10° C./min. Then, the sintering temperature may be held for the sintering time discussed above.

After step c), the printed material comprises the particles and the polymer arranged into the controlled pattern (potentially together with one or more additives as described above). The removal of the polymer in step d) results a material comprises the particles arranged into the controlled pattern (potentially together with one or more of the additives that have not been removed by the heating). After step e), similarly to after step d), the material comprises the particles arranged into the controlled pattern (potentially together with one or more of the additives that have not been removed by the heating). However, the particles are now peripherally attached to one another thus forming a solid structure and thus yielding the desired solvent-cast metallic 3D printed material. As noted above, the particles do no coalesce. Therefore, pores created in-between the particles by the removal of the polymer will remain in the solvent-cast metallic 3D printed material resulting from step e).

Some shrinkage will typically be observed during step d) because the polymer is removed and the particles settle. However, this step nevertheless results in a material arranged in the same controlled pattern as steps b) and c)—for example see FIG. 1B). Typically, little shrinkage is observed during step e).

In embodiments, the method further comprises the step f) of partly or completely filling the pores created in-between the particles by the removal of the polymer with a second metal or alloy. As such, step f) results in a metal/metal composite. The second metal or alloy has melting point lower than the melting point of the metal or alloy of the particles. Non-limiting examples of the second metal or alloy include metal of groups 3 (including the lanthanides and the actinides) to 16 of the periodic table and their alloys. Of note, the elements B, C, Si, Ge, N, P, As, Sb, O, S, Se, Te, F, Cl, Br, and I, while being part of groups 12 to 16 of the periodic table are not metals and thus are not "metals of groups 3 to 16 of the periodic table". More specific examples of metals and alloys include steel, cast iron, titanium, silver, copper, zinc, gold, platinum, aluminum, nickel, bronze and brass, preferably copper. The pores created in-between the particles by the removal of the polymer can be filled with the second metal or alloy, for example, by contacting part of the solvent-cast metallic 3D printed material, for example an end, edge or side thereof, with the second metal or alloy, the second metal or alloy being in the molten state, and allowing the molten second metal or alloy to diffuse by capillarity into the pores of the material. Preferably, the molten second metal or alloy is placed on top of the solvent-cast metallic 3D printed material and the gravity force eases the diffusion. This can be achieved by placing a piece of the second metal or alloy on top of the solvent-cast metallic 3D printed material and then heating the assemblage at a temperature above the melting point of the second metal or alloy. Preferably, the quantity of second metal or alloy contacted with the solvent-cast metallic 3D printed material can be calculated from the porosity and volume of the solvent-cast metallic 3D printed material and the desired filling level. When fully filling the pores, the quantity of second metal or alloy can be slightly in excess (for example about 10 vol % in excess) of the calculated quantity of second metal or alloy needed to fully filled the pores.

Interestingly, the above diffusion method allows filling the pores of the above-mentioned pores without significantly filing the macroscopic voids within the solvent-cast metallic 3D printed material. For example, if two filaments have been printed adjacent to one another, the pores in-between the particles within each filament will be partly or completely filed, but the space between the two filaments will not be significantly filed—see FIG. 1B). However, sharp corners near interconnecting filaments will then to be filled.

As noted above, the pores may be completely or partially filled by the second metal or alloy. Pores that are more filled result in denser, less porous, metal/metal composite material.

Steps d), e) and f) can be carried out in air. In embodiments, steps d), e) and f) are preferably carried out in an atmosphere that is inert toward (i.e. does not react with) the heated materials. This can be advantageous when the metal or alloy when heated reacts with air, which may results in oxidation of the material or even explosions. Alternatively, a reactive atmosphere could be used to alter the material (i.e. the metal or alloy of the particles and/or the second metal or alloy) in a desirable manner.

Solvent-Cast Metallic 3D Printed Material

In another aspect, the present invention provides a solvent-cast metallic 3D printed material. This material has been manufactured by the above described method using the above described ink. Therefore, the above teachings regarding the metal(s), optional additive(s), etc., including preferred embodiments thereof, apply to the material described below.

This material is shaped into a controlled pattern (described above).

This material is made of particles of a metal or alloy (described above) peripherally attached to one another.

In embodiments, pores in-between the particles are completely or partially filled with a second metal or alloy (described above).

Advantages of the Invention

In one or more embodiments or aspects, the present invention may present one or more of the following advantages.

The easy-to-implement method of the invention enables lower-cost 3D printing (compared to SLS and SLM).

The invention allows 3D printing of highly dense metallic structures featuring complex geometries. It can be used to manufacture high-performance metallic parts. The porosity of the metallic can be tailored during sintering.

The method is highly flexible and various complex 3D structures, including fully-filled, porous, interlocked and overhung structures, can be fabricated.

The method of the invention can be used with diverse metallic materials.

The method of the invention involves 3D printing at room temperature.

The method of the invention allows reusing scraps of 3D-printed materials (via dissolution) to produce new ink.

The method of the invention does not involve complex and expensive equipment. It is cheap and safe.

The method of the invention can be applied to fabricate small sized devices (e.g. the artificial bones for human) in the medical field, benefiting from its high resolution and ability to fabricate complex microstructures with desirable mechanical properties.

In addition, the method is also suitable to fabricate conductive porous microstructures serving as electromagnetic shields in the microwave field.

With regards to embodiments where the polymer is a polysaccharide, such as chitosan, the above materials and method are environment-friendly as polysaccharides, such as chitosan, are general biodegradable and do not require toxic solvents. The chitosan polymer solution system could apply to diverse metallic materials, metal oxides and ceramics to obtain green and reusable 3D-printable inks.

Definitions

The use of the terms "a" and "art" and "the" and similar referents in the context of describing the invention (especially in the context of the following claims) are to be construed to cover both the singular and the plural, unless otherwise indicated herein or dearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise dearly contradicted by context.

The use of any and all examples, or exemplary language (e.g., 'such as') provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Example 1—Solvent-Cast Based Metal 3D Printing and Secondary Metallic Infiltration Summary We developed a method to fabricate dense metallic structures by combining a room temperature 3D printing and subsequent heat-treatments: sintering and secondary metallic infiltration. The high flexibility of this method enabled the fabrication of customized 3D structures, such as fully-filled, porous, interlocked and overhung structures. These geometries were printed using a highly concentrated metallic ink (metallic load up to 98 wt. %) consisting of highly alloyed steel (HAS) microparticles, polylactic acid (PLA) and dichloromethane (DCM). In order to improve the mechanical properties and the electrical conductivity, the as-printed structures were sintered and infiltrated by copper in a furnace protected by a mixture of $H_2$ and Ar. The filament porosity of the copper infiltrated samples was as low as 0.2%. Mechanical testing and electrical conductivity measurement on the copper infiltrated structures reveal that the Young's modulus reached up to ~195 GPa and the electrical conductivity was as high as $1.42 \times 10^6$ S/m.

Introduction

Figure 1B:
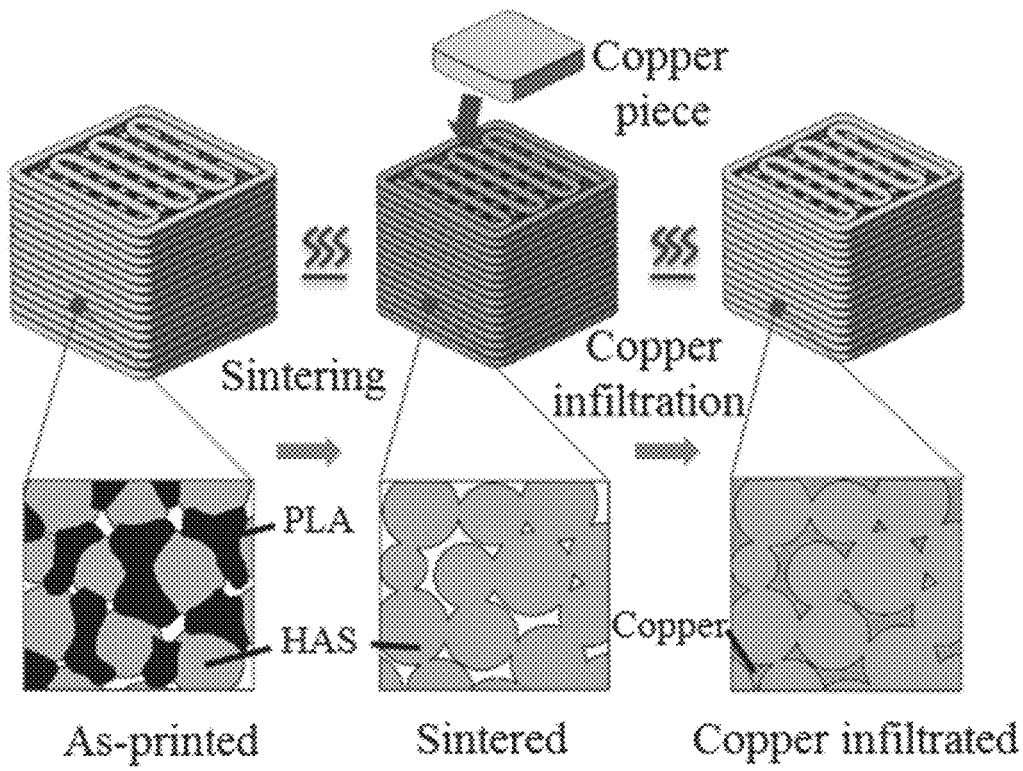
FIG. 1B) is a schematic of the remainder of the fabrication process of a 3D metallic scaffold showing, on the left, the sintering (the as-printed scaffold is heated to burn the polymer away and sinter the metal particles), and, on the right, the metal infiltration (the sintered scaffold is heated again with a piece of second metal (for example copper) is placed on top of it).

We describe herein the solvent-cast 3D printing of metallic inks at room temperature, followed by sintering and secondary infiltration—see FIGS. 1A) and B). To demonstrate this concept, a metallic ink was prepared by mixing spherical highly alloyed steel (HAS) microparticles, PLA and DCM. In the printing process (FIG. 1A), an extrusion device was employed to extrude the metallic ink. This device included a pressure dispensing system, a micronozzle and a syringe barrel that contains the metallic ink. It was mounted on the moving head of a computer controlled 3-axis positioning stage, in order to deposit the extruded ink filament layer by layer on a substrate to create 3D structures. Right after the ink filament was extruded, the solvent in the metallic ink evaporated rapidly at room temperature and the filament became solid. The filament layer was then used as a support for subsequent filament layers to create a HAS/PLA composite multi-layer scaffold. In the as-printed scaffold (FIG. 1B, left), PLA served as a binder holding the HAS microparticles together. To directly connect the HAS particles, the polymer binder was removed by heating the printed scaffold in a furnace above the polymer degradation temperature. The temperature was then rapidly raised to slightly below the melting point of the HAS. At this temperature, sintering occurred by creating necking links between neighboring particles. As time elapsed, the necks growth effectively reduced the size and the number of the pores within the metallic continuum. Porosity can be reduced to obtain a strong and conductive filament structure. However, the sintering process was halted at a porosity favorable for melted copper infiltration (FIG. 1B, right). For copper infiltration, the sintered scaffold was heated again with a piece of copper (Cubond IP C-437 infiltration copper) placed on top of it. The melted copper filled the pores within the filament driven mainly by capillary forces. Melted copper flowed through the pores within filaments to obtain a highly dense metal/metal composite.

Experimental

Materials 2 g of PLA (40320, Natureworks LLC, glass transition temperature $T_g$=50-60° C.) was dissolved in 8 g of DCM (Sigma-Aldrich, boiling point=39.6° C.) to prepare polymer solutions. After resting for 24 h, the solutions were sonicated in an ultrasonic bath (Ultrasonic cleaner 8891, Cole-Parmer) for 5 minutes. The metallic inks were prepared by mixing the polymer solution and HAS microparticles using a ball mill mixer (8000M Mixer/Mill, SPEX SamplePrep) for 5 minutes.

3D Printing

The inks were loaded into 3 cc syringes (EFD) attached to a smooth-flow tapered nozzle (exit inner diameter=250 μm, EFD). Loaded syringes were mounted on a pressure dispensing system (HP-7X, EFD), which was placed on a computer controlled 3-axis positioning stage (I&J2200-4, I&J Fisnar). The ink was printed on a glass slide (PN 16004-422, VWR). The scaffolds, tensile bars and Olympic stadium were printed at a speed of 10 mm/s and under a pressure around 0.7 MPa using the 95 wt. % concentrated ink. These structures were designed by a computer aided design software (i.e. CATIA) and sliced into several layers by a slicing software (i.e. Cura). Each was filled by a filament path and the filament path was interpreted to G-code. Then, the G-code was converted by a customized python program into a point-to-point program that can be recognized by the JR Points software to control the positioning moving stage.

Sintering and Copper Infiltration

Figure 2A:
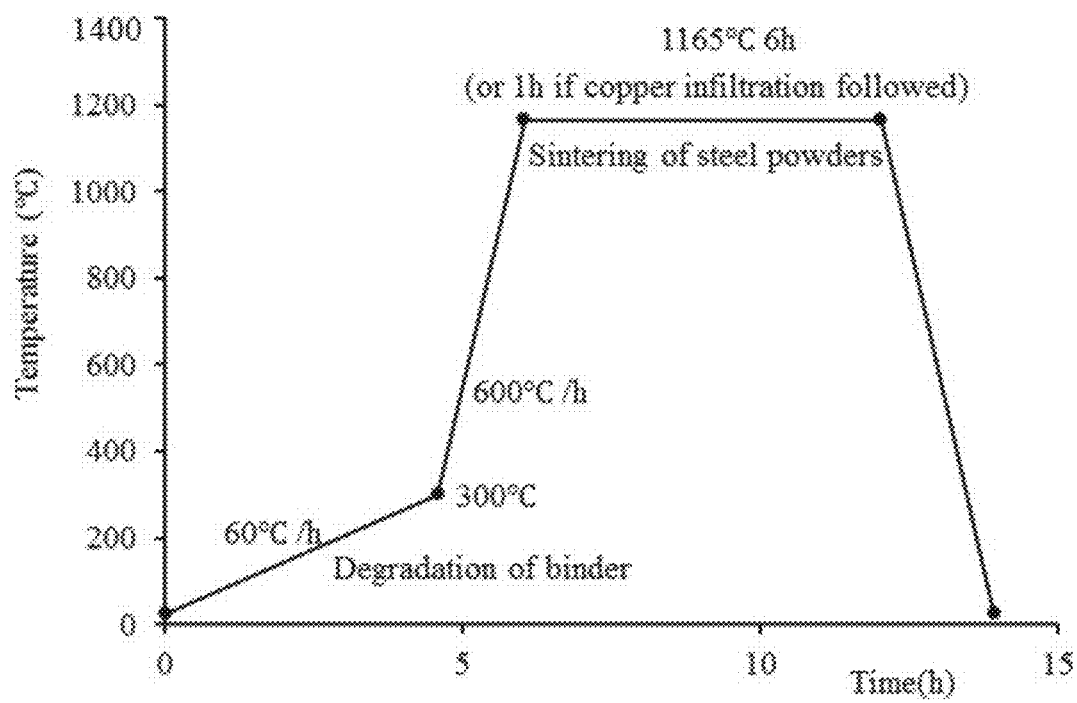
FIG. 2A) shows the temperature profile during sintering.

The as-printed samples were sintered and copper infiltrated in a laboratory electric tubular furnace (59256-P-COM, Lindberg) using a ceramic substrate. A gas mixture of 2.5% $H_2$ 97.5% Ar (flow rate=5 $ft^2$/h) was circulated inside the quartz tube to prevent the oxidation of the samples. The temperature profiles used during the sintering and copper infiltration are provided in FIGS. 2A) and B). Debinding started from 25° C. to 300° C. with a heating rate of 60° C./h. Then the temperature was raised up to 1165° C. with a heating rate of 600° C./h and held at 1165° C. for 6 h for sintering. For copper infiltration, the temperature was raised up to 1120° C. and held for 0.5 h, then cooled down to the room temperature.

Porosity Analysis

Each sintered and copper infiltrated scaffold was sealed in a resin (EpoFix Resin, Struers) block before polishing. The scaffold was polished until reaching 0.2H, 0.5H and 0.8H of the printed structure (H being the initial height of the scaffold). The polished cross sections were observed under an optical microscope (Zeiss Axioplan EL-Einsatz). For each cross section, five images were taken at different areas of the cross section and analyzed by an image analyzing software (Clemex, ST-2000). The porosity was calculated as the ratio of voids area over the filament area in the polished cross sections.

Tensile Tests

The tensile bars were printed with 95 wt. % ink and 250 μm tapered nozzle, of which the average size of the cross section of the narrow part was ~4.0×1.8 mm. The filaments were oriented 0°/90° to the tensile direction, i.e. the filaments from same layer were parallel, while adjacent layers were orthogonal. The tensile tests were carried out on a MTS Insight machine with a 50 kN load cell (MTS 569332-01) at a crosshead speed of 1 mm/min and using an extensometer (MTS 632.26, C-20). Three specimens for each sample type were tested.

Electrical Conductivity Test

The test samples used for the electrical conductivity measurements are sintered and copper infiltrated rods having typical dimensions of 30×1×1 mm. They are printed with the 95 wt. % ink and the 250 μm tapered nozzle. The current values of 1 A, 2 A and 3 A is provided by an EMS 150-33-D-RSTL power supply. A NI 6211 device is employed for the current and voltage acquisition. The control of the power supply and the logging of test data are carried out via a LabVIEW program. Three specimens of each sample type were tested.

Results and Discussion

Metallic Ink Recipe

Figure 3:
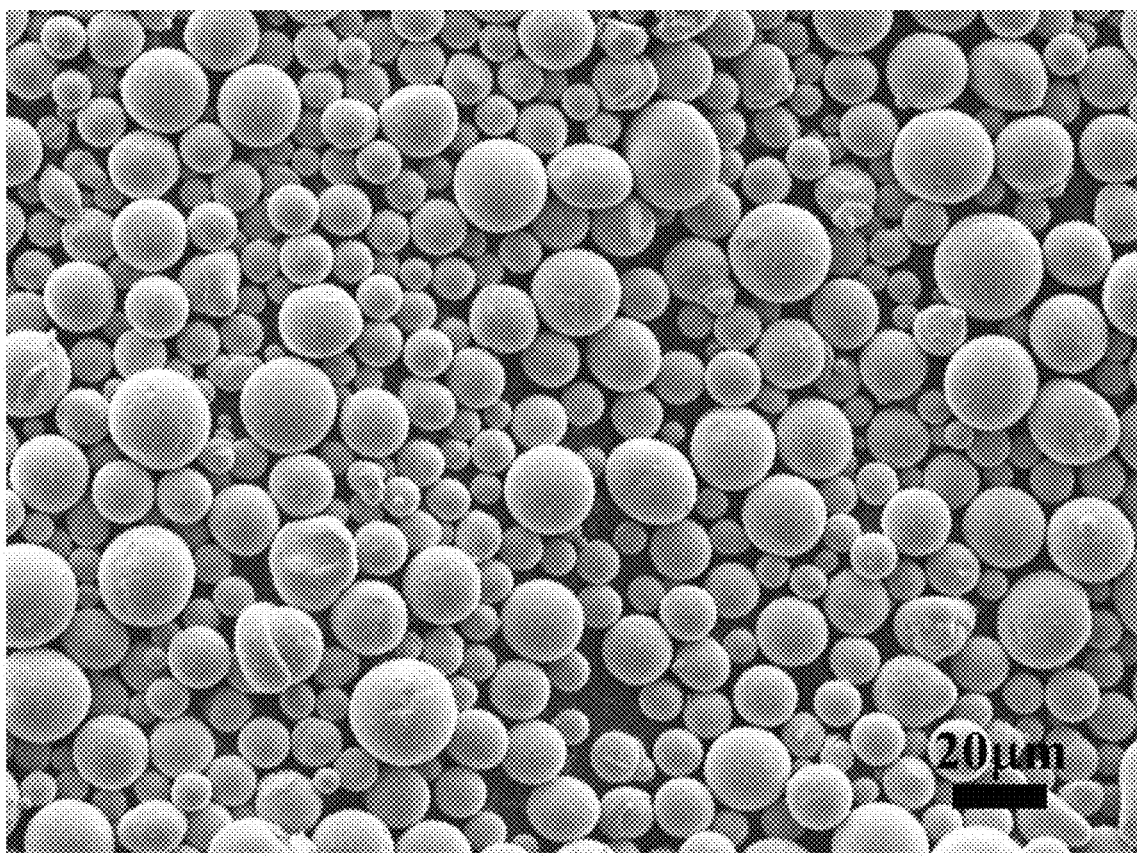
FIG. 3 is a secondary electron micrograph showing highly alloyed steel (HAS) powder particles (≤20 μm).

The HAS powder particles used in this work were fine (s 20 μm) and had a spherical shape (see FIG. 3). The PLA solution served as lubrication to assist the extrusion of the HAS microparticles through the micronozzle. The solvent was DCM as it efficiently dissolves PLA and rapidly evaporates at room temperature.

The HAS particle concentration within the ink affected the properties of the fabricated structures. To investigate its influence on as-printed, sintered and copper infiltrated structures, 20-layer scaffolds were printed using HAS/PLA inks with four different concentrations of HAS particles: 85, 90, 95 and 98 wt %. The inks were named according to the metal particles weight percentage in the as-printed structure (solid state with no solvent). In the inks, the PLA/DCM weight ratio was 1:4, except for 98 wt. % ink, which was 1:9 (see Table 1 for detailed compositions).

TABLE 1

| | Ink formulations created for 3D printing | | | |
|---|---|---|---|---|
| Ink constituent | 85 wt. % (47 vol. %) HAS/PLA ink [g] | 90 wt. % (59 vol. %) HAS/PLA ink [g] | 95 wt. % (75 vol. %) HAS/PLA ink [g] | 98 wt. % (90 vol. %) HAS/PLA ink [g] |
| PLA | 15 | 10 | 5 | 2 |
| DCM | 60 | 40 | 20 | 18 |
| HAS microparticles | 85 | 90 | 95 | 98 |

Figure 4:
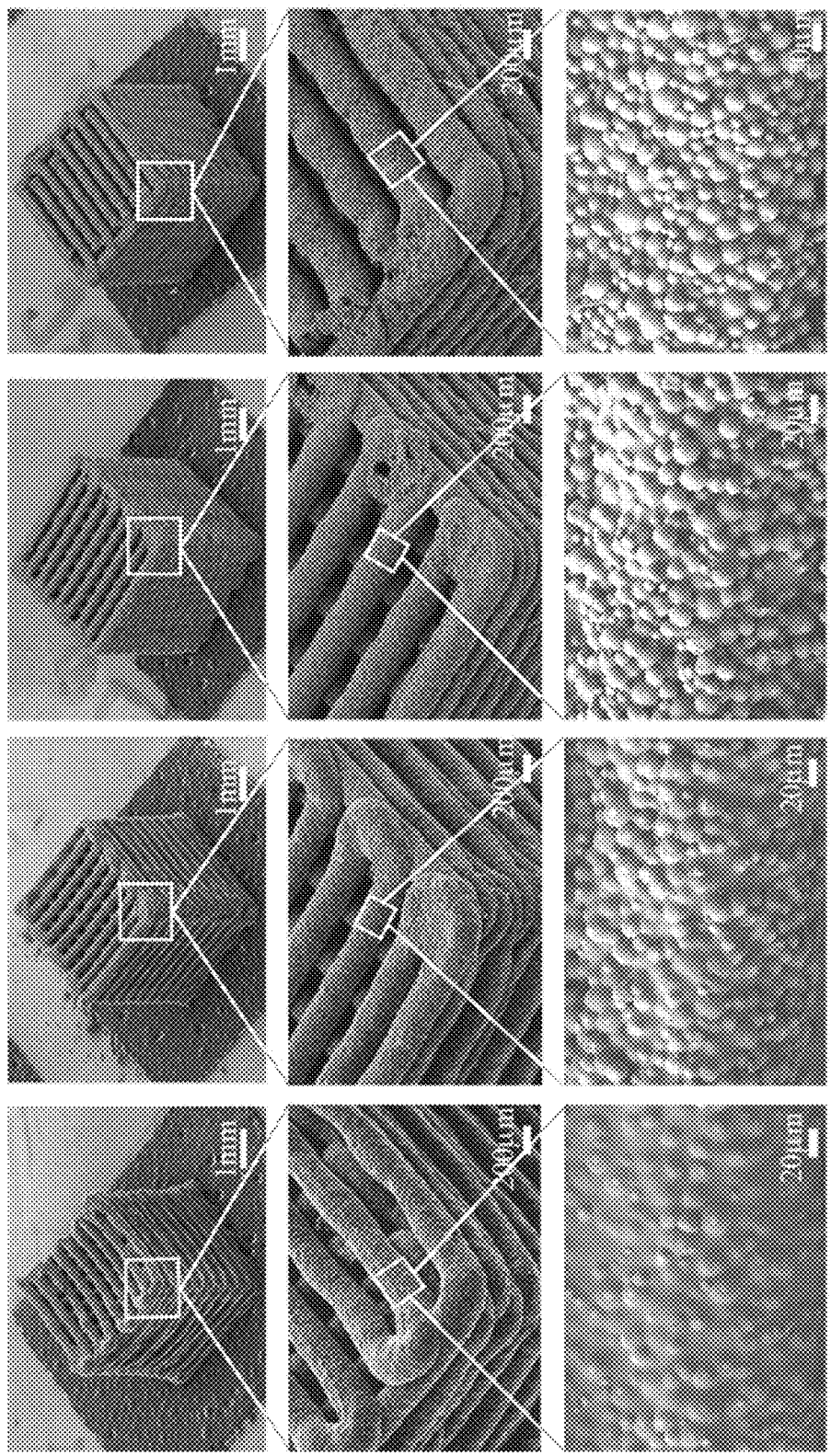
FIG. 4 show Scanning Electron Microscopy (SEM) images of as-printed 20-layers scaffolds made with inks with different metal particles concentration (85, 90, 95, 98 wt. %, first row from left to right) and their close-up view images (corresponding middle and bottom rows).

The 85 wt. % ink contained the highest amount of solvent, and thus took more time to evaporate. As a result, the ink transition from liquid to solid state was slower. This was detrimental to the shape retention of the extruded filament. The surface of the scaffold printed with the 98 wt. % ink was the roughest due to the low amount of PLA (see FIG. 4). The HAS microparticles were covered and bonded by the polymer. The filaments of all four scaffolds aligned well. However, as mentioned above the 85 wt. % scaffold distorted and the surface of the 98 wt. % scaffold was rough.

Figure 5:
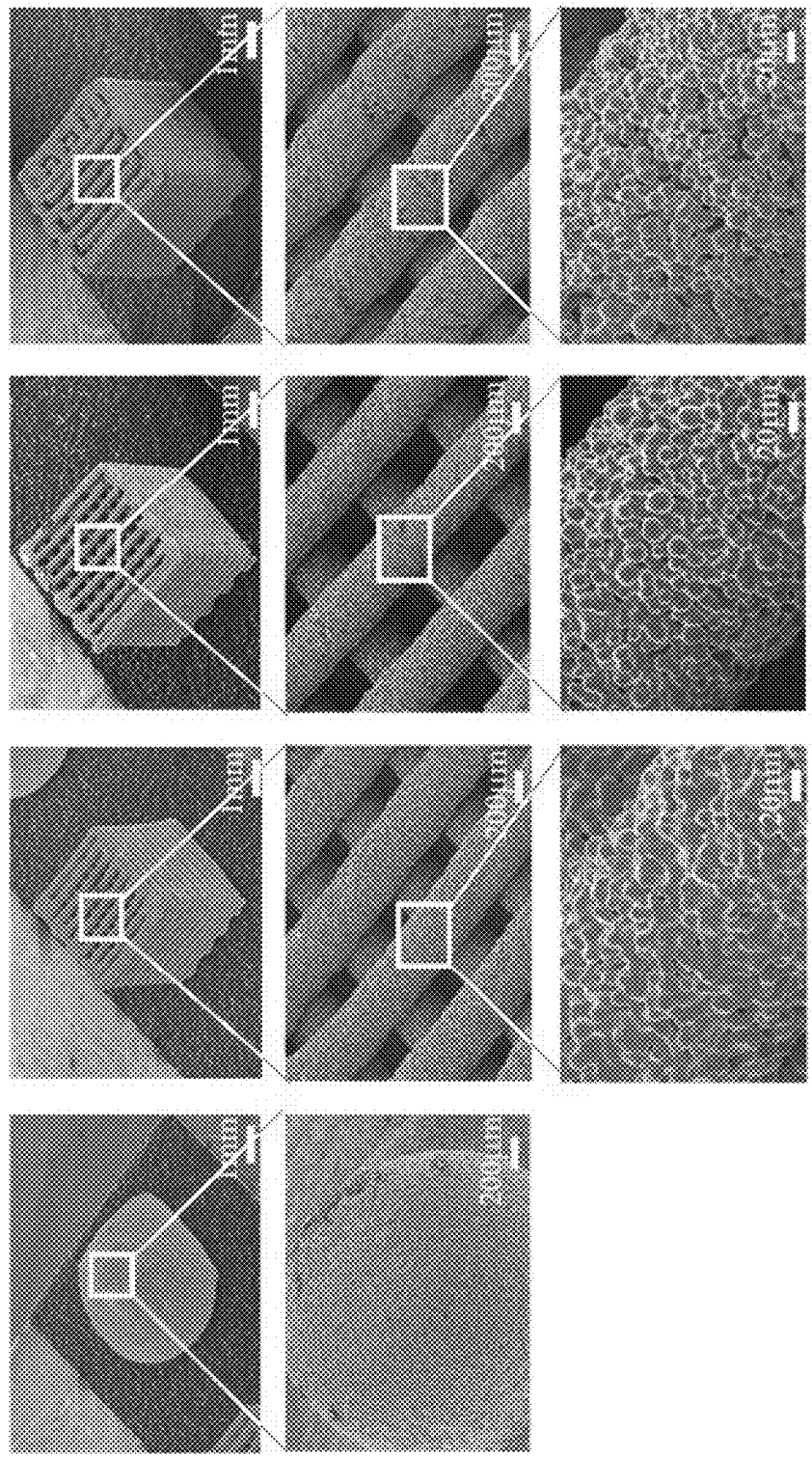
FIG. 5 show SEM images of sintered 20-layers scaffolds made with inks with different metal particles concentration (85, 90, 95, 98 wt. %, first row from left to right) and their close-up view images (middle and bottom rows).
Figure 6:
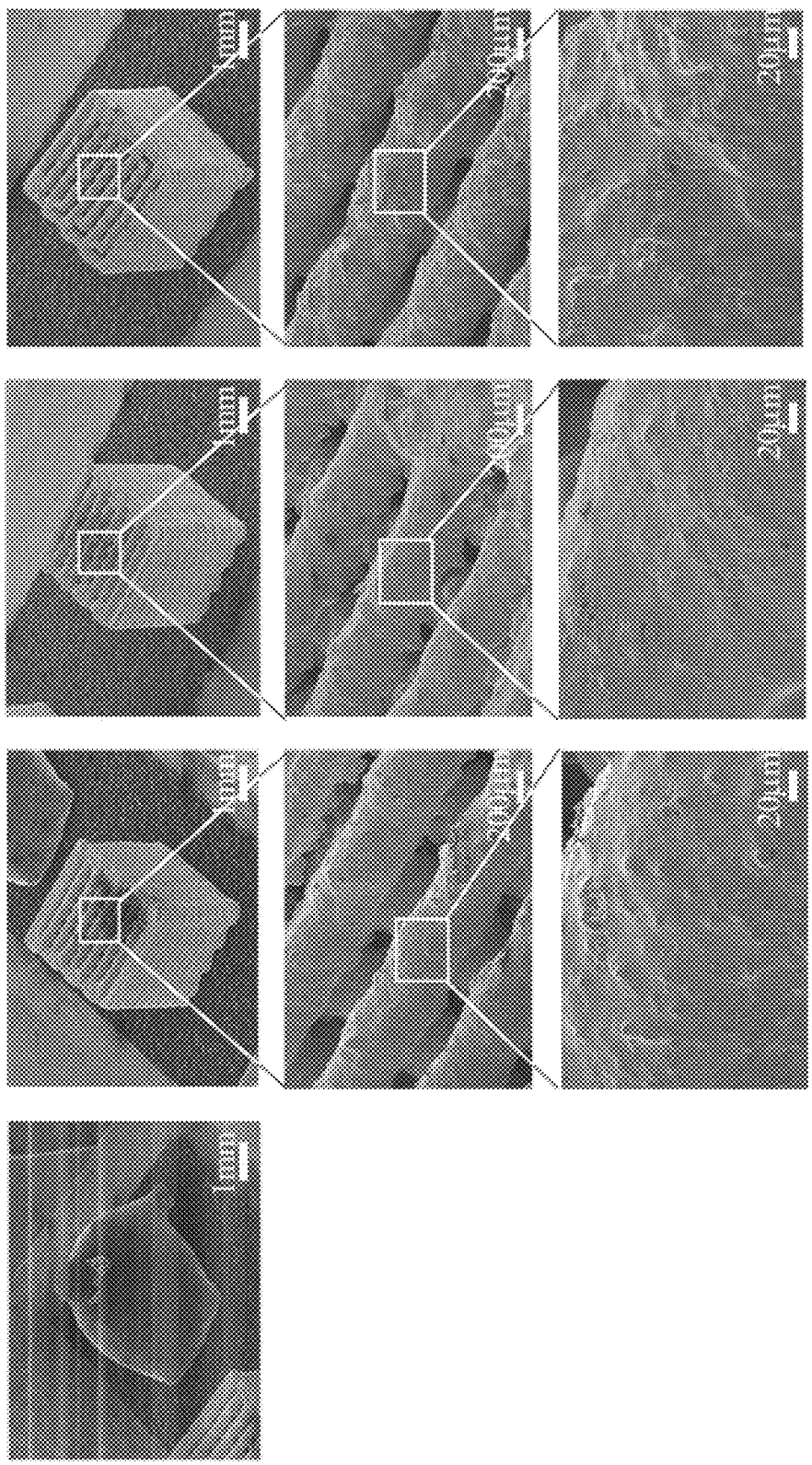
FIG. 6 show SEM images of copper infiltrated 20-layers scaffolds made with inks with different metal particles concentration (90, 95, 98 wt. %, first row from left to right) and their close-up view images (middle and bottom rows).

During sintering, 85 wt. % ink printed scaffolds collapse while the higher concentrated ink successfully preserved their shape during the sintering (FIGS. 5 and 6). After sintering, the polymer was burned away and the HAS microparticles were sintered together. The filaments of 90, 95 and 98 wt. % scaffold keep their shapes and aligned well, while the 85 wt. % ink printed scaffold collapsed during sintering and the surface of 98 wt. % scaffold was rough. Melted copper infiltrated into the sintered filaments. Some excessed copper was left on the top of the scaffold.

Since low concentration inks contain more polymer, the structure had higher risk to flow and collapse during the heating and removing the polymer binder. Hence, the 95 wt. % ink was selected for further testing because it appeared to be the best compromise between having a highly concentrated ink for dense sintered structures while ensuring smooth extrusion and low deformation during the solvent evaporation printing.

3D Printing of Metallic Inks

FIGS. 7 to 10 shows various 3D structures fabricated using the above solvent-cast 3D printing method with the 95 wt. % ink at a printing speed of 10 mm/s, including tensile bars, 20-layer scaffolds, a planetary gear and a small-scale replica of Montreal's Olympic stadium. The high flexibility of the technique enabled the fabrication of customized structures, such as fully-filled (FIG. 7A)), porous (FIG. 8A) to 8C)), interlocked (FIG. 9), and overhung structures (FIG. 10B)).

Figure 7A:
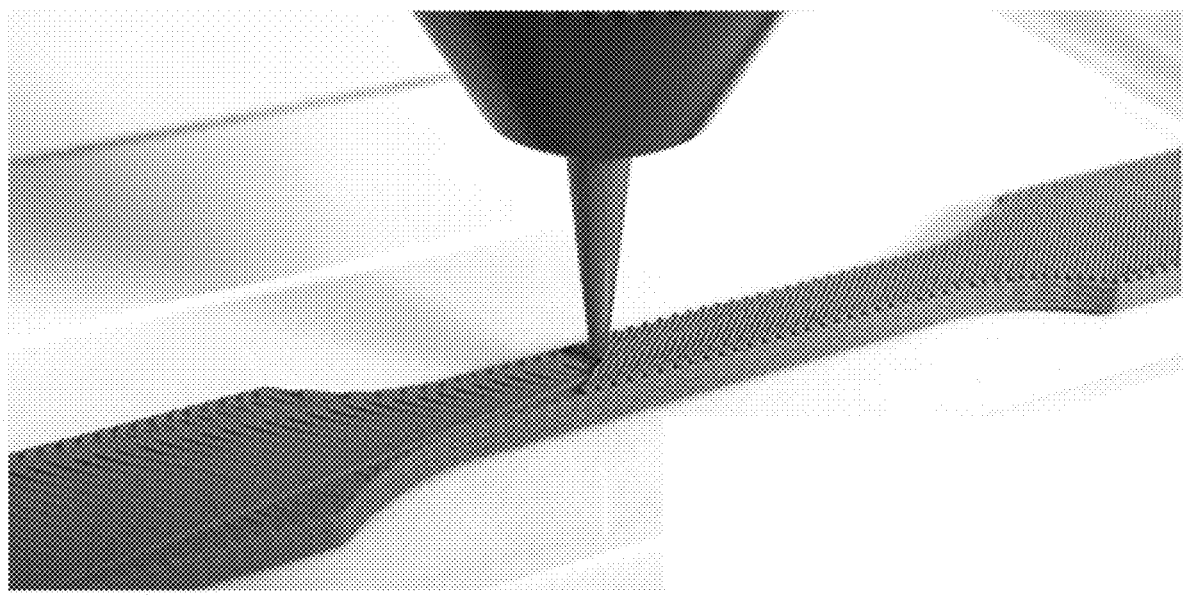
FIG. 7A) shows the printing of a tensile bar using a 95 wt. % HAS/PLA ink through a 250 μm inner diameter tapered nozzle at a printing speed of 10 mm/s.
Figure 7B:
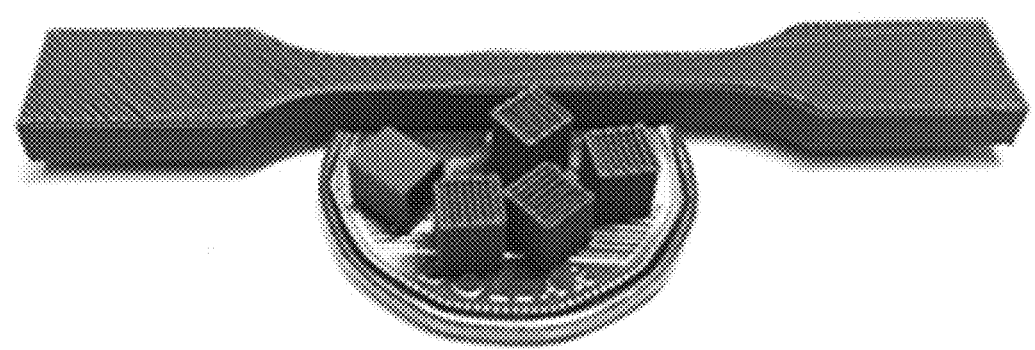
FIG. 7B) shows the tensile bar together with five 20-layer scaffolds placed on a Canadian dollar coin, all were printed using a 95 wt. % HAS/PLA ink through a 250 μm inner diameter tapered nozzle using a printing speed of 10 mm/s.

FIG. 7A) displays the printing process of a tensile bar. The ink uniformly and continuously flowed through the micronozzle under a constant pressure. No significant shape distortion was observed. FIG. 7B) shows several scaffolds and the tensile bar samples next to a Canadian dollar (diameter=26.5 mm). The fabrication time for the 20-layer scaffold and the fully-filly tensile bar were ~2 min and 30 min, respectively.

Figure 8A:
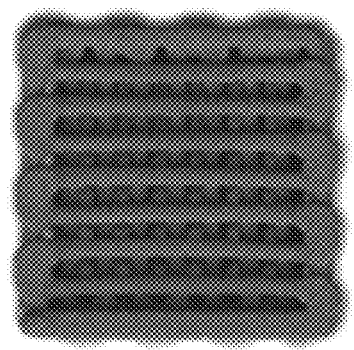
FIG. 8A) is a top view a 20-layer scaffold printed with a 95 wt. % HAS/PLA ink through a 250 μm inner diameter tapered nozzle using a printing speed of 10 mm/s.

FIGS. 8A) to C) shows optical images of a 20-layer scaffold from top, side, and oblique views, respectively. The center-to-center distance between neighboring filaments was 0.5 mm and the layer thickness was 0.2 mm. It was observed that the top layer of filaments perpendicularly stacked on the previous layer, by which all subsequent layers were completely overlapped (from top view). The creation of the complete overlap implied the accuracy of the printing. The side view optical image of the structure further shows good layer superposition. It illustrates, additionally, that the adjacent layers cohere together.

Figure 9:
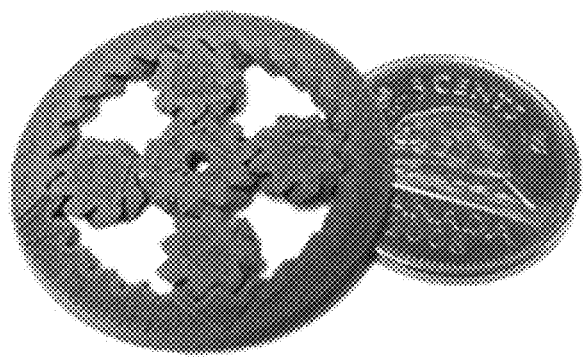
FIG. 9) shows a planetary gear printed with a 95 wt % HAS/PLA ink through a 250 μm inner diameter tapered nozzle using a printing speed of 10 mm/s; the gear is shown on top of a Canadian 5 cents coin.

A planetary gear consisting of 1 sun gear, 1 ring gear and 4 planet gears was fabricated. The planetary gear is shown in FIG. 9 next to a Canadian 5-cent coin (diameter=21.2 mm). The diameter of the ring gear was 30 mm. All the parts of the planetary gear were simultaneously printed and the printed structure required no assembly.

Figure 10A:
FIG. 10A) shows an as-printed replica of the Olympic stadium of Montreal printed with a 95 wt % HAS/PLA ink through a 250 μm inner diameter tapered nozzle using a printing speed of 10 mm/s.
Figure 10B:
FIG. 10B) is a photograph of the Olympic stadium of Montreal for comparison with the replica shown in FIG. 10A).

There is an overhung structure in the replica of the Olympic stadium showed in FIG. 10A) (comparative photograph shown in FIG. 10B)). The overhang part was printed without any additional supporting structures, and it did not bend or deform after printing (tower inclination of ~45'). Sintering and Secondary Metallic Infiltration To improve the mechanical properties and electrical conductivity, the as-printed metal/polymer composite structures were converted to metal and metal composites by sintering and copper infiltration. These heat-treatments were carried out in a laboratory electrical furnace. The heating and cooling rates were adjusted according to the temperature profiles (shown in FIGS. 2A) and B)). To prevent oxidation of the samples during the heat-treatments, a mixture of $H_2$ and Ar continuously flowed inside the quartz tube of the furnace.

Figure 11A:
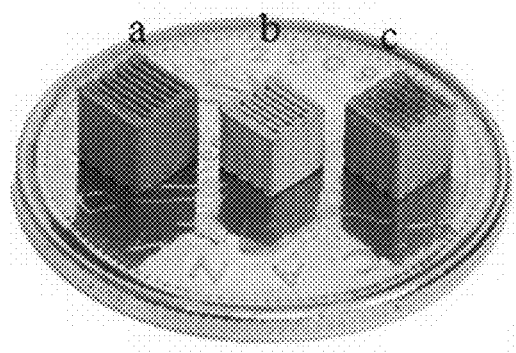
FIG. 11A) shows 20-layer scaffolds printed using a 95 wt. % ink and a 250 μm inner tapered nozzle using a printing speed of 10 mm/s, the scaffolds are on top of a Canadian 25-cent coin: from left to right, as-printed, sintered, and copper infiltrated scaffolds.
Figure 11B:
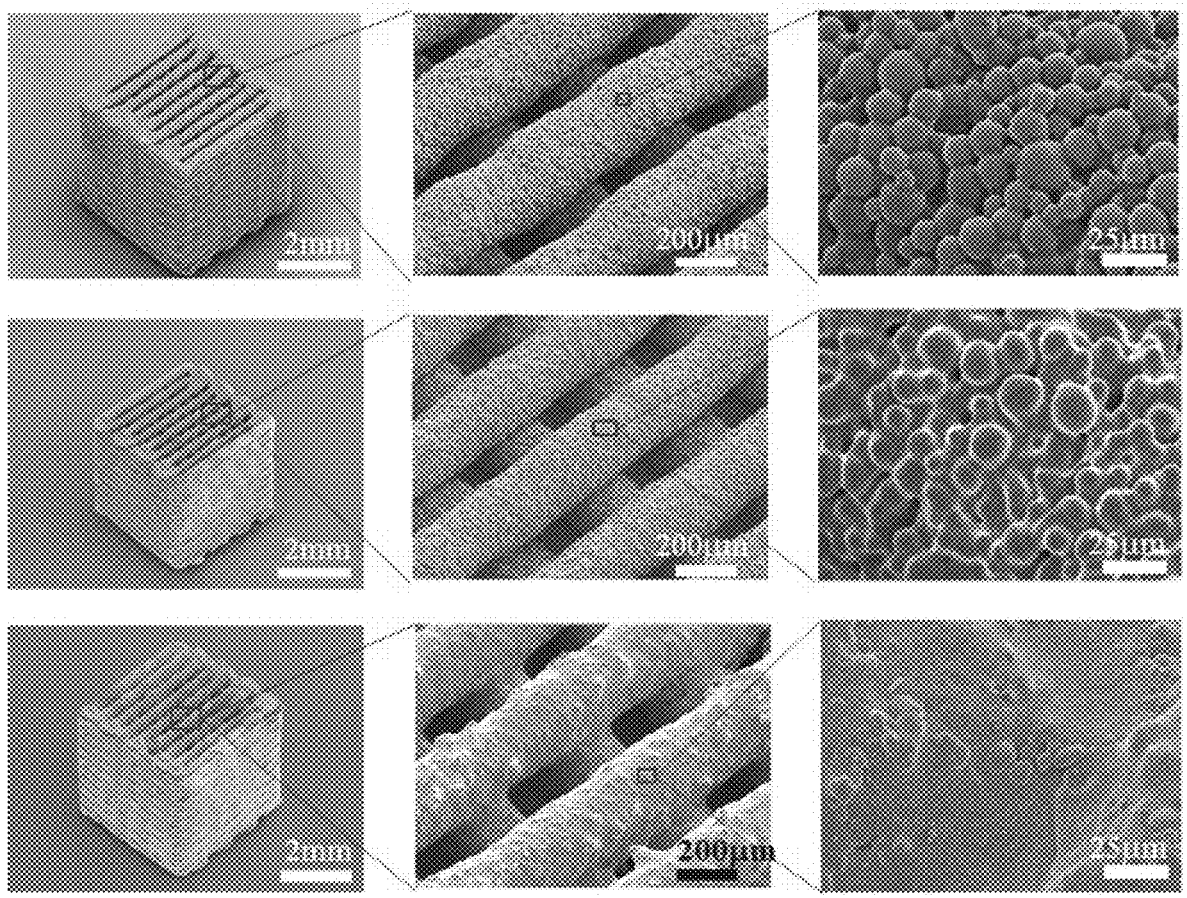
FIG. 11B) shows SEM images (left column) and their close-up views (middle and right columns) of 20-layer scaffolds printed with a 95 wt. % ink and a 250 μm inner tapered nozzle using a printing speed of 10 mm/s—from top row to bottom row: as-printed, sintered, and copper infiltrated scaffolds.

FIGS. 11A) and B) presents an optical and SEM images of the as-printed, sintered and copper infiltrated 20-layer scaffolds printed with 95 wt % ink and 250 µm tapered nozzle. The three types of scaffolds were placed next to each other on a Canadian dollar (FIG. 11A)). The as-printed scaffold had a dark gray color which turned to light gray after sintering. The sintered scaffold shrunk to ~84.9%±0.6% of the initial size, because the PLA was removed and the HAS particles were brought closer together. The copper infiltrated scaffold turned to brown red and its final dimension was reduced to ~88.6%±0.8% of the as-printed scaffold. The shrinkage observed for the copper infiltrated was slightly less compared to the sintered one probably due to either the shorter duration of the sintering or the extra thickness of copper. No oxidation was observed on the surface of the three scaffolds. No significant distortion happened to the scaffolds after sintering and copper infiltration. The SEM images of the as-printed filaments showed HAS particles were covered and linked together by the PLA binder (FIG. 11B)) and FIG. 1B)).

Figure 12:
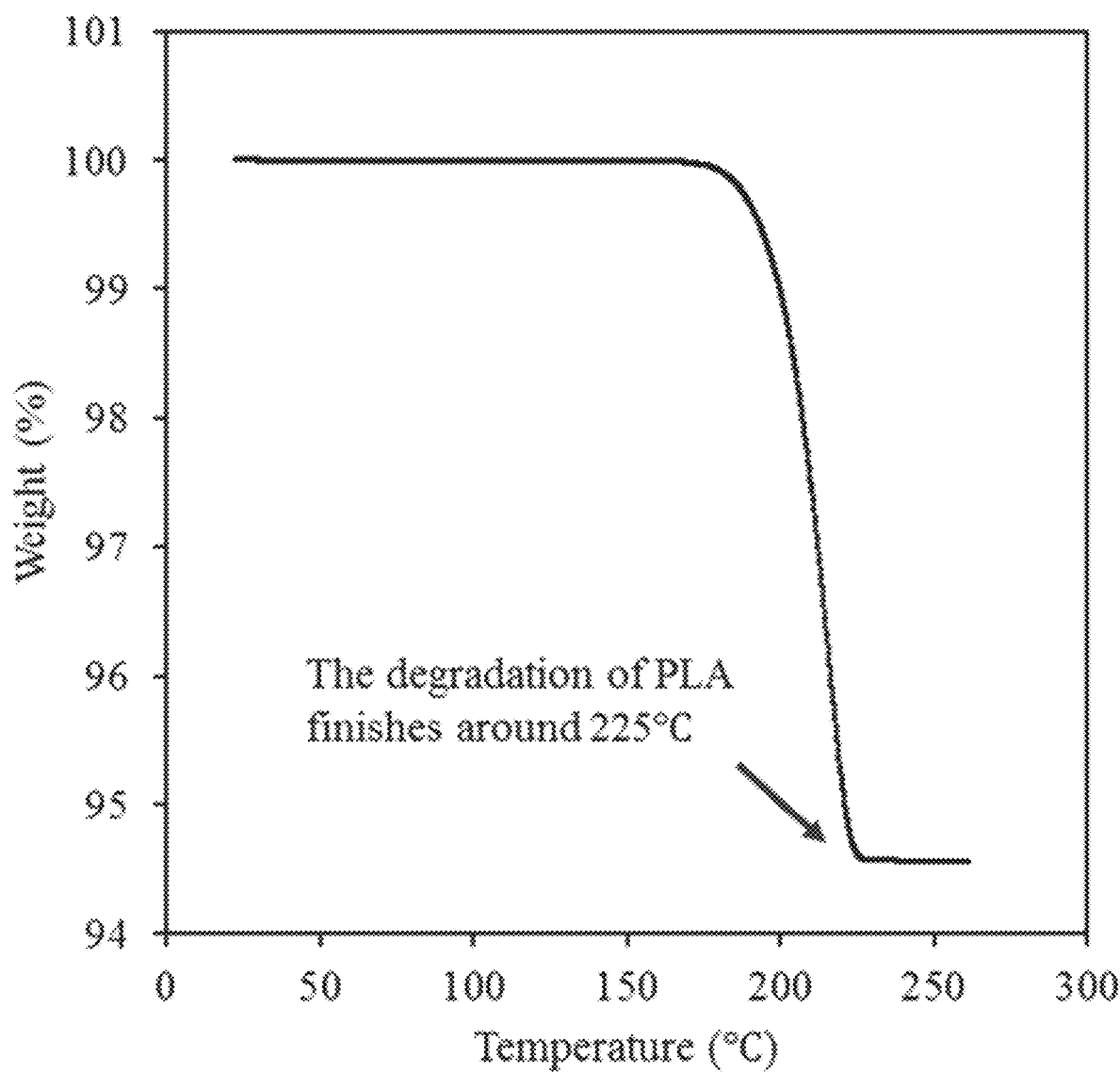
FIG. 12 shows the TGA results of a 95 wt. % HAS/PLA scaffold. The temperature was raised from 20° C. to 500° C. at a rate of 1° C./min (the same heating rate as the sintering process). The degradation of PLA finished before 225° C.

Before sintering, a debinding step was required to remove the PLA within the structure. The degradation temperature of the PLA in the samples was around 225° C., which was investigated by thermogravimetric analysis (TGA) on 95 wt. % HAS/PLA sample. The temperature was raised from 20° C. to 500° C. at a rate of 1° C./min (the same heating rate as the sintering process). As can be seen in FIG. 12, the degradation of PLA finished before at temperature of 225° C. was reached. The debinding temperature was thus set at 300° C. to ensure the complete degradation of PLA.

After debinding, the structure integrity was held by the friction forces between the HAS microparticles. The low heating rate (60° C./h) facilitated the PLA to fully degrade, and prevented the structures from collapsing due to the rapid disappearance of PLA binder. After debinding, the temperature was raised to 1165° C. and maintained for 6 h. This sintering temperature was set slightly lower than the melting point of HAS for the particles to connect through the apparition of necks between them. The size and amount of the necks increased gradually, which densified the sintered structure and reduced the pores. A long duration of 6 hours was set to ensure adequate sintering of the HAS particles and obtain a denser structure. In the sintered scaffold (FIG. 1B) and FIG. 8B)), the PLA was completely gone and the HAS particles directly connected with each other through the necks.

Figure 2B:
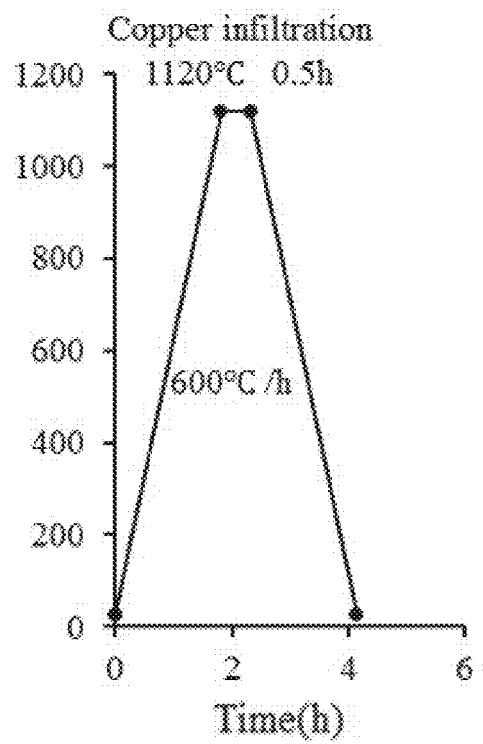
FIG. 2B) shows the temperature profile during copper infiltration.
Figure 8B:
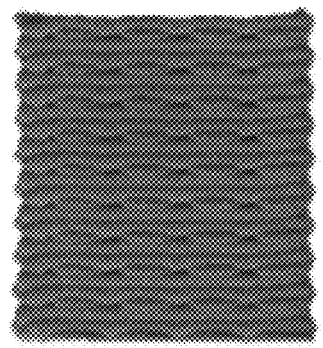
FIG. 8B) is a side view of a 20-layer scaffold printed with a 95 wt. % HAS/PLA ink through a 250 μm inner diameter tapered nozzle using a printing speed of 10 mm/s.
Figure 8C:
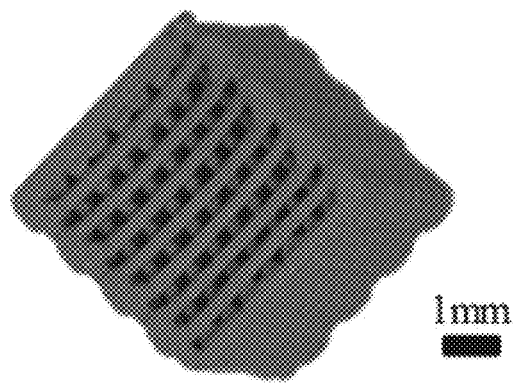
FIG. 8C) is an oblique view of a 20-layer scaffold printed with a 95 wt. % HAS/PLA ink through a 250 μm inner diameter tapered nozzle using printing speed of 10 mm/s. The scale bar shown applies to all of FIGS. 8A to 8C.

If the structure was prepared for copper infiltration, the sintering duration at 1165° C. was limited to 1 hour. This shorter sintering duration left more pores for melted copper to flow through the filaments. A piece of copper was placed on top of the sintered structures inside the furnace (FIG. 1B)). The furnace was heated at 1120° C. (see FIG. 2B)). This temperature was higher than the melting point of copper (1085° C.), but lower than the previously used sintering temperature. The amount of the copper was calculated by the porosity and the volume of the filaments in the sintered scaffolds. 10 vol. % extra copper was added to ensure that all the pores within the filaments were filled. Mainly driven by capillary forces, the melted copper filled the pores within the filaments of the structure and the sharp corners near connecting filaments (FIG. 8B).

Porosity Analysis of Sintered and Copper Infiltrated Samples

Figure 13:
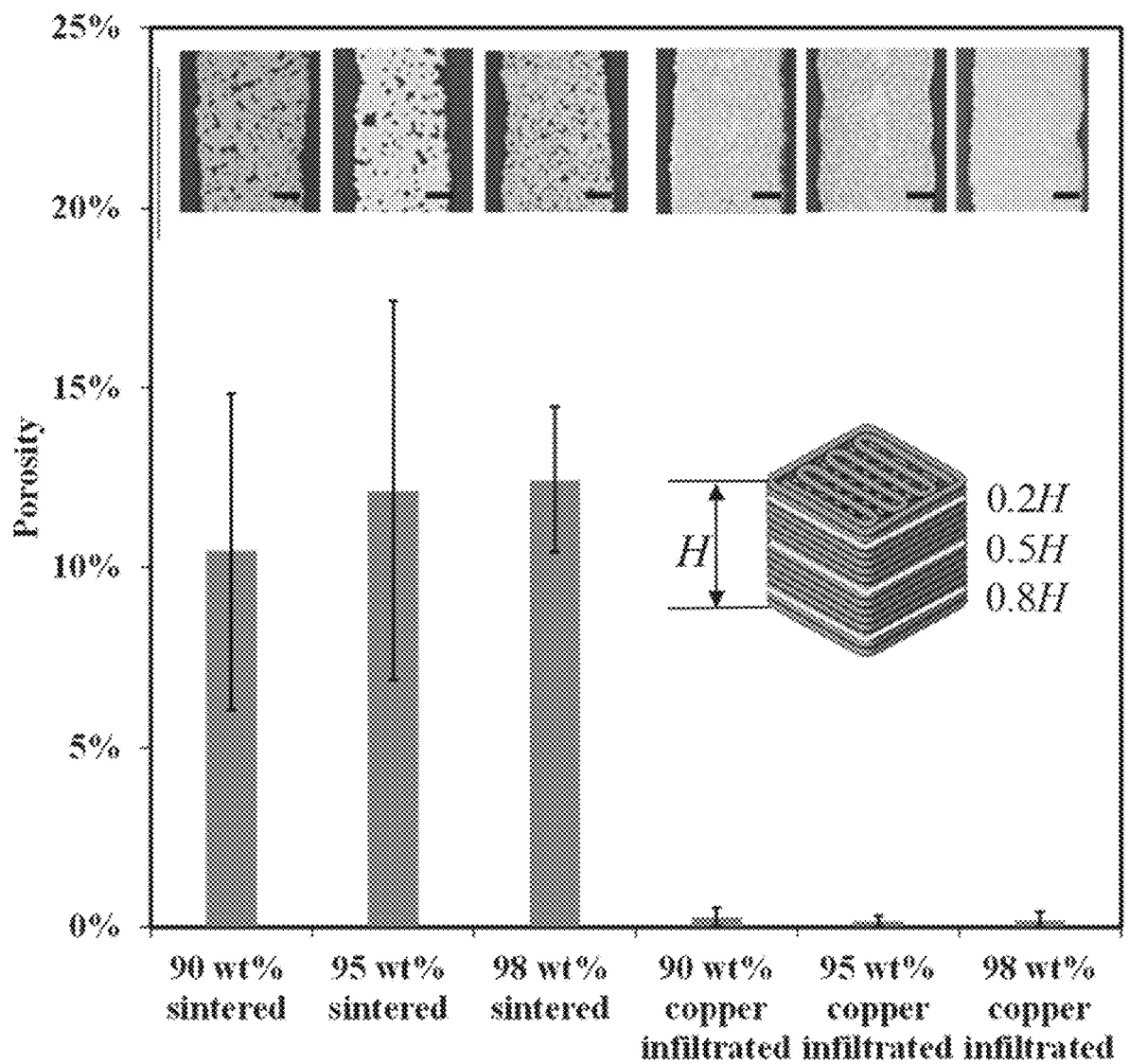
FIG. 13 shows the porosity of filaments in sintered and copper infiltrated 20-layer scaffolds for different ink concentrations, and optical microscope images of their polished cross sections at 0.5H (scale bar: 50 μm). Error bars indicate the standard deviations obtained from five samples.

The filament porosity of sintered and copper infiltrated structures affects the mechanical properties of the structures. To investigate the porosity, each scaffold was polished until reaching three different height positions of 0.2H, 0.5H, and 0.8H (H being the initial height of the scaffold). FIG. 13 shows a scheme of polishing positions, representative optical microscope images of the polished cross sections, and the average value of porosities of the sintered (6 h) and copper infiltration scaffolds. The first three columns represent the porosities of 90, 95, and 98 wt % sintered scaffolds, which were 10.4%±4.4%, 12.1%±5.3% and 12.4%±2.0%, respectively. The porosities of 90, 95 and 98 wt. % copper infiltrated scaffolds were extremely low and ranged from 0.2% to 0.3%. These are presented as the three columns on the right. This data is also shown in Table 2.

TABLE 2

Porosity analysis results of 90, 95 and 98 wt. % sintered (6 h) and copper infiltrated 20-layer scaffolds.

| Porosity | 90 wt. % | 95 wt. % | 98 wt. % |
| --- | --- | --- | --- |
| Sintered | 10.4% ± 4.4% | 12.1% ± 5.3% | 12.4% ± 2.0% |
| Copper infiltration | 0.3% ± 0.3% | 0.2% ± 0.1% | 0.2% ± 0.2% |

The microscope image of the polished cross section for each type of scaffold is displayed above each of the column. In the sectional images of sintered scaffolds, we observe that the copper only filled the pores inside the filament, while no large amount copper was outside the filament Thus, the infiltration flow was limited within the porous filaments rather than in the empty space between filaments (i.e. interfilamentous pores). The pores had similar sizes and were uniformly distributed within the filament. It is noted that the pores in 98 wt. % sintered scaffold were greater in quantity but smaller in size compared to the others, which resulted in the smaller error bars. The difference of measured porosities among the three types of sintered scaffolds was lower than 2% despite their different metal to polymer ratios. This can be explained by the densification of the structure at the debinding stage. The polymer was removed and the adjacent HAS particles were brought to similar distances before the sintering was completed. For the copper infiltrated scaffolds, it is observed from the microscope images that the melted copper almost completely filled the porous HAS filaments.

Electrical Properties of Sintered and Copper Infiltrated Samples

To assess the electrical properties of fabricated structures, the conductivities of sintered and copper infiltrated rods were measured using the four-point probe technique. The conductivity of the sintered samples was $(6.24\pm0.18)\times10^5$ S/m, which is 45% of that of the bulk stainless steel ($1.4\times10^6$ S/m[38]). The relatively lower value is attributed to the pores in the sintered structures. The copper infiltrated sample had a conductivity of $(1.42\pm0.32)\times10^6$ S/m. As copper is more conductive than steel, the conductivity of the sample was further improved after infiltration with copper.

Figure 14:
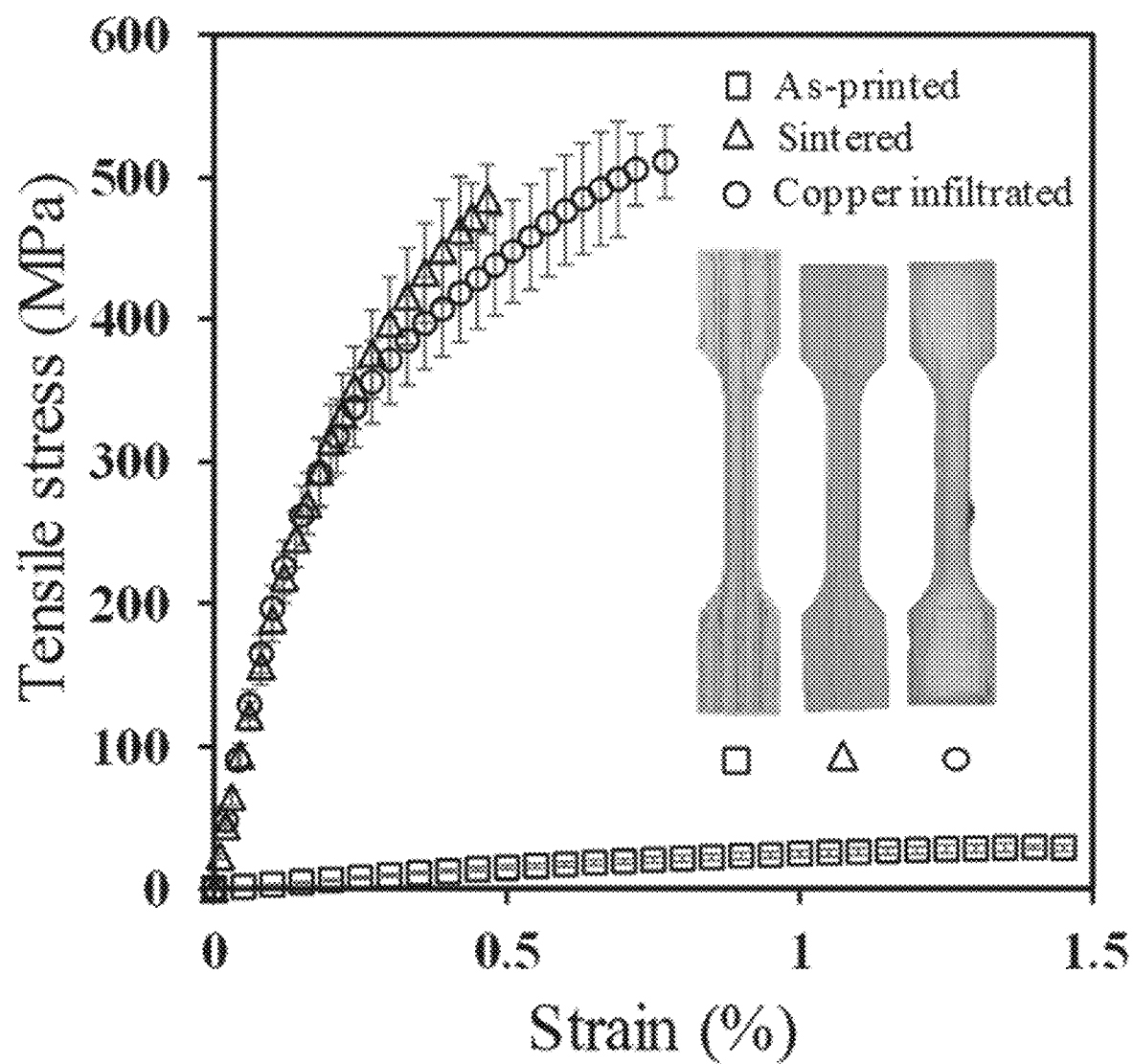
FIG. 14) shows the tensile mechanical response for as-printed, sintered and copper infiltrated 3D printed tensile bars. Error bars indicate the standard deviations obtained from three samples.
Figure 15A:
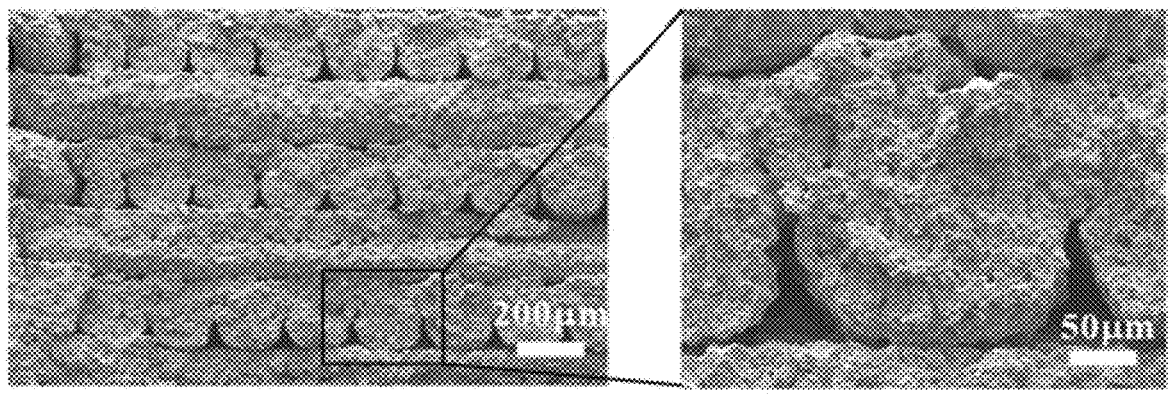
FIG. 15A) shows the tensile fracture surface of a sintered tensile bar at low and high magnifications.

Mechanical Characterization of as-Printed, Sintered and Copper Infiltrated Samples Tensile tests were carried out on as-printed, sintered and copper infiltrated tensile bars to evaluate their mechanical properties. FIG. 14 shows the tensile curves, optical images of representative tested bars and FIGS. 15A) and B) show SEM observations of the tensile fracture surfaces. The Young's modulus E, Ultimate Tensile Strength (UTS) and Elongation (%) were determined from the tensile curves presented in FIG. 14. See Table 3 for more details on the tensile results.

TABLE 3

Tensile test results of 95 wt. % as-printed, sintered and copper infiltrated tensile bars compared with:

|  | E [GPa] | UTS [MPa] | Elongation [%] |
|---|---|---|---|
| As-printed sample | 3.1 ± 0.3 | 28.0 ± 3.0 | 1.45 ± 0.10 |
| Sintered sample | 196 ± 16 | 485 ± 70 | 0.47 ± 0.06 |
| Copper infiltrated sample | 195 ± 16 | 511 ± 57 | 0.77 ± 0.07 |
| Wrought stainless steel: SS-316 (1) | 193 | 515 | 30 |
| PM steel stainless steel: SS-316N2-38 (2) | 140 | 480 | 13 |
| PM steel FC-0208-60 (3) | 155 | 520 | <1 |
| Cu infiltrated PM steel: FX-2008-60 (4) | 145 | 550 | 1 |

(1) Wrought stainless steel (from D. Peckner, Handbook of stainless steels, 1977, incorporated herein by reference),
(2) Nitrogen alloyed, high strength, medium elongation, sintered at 1290° C. (2350° F.) in dissociated ammonia (from J. R. Davis, K. M. Mills, S. R. Lampman, Metals handbook. Vol. 1. Properties and selection: Irons, steels, and high-performance alloys. *ASM international, Materials Park, Ohio 44073, USA*, 1990, 1063, incorporated herein by reference),
(3) PM steel containing 0.8% carbon and 2% copper (from J. R. Davis, K. M. Mills, S. R. Lampman, Metals handbook. Vol. 1. Properties and selection: Irons, steels, and high-performance alloys. *ASM International Materials Park, Ohio 44073, USA*, 1990, 1063, incorporated herein by reference), and
(4) Copper infiltrated steel containing 0.8% carbon (from J. R. Davis, K. M. Mills, S. R. Lampman, Metals handbook. Vol. 1. Properties and selection: Irons, steels, and high-performance alloys. *ASM International, Materials Park, Ohio 44073, USA*, 1990, 1063, incorporated herein by reference).

The E modulus increased (by ~63 times) from 3.1 GPa for the as-printed bars to 196 GPa and 195 GPa after sintering and copper infiltration, respectively. The stiffness achieved is an indication that sintering and copper infiltration are effective and that strong metallic bonds between individual particles are created. The high modulus of the 6 h sintered bars was attributed to the dense HAS microstructure. Besides, the copper infiltrated bars were only sintered for 1 h creating a porous and more compliant HAS microstructure. However, since the pores were subsequently filled with copper, the effective modulus raised to the same level as the sintered bars. The E modulus obtained after sintering and copper infiltration was similar to those of wrought and cast steels (see J. R. Davis, K. M. Mills, S. R. Lampman, Metals handbook. Vol. 1. Properties and selection: Irons, steels, and high-performance alloys. *ASM International, Materials Park*, Ohio 44073, USA, 1990, 1063, incorporated herein by reference). The UTS also increased (by 17-18 times) from 28 MPa for the as-printed bars to 485 MPa and 511 MPa after sintering and copper infiltration, respectively. These UTS values are similar to those obtained for carbon steels, stainless steels, tools steels and highly-alloyed cast irons (see J. R. Davis, K. M. Mills, S. R. Lampman, Metals handbook. Vol. 1. Properties and selection: Irons, steels, and high-performance alloys. *ASM International, Materials Park*, Ohio 44073, USA, 1990, 1063, incorporated herein by reference). The rather low ductility of the sintered and copper infiltrated tensile bars was partly explained by the composition of the HAS material. The large volume fraction of carbides results in elongation at break lower than 1%. Such elongation values are also typical of some tool steels, highly alloyed cast irons (elongation 1-10%, from J. R. Davis, K. M. Mills, S. R. Lampman, Metals handbook. Vol. 1. Properties and selection: Irons, steels, and high-performance alloys. *ASM International, Materials Park*, Ohio 44073, USA, 1990, 1063, incorporated herein by reference) and many Powder Metallurgy (PM) steel parts (0-3%, —from R. G. P. I. Molding, I. Pressing, Metal Powder Industries Federation, Princeton, N.J., 1990, 3-22, incorporated herein by reference).

Figure 15B:
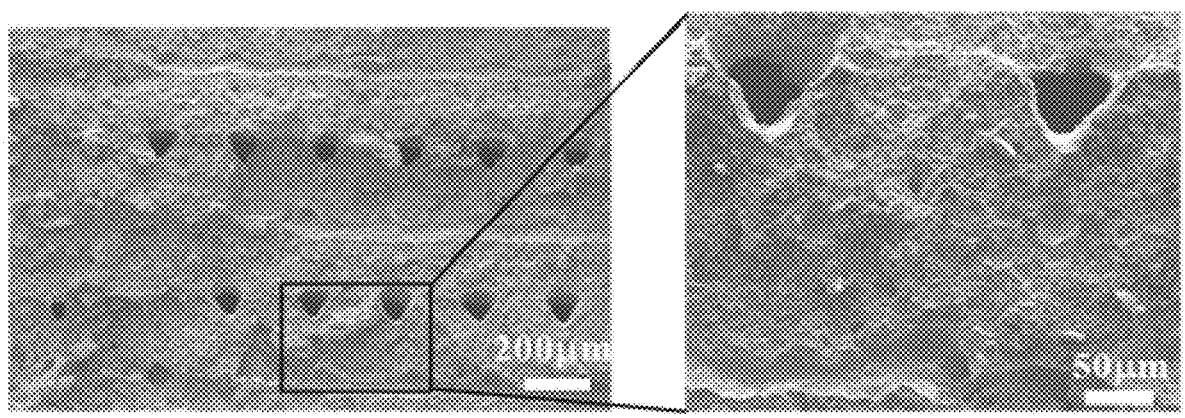
FIG. 15B) shows the tensile fracture surface of a copper infiltrated tensile bar at low and high magnifications.

The SEM images of tensile fracture surfaces (FIGS. 15 A) and B), left) show the internal structure of the sintered and copper infiltrated tensile bars. The tensile fracture always occurred at the interface of the filaments oriented transverse to the tensile directions, as the stress was maximal at this point. This also explains the lower e, value compared to bulk stainless steel (68.2%). The high magnification SEM images (FIGS. 15 A) and B), right) reveal the details of tensile fracture surface. There were visible pores, under SEM, within the filaments of sintered tensile bars. In addition, the filament from adjacent layers are firmly bound, while some filaments from the same layer are detached. This is the man reason why the ductility of the samples is lower compared to the bulk stainless steel.

Conclusions

In summary, we develop a method of fabrication of fully-dense 3D metallic structures consisting of the solvent-cast 3D printing and the following heat-treatments. The Young's modulus of fabricated structures was up to 195 GPa and approached typical values for similar bulk material while the conductivity was $1.62\times10^6$ S/m, which is superior to the structures fabricated by most commercial 3D printing techniques—see M. M. Dewidar, K. A. Khalil, J. K. Lim, *Trans. Nonferrous Met. Soc. China*, 2007, 17(3), 468-473; M. M. Dewidar, K. W. Dalgarno, C. S. Wright, *Proc. Inst. Mech. Eng., Part B*, 2003, 217(12), 1651-1663; and K.

Kempen, E. Yasa, L. Thijs, J. P. Kruth, J. Van Humbeeck, *Phys. Procedia,* 2011, 12, 255-263, all of which are incorporated by reference.

Example 2—Inks Containing Chitosan

In a manner similar to Example 1, we produced an ink containing chitosan (90% deacetylated, weight average molecular weight=207 kDa, from Biolog in Germany) as the polymer instead of PLA. The chitosan (CHI) was provided as a gel in water comprising with 80 vol/vol % acetic acid (AA), the % being based on the total volume of the water.

The ink comprised 0.8 g CHI per 10 mL AA aqueous solution and comprised the HAS microparticles of Example in a HAS:CHI solution weight ratio of 6.5:1.

These inks were successfully solvent-cast 3D printed with an applied pressure of 0.6 to 1.2 MPa, a platform speed of 5 mm/s using nozzles of 200 and 250 microns.

Example 3—Inks Containing Copper Particles

9 In a manner similar to Example 1, we produced inks containing 20 µm copper particles instead of HAS particles.

The inks comprised 20 w/w % of PLA/solvent (DCM) and 90 w/w % of the copper particles.

These inks were successfully solvent-cast 3D printed using an applied pressure of 0.7-1.4 MPa, a speed of 10 mm/s, and a nozzle of 250 microns.

The polymer was then removed from the 3D printed material, which was then successfully sintered.

Example 4—Inks Containing Chitosan

An environment-friendly and reusable metallic ink has been developed. The metallic ink was composed of steel micro powders, a biodegradable polymer: chitosan, acetic acid and deionized water. The metal 3D printing method consisted of (i) 3D printing of metallic structures using the metallic ink at room temperature, (ii) thermal treatments on the as-printed structures that decompose the polymer binder and sinter the steel powders, and (iii) an optional step: infiltrating melted copper into the sintered structures to achieve fully dense metal/metal hybrid structures. We demonstrated that any incorrectly built as-printed structures and scrap materials can be recycled and reused for 3D printing by dissolving them again in acetic acid. The fabricated structures featured a low filament porosity of 1.0% which enabled high properties such as an electrical conductivity of 1.3×106 S/m and a Young's modulus of 160 GPa. The metallic ink can be used for the 3D printing of high performance metallic structures while demonstrating a low environmental impact and a very effective utilization of metallic materials.

Figure 16A:
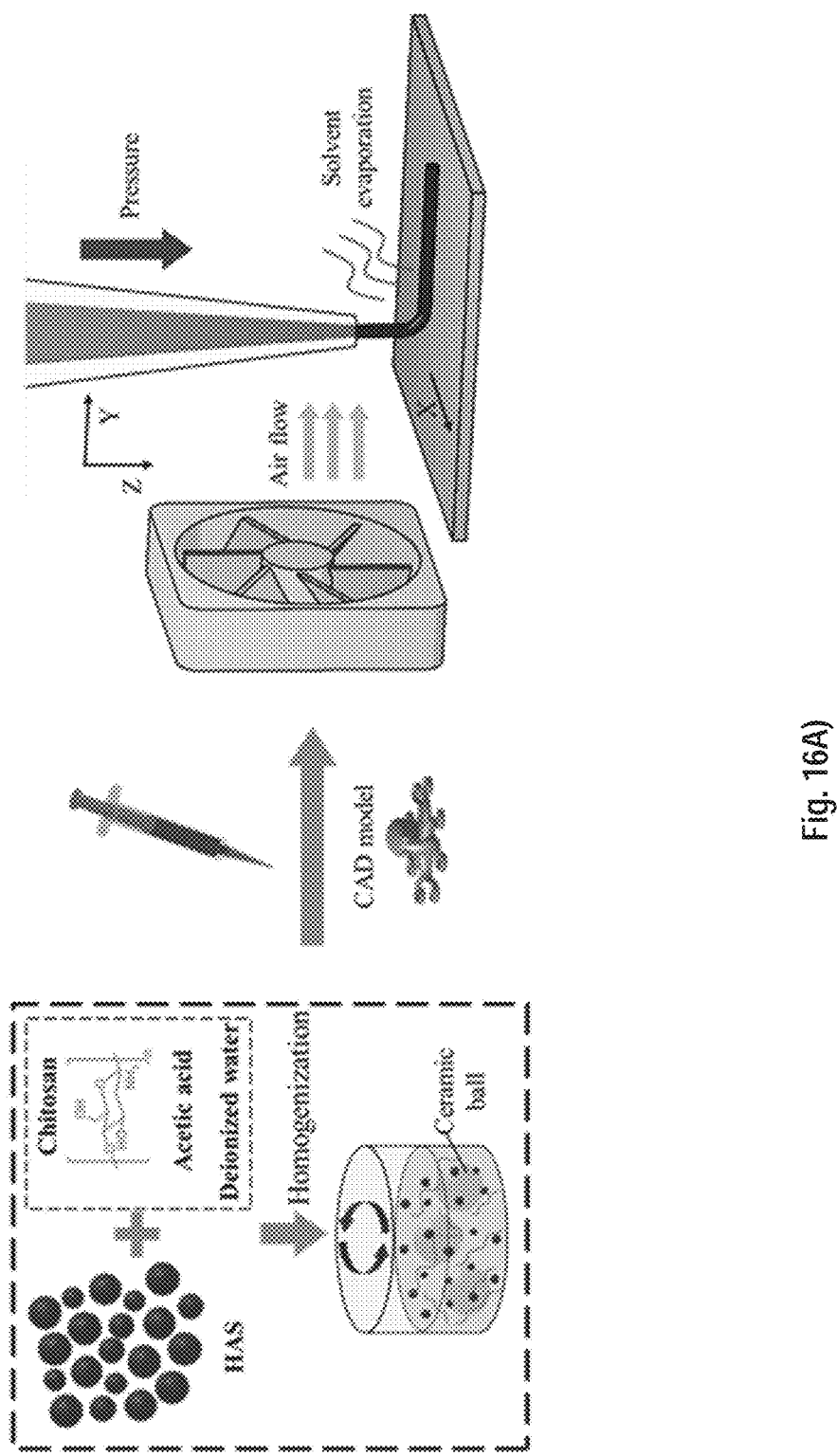
FIG. 16A) is a schematic of the fabrication process of a 3D metallic structure beginning with metallic ink preparation (left: HAS powders are mixed with chitosan/acetic acid solution using a ball mill machine), followed by solvent-cast 3D printing (right, the metallic ink is loaded in a syringe and extruded through a micro nozzle under a certain pressure at room temperature). The solvent content evaporates upon extrusion assisted by the flow of air.
Figure 16B:
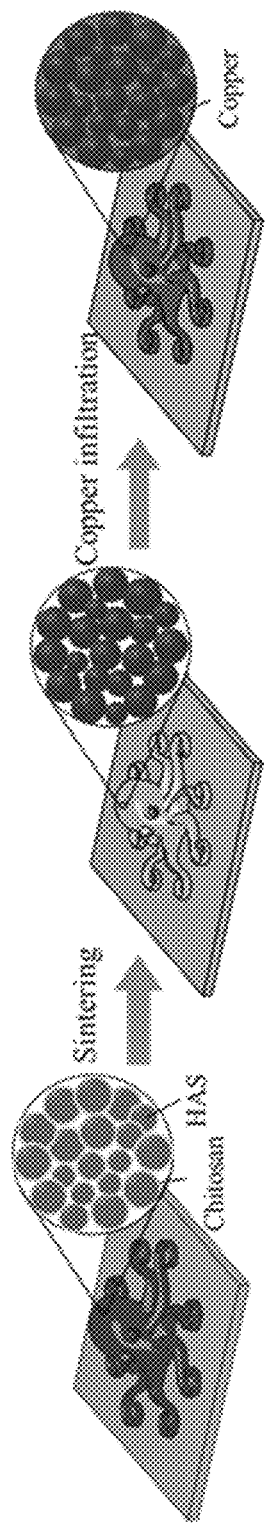
FIG. 16B) is a schematic of the remainder of the fabrication process of a 3D metallic structure and shows the subsequent thermal treatments under $Ar/H_2$ in which the dried as-printed sample is thermally treated in a furnace (left), then the polymer is thermally decomposed and the HAS powders are sintered (middle), and finally the sintered sample is infiltrated with melted copper, which fills the pores in the sintered filaments driven mainly by capillary forces (right).

More specifically, we developed an environment-friendly and reusable metallic ink compatible with the SC-3DP approach and subsequent thermal treatments (see FIGS. 16A) and B)). Highly alloyed steel (HAS) powders were uniformly mixed with a water-based polymer solution using a ball mill machine. The metallic paste, referred to the ink, was loaded into a syringe barrel and extruded through a tapered micro nozzle under a specific pressure at room temperature. A fan blew air over the extruded ink filament to accelerate solvent evaporation during the extrusion. The ink filament was then deposited using a 3-axis robot at the specific coordinates according to the CAD model to create a 3D object. The as-printed sample is a hybrid metal/polymer 3D structure. After the part was left to dry at ambient conditions for four hours, it was thermally treated in an atmosphere containing Ar and $H_2$. The final product was a metal structure where the filament porosity can be tailored by the sintering duration—see E. Peng, X. Wei, T. S. Herng, U. Garbe, D. Yu, J. Ding, Ferrite-based soft and hard magnetic structures by extrusion free-forming, *RSC Adv.,* 2017, 7, 27128-27138, incorporated herein by reference. A fully dense metallic structure is obtained by a copper infiltration process where the melted copper fills the pores inside the sintered filaments driven by capillary forces.

Experimental Section

Ink Preparation

Chitosan was dissolved in an acetic acid water solution (80 vol. % acetic acid and 20 vol. % deionized water). The chitosan was 90% deacetylated with an average molecular weight of 207 kDa, from Biolog in Germany. The acetic acid was purchased from Sigma-Aldrich and used as received. The chitosan solution was mixed using a ball mill mixer (8000M mixer/Mill, SPEX samplePrep) for 10 min. After mixing, it was sealed and stored in the fridge. The metallic ink was prepared by mixing HAS powders and chitosan solution using the ball mill for 5 min.

3D Printing 3D printing was performed using a computer-controlled 3-axis positioning robot (I&J2200-4, I&J Fisnar) and a pressure dispensing system (HP-7X, EFD). The metallic ink was loaded into a syringe (3 mL, Nordson EFD) attached with a smooth-flow tapered nozzle (exit inner diameter=250 µm). The structures are printed on a glass slide (PN 16004-422, VWR) with a thin layer of petroleum jelly (VSL-32600) as releasing agent. All the structures in this work were printed at a linear printing speed of 7 mm/s and under a pressure around 0.7 MPa, with an airflow system (a computer cooling fan, DC 12V, 0.44 A, 20 cm from the deposition nozzle). The layer height was 200 µm, 80% of the nozzle inner diameter. The layer thickness compensated the filament reduction induced by solvent evaporation and guaranteed secure, tight bonding between neighboring layers. The CAD models were either designed by a CAD software (CATIA) or downloaded from internet (thingiverse.com). They were sliced into several layers and interpreted into G-code by a slicing software (Simplify3D). Then, the G-code was converted into a point-to-point program that could be read by the JR Points software to control the positioning robot.

Thermal Treatments

The as-printed samples were thermally treated in a laboratory electric tubular furnace (59256-P-COM, Lindberg) on a ceramic substrate. The samples were prevented from oxidation by a circulated gas flow (97.5% Ar and 2.5% $H_2$, flow rate=2 L/min) inside the quartz tube. The samples were heated to 400° C. at a rate of 60° C./h, held for 1 h for debinding, and then heated to 1165° C. at a rate of 600° C./h, held for 3 h for sintering. If needed, the sintered samples were then copper infiltrated at 1120° C. for 1 h at a heating rate of 600° C./h by placing a piece of infiltrating copper on the top. The amount of the copper was determined by the filament porosity and filament volume.

Porosity Analysis

The sintered and copper infiltrated scaffolds were sealed in a resin (EpoFix resin, Struers) block. The resin block was polished until the horizontal cross section was visible. The cross section was observed using an optical microscope (Zeiss Axioplan EL-Einsatz) and the amount of porosity was determined by an image analysis software (Clemex, ST-2000). The filament porosity was calculated as the ratio of void area inside the filament over the filament area. Ten cross sections of each sample are analysed.

Electrical Conductivity Measurement

Figure 17A:
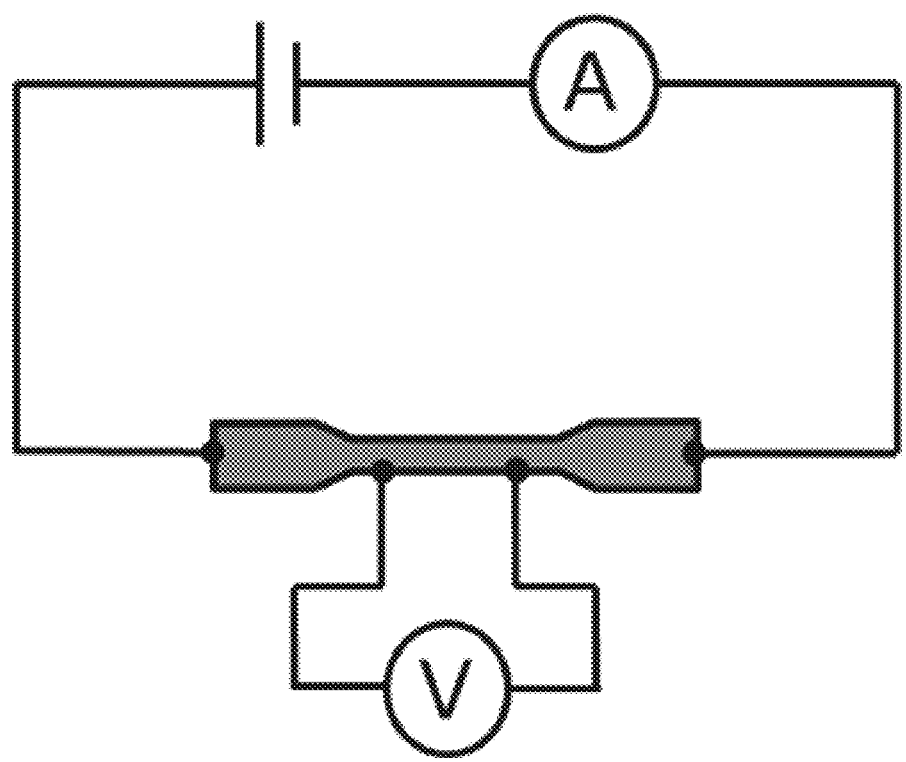
FIG. 17A) shows the circuit diagram of the setup used for the electrical conductivity measurement using the four-point probes method.
Figure 17B:
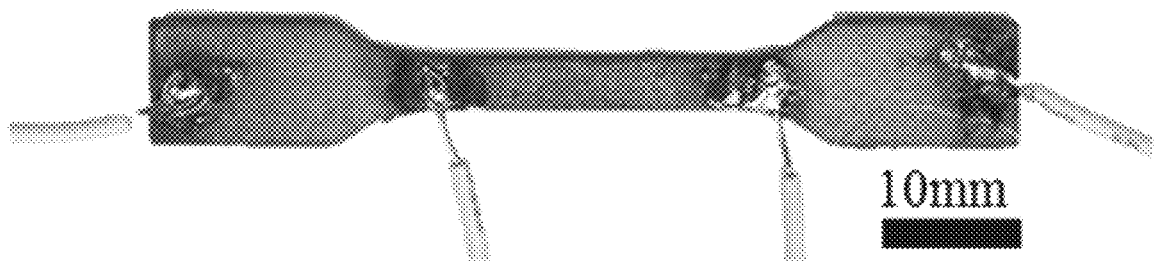
FIG. 17B) shows a representative sample undergoing electrical conductivity measurement using the four-point probes method.

The electrical conductivities of the sintered and copper infiltrated samples were measured using four-point probes method. The circuit diagram and a representative sample are shown in FIGS. 17A) and B). A constant voltage of 0.1 V is provided by a power supply (Agilent, E3633A). The current and voltage are acquired by two multimeters (HP, 3457A). Five specimens of each sample type are tested.

Tensile Test

The samples were sintered and copper infiltrated tensile bars, of which the cross section of the neck was ≈3.6×1.6 mm. The tensile tests were carried out on a MTS Insight machine with a 50 kN load cell (MTS 569332-01) at a crosshead speed of 1 mm/min and using an extensometer (gauge length=8 mm, MTS 632.26, C-20). Five specimens for each sample type were tested.

Results

The metallic material was a highly alloyed steel (HAS) micro powder with a spherical shape and a diameter less than 20 µm. The spherical shape and the relatively small size enabled low frictional forces between the micro powders and prevented the metallic ink from clogging the micro nozzle. Chitosan, a biocompatible polymer, could be dissolved in an acidic solution. Acetic acid is a volatile, organic, weak acid. Chitosan could be dissolved in an acetic acid water solution as a viscous hydrogel. Acetic acid is biocompatible and evaporates rapidly in ambient conditions. Those features made chitosan/acetic acid a great binder system for metal 3D printing.

0.8 g chitosan was dissolved in 10 mL 80 vol. % acetic acid/deionized water. The chitosan/acid solution is mixed with HAS powders at a weight ratio of 1:6.5. The detailed ink composition is summarized in Table 4.

TABLE 4

Metallic ink composition for accurate printing

| Constituent | Density (g/ml) | Mass fraction | Volume fraction |
| --- | --- | --- | --- |
| Chitosan | 1.4* | 1.0% | 2.9% |
| Acetic acid | 1.05 | 10.0% | 40.8% |
| Deionized water | 1 | 2.4% | 10.2% |
| HAS powders | 8.05 | 86.7% | 46.1% |
| Total | 4.28 | 100.0% | 100.0% |

*The density of chitosan is the apparent density of chitosan in the as-printed sample.

Note that the addition of excessive polymer binder can result in incomplete dissolution of the binder. Part of the chitosan can remain solid, which can cause dogging of the micro nozzle. On the other hand, insufficient amounts of polymer binder can lead to brittle as-printed samples. Further, excessive water can increase the duration of solidification and result in sagging and shape deformation of the extruded ink filament mostly due to the slower evaporation rate of water compared to acetic acid. On the other hand, insufficient water can prevent the ionization of hydrogen ions from acetic acid, which can cause the incomplete dissolution of polymer.

Figure 18:
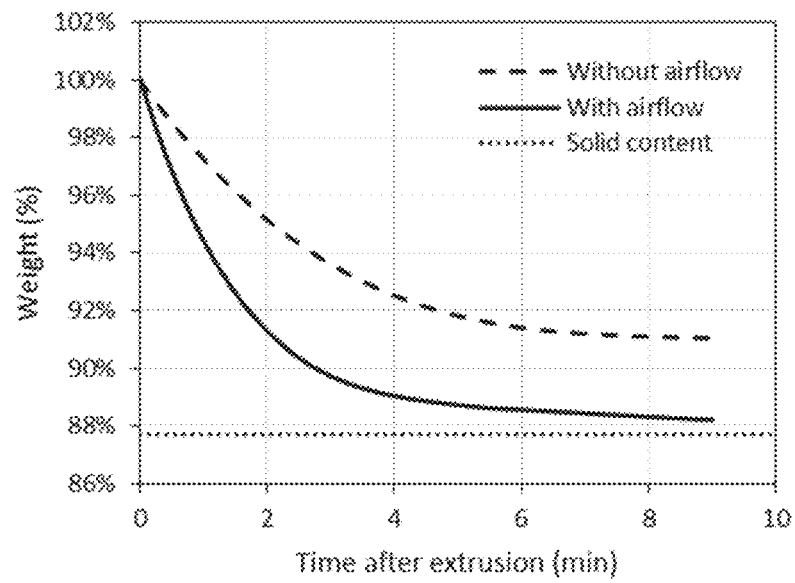
FIG. 18 shows the weight of the extruded filament as a function of time after extrusion with and without airflow.
Figure 19:
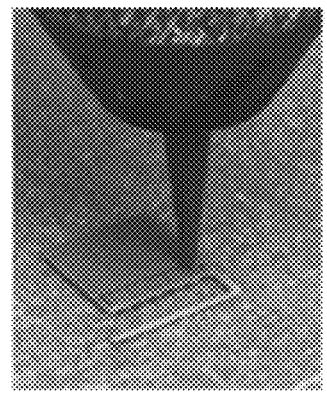
FIG. 19 shows the printing of CHI scaffolds (top) and the as-printed scaffolds (bottom) with and without the airflow system.
Figure 19:
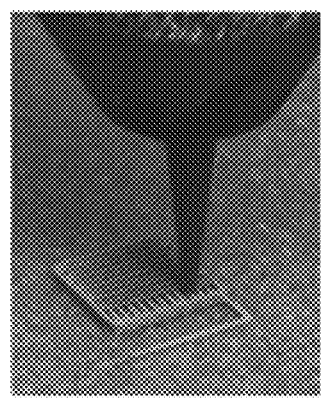
Figure 19:
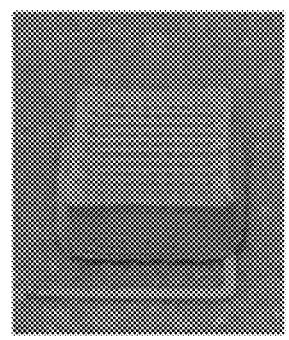
Figure 19:
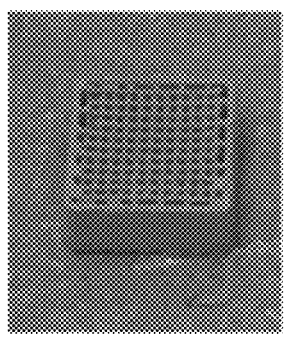
Figure 20A:
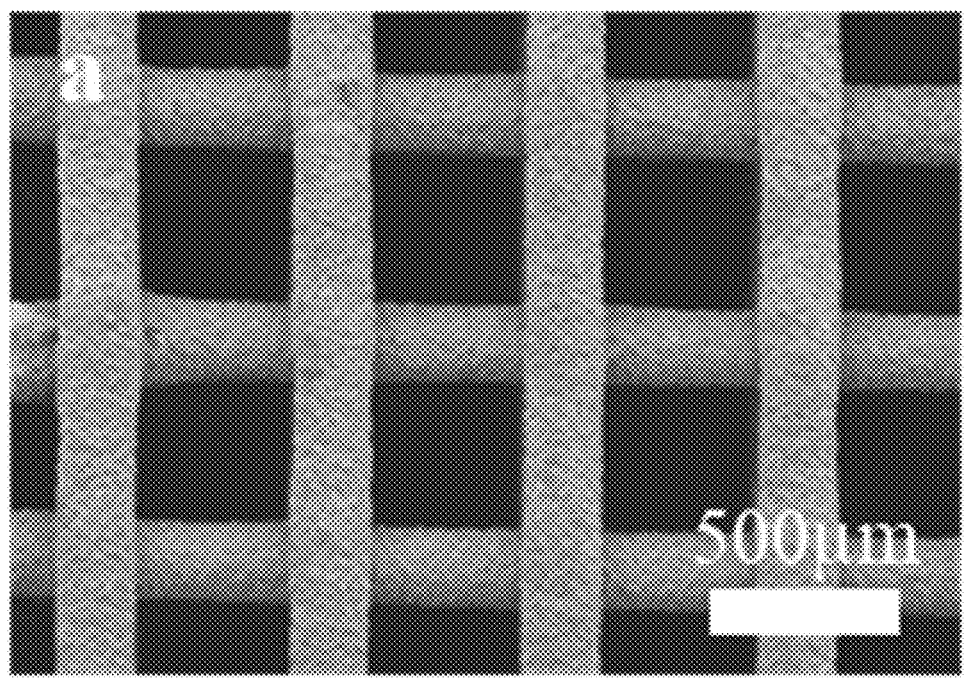
FIG. 20A) is a SEM image of an as-printed CHI scaffold (tapered nozzle: 250 μm in diameter).
Figure 20B:
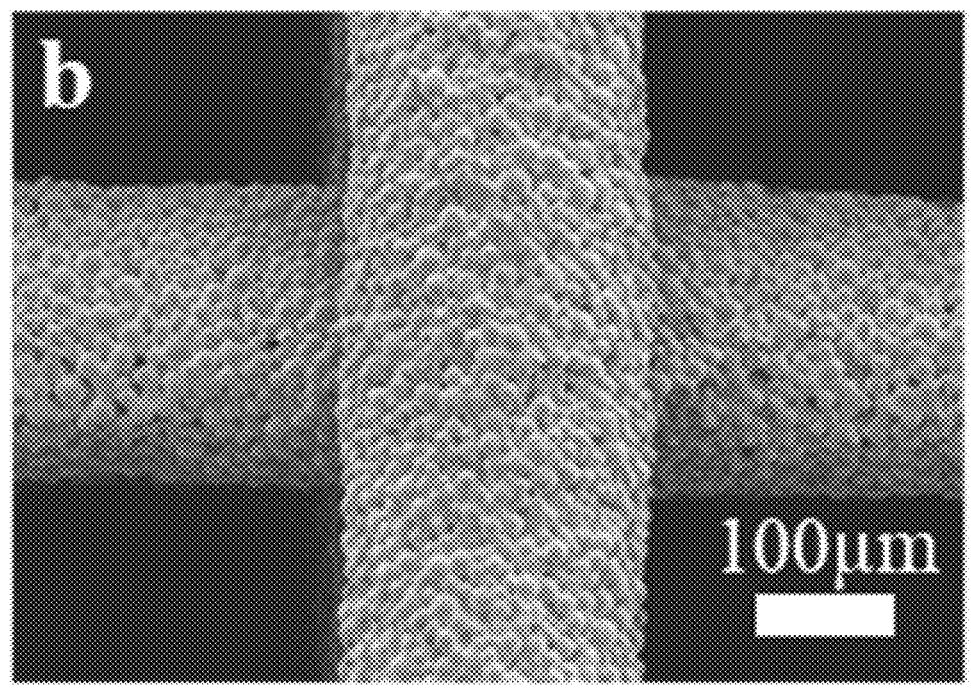
FIG. 20B) is a higher magnification SEM image of the as-printed CHI scaffold shown in FIG. 20A).
Figure 20C:
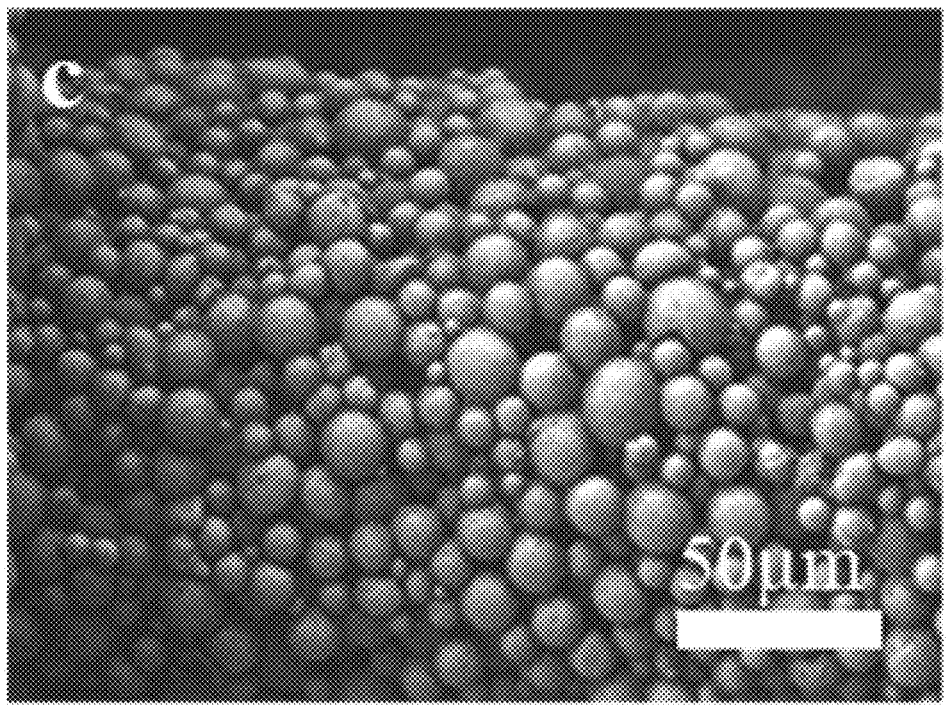
FIG. 20C) is a higher magnification SEM image of the as-printed CHI scaffold shown in FIG. 20B).
Figure 20D:
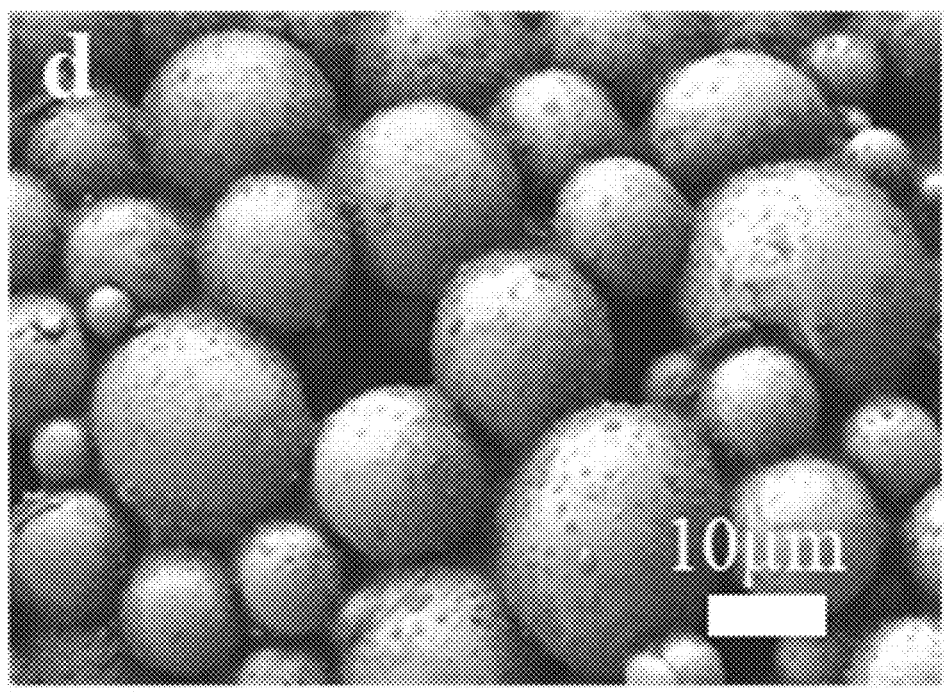
FIG. 20D) is a higher magnification SEM image of the as-printed CHI scaffold shown in FIG. 20C).
Figure 20E:
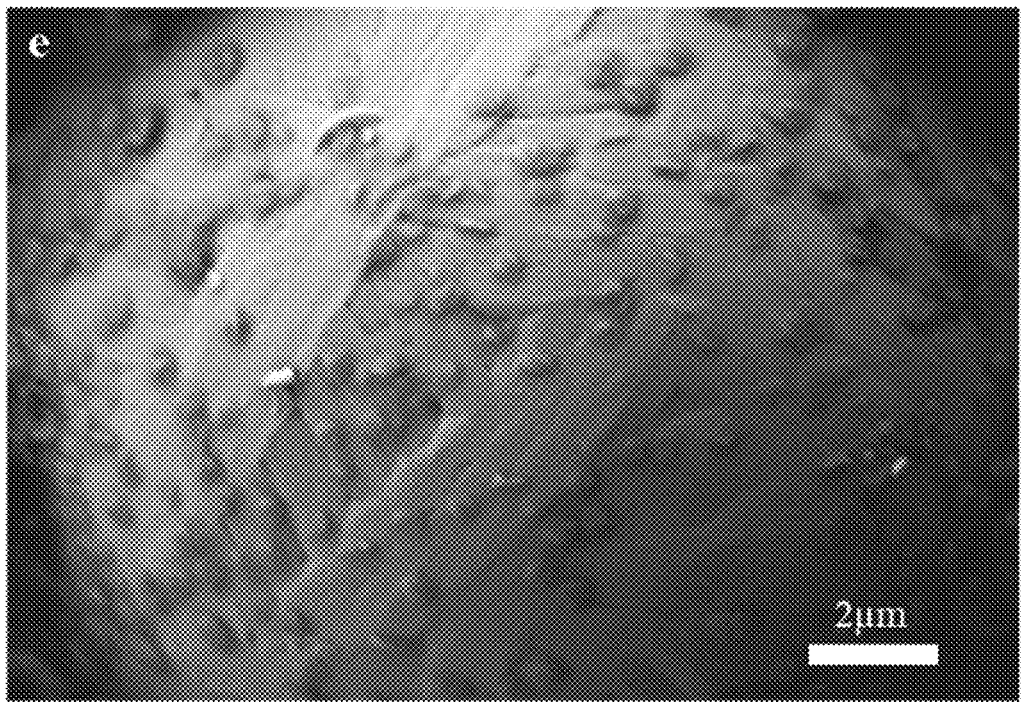
FIG. 20E) is a higher magnification SEM image of the as-printed CHI scaffold shown in FIG. 20D).

The metallic ink was printed while a fan was blowing air on the ink filament upon extrusion. As the air flow speed on the surface of the extruded ink filament is increased, the solvent evaporation is expedited and the solidification time of the extruded ink filament is shortened. The airflow setup, the influence of the airflow on the solvent evaporation speed and the printing quality are shown in FIGS. 18 and 19. The solvent evaporation speed was investigated by weighing the extruded ink filaments printed with and without the airflow. Half of the solvent content (acetic acid and deionized water) evaporated within 2.8 minutes after extrusion without airflow. On the other hand, it took only 1.1 minutes assisted by the airflow, which improved the solvent evaporation speed by 255%—see FIG. 18. Due to the short solidification time, the ink filament did not sag, flow or merge with neighboring filaments—see FIG. 19. By comparing the printing process and the as-printed scaffolds, it is clearly observed that airflow assistance provided more reliable results. The structure printed without airflow, however, had merged filaments and lost its shape. To ensure the printing quality, all the structures in this Example were printed with a tapered nozzle (tip inner diameter: 250 µm) at a linear printing speed of 7 mm/s with the airflow assist.

Figure 21:
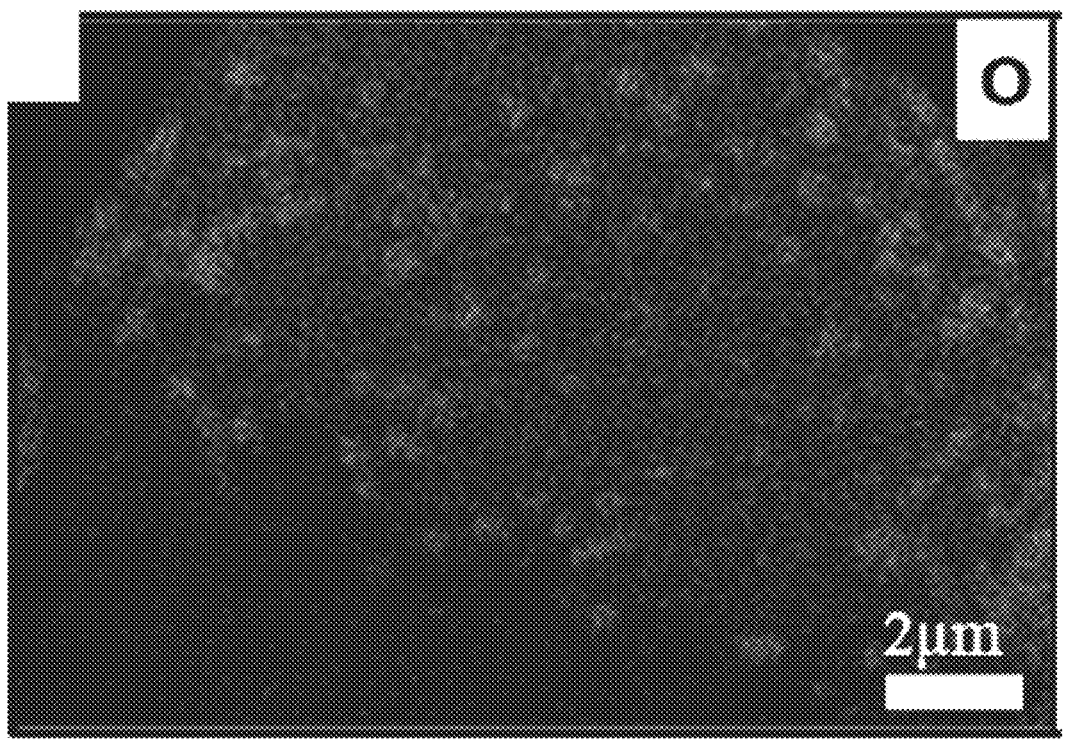
FIG. 21 shows Energy Dispersive X-ray Spectroscopy (EDS) results of oxygen on a signal HAS particle of the dried as-printed CHI scaffold.
Figure 22:
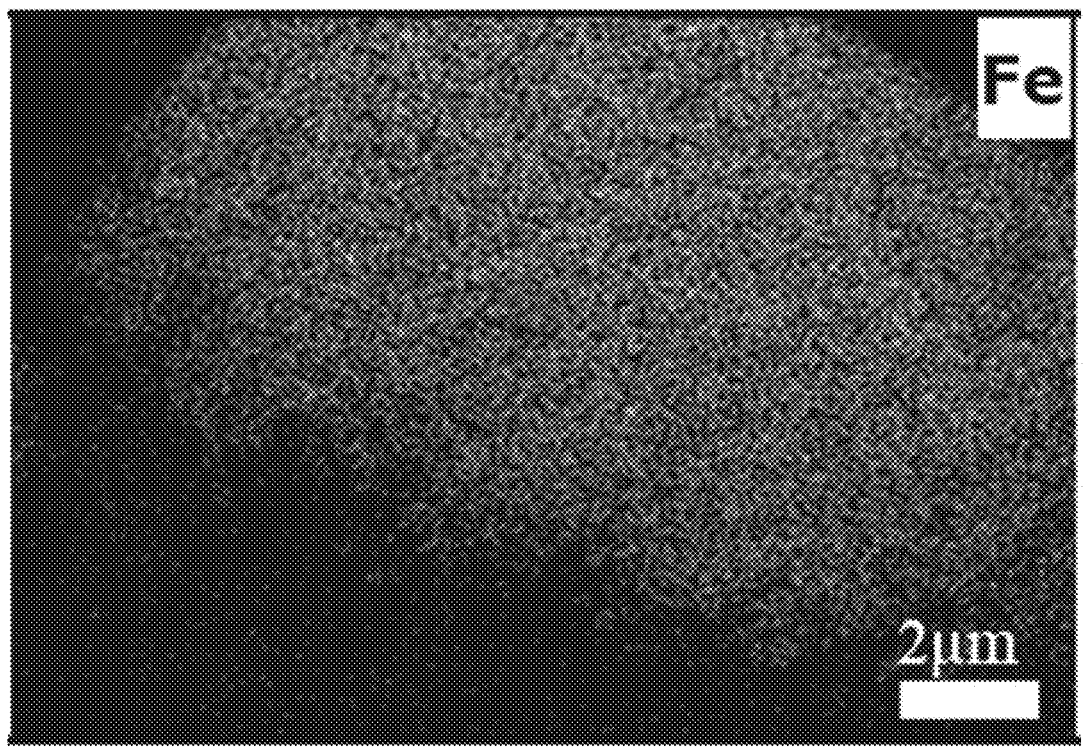
FIG. 22 shows EDS results of iron on a signal HAS particle of the dried as-printed CHI scaffold.
Figure 23:
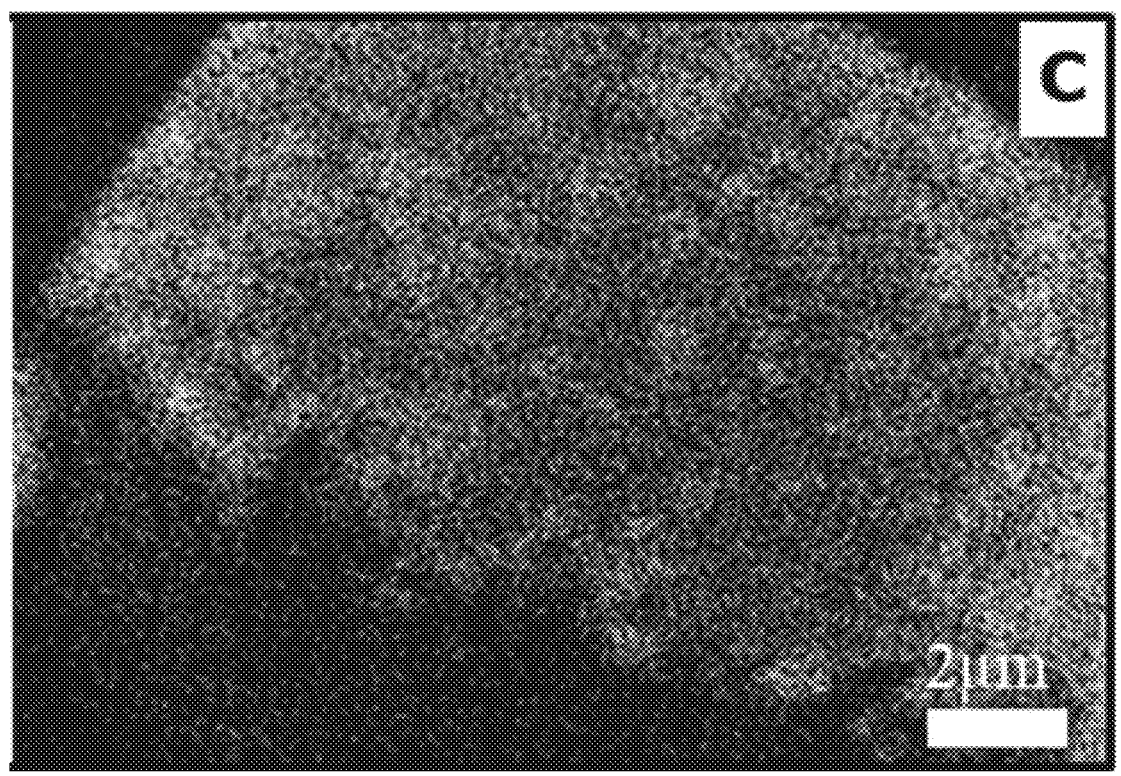
FIG. 23 shows EDS results of carbon on a signal HAS particle of the dried as-printed CHI scaffold.

When printing the samples, it was difficult to release the sample from the substrate. To ease release, a thin layer of Petroleum jelly was applied on the substrate prior to printing. Once the printing was completed, the sample along with the substrate was placed in a vacuum oven at 50° C. for 2 h. The petroleum jelly melted and acted as a lubricant between the sample and the substrate. The sample could be easily released from the substrate. After drying in the vacuum oven, the diameter of the filament was around 220 µm, which is 88% of the nozzle inner diameter. FIG. 20 shows scanning electron microscope (SEM) images of a dried as-printed scaffold, including the structure, the filament and the HAS micro particles. The images of the as-printed samples demonstrate the versatility of our 3D printing method to fabricate well-organized structures from the metallic ink. The structure was qualitatively ordered. The filaments from neighboring layers were perpendicularly stacked without shape deformation. As the metal was is up to 94.1 vol. % in the dried as-printed sample, the filament was mainly comprised of HAS powders covered and bound by a thin layer of chitosan. There were small fragments (≈0.5 µm) randomly distributed on the surface of the HAS particle. The HAS particles retained their spherical shape without visible chemical corrosion-induced pits on the surface. To investigate the composition of the small fragments, an energy dispersive X-ray spectroscopy analysis (EDS) was carried out on the HAS particle (FIGS. 21 to 23, oxygen, iron, and carbon, respectively). The small fragments on the HAS particle surface contained more carbon and oxygen compared to the rest of the HAS particle surface. This suggests that they were aggregates of chitosan precipitated after the solvent evaporated. As a result, although the metallic ink contains metal powders and weak acid, it is chemically stable at room conditions.

The 3D structures printed from the metallic ink are reusable. Any incorrectly printed structures and scrap materials can be dissolved in the acid solvent in a proportion according to the ink recipe (Table 4) and then mixed using the ball mill. After homogenization, the recycled metallic ink can be reused for 3D printing. In addition, the manufacturing efficiency can be improved by using multiple print-heads (including a pressure dispensing system, syringe holder, syringe and micro nozzle). By adjusting the nozzle tips to the same height, multiple copies of the structures can be printed at the same time. If different inks are loaded in different syringe, multiple copies of the structures made in different materials can be printed at one time.

Figure 24:
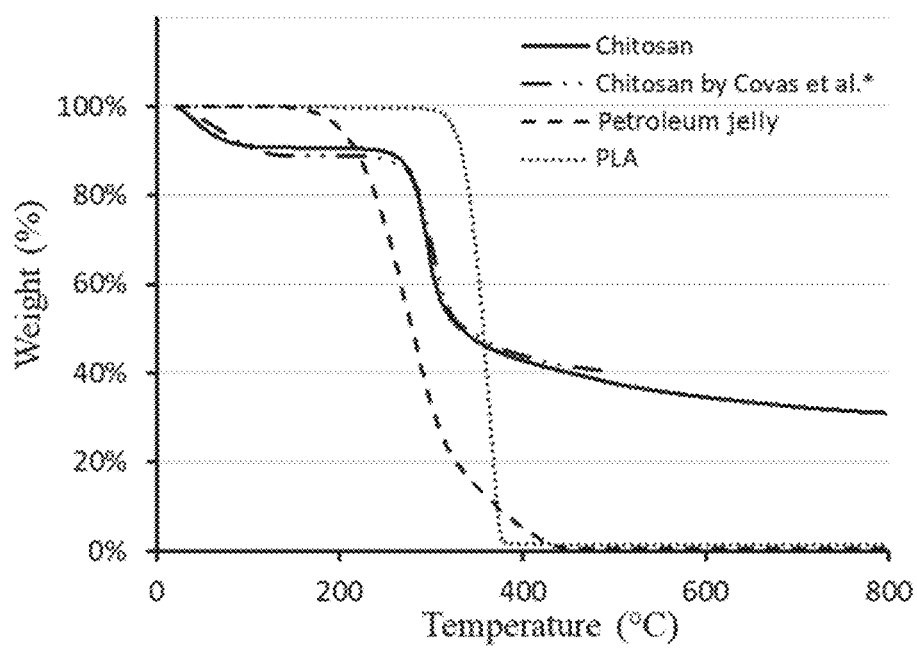
FIG. 24 shows the TGA results of chitosan, PLA and petroleum jelly in nitrogen up to 800° C.
Figure 25:
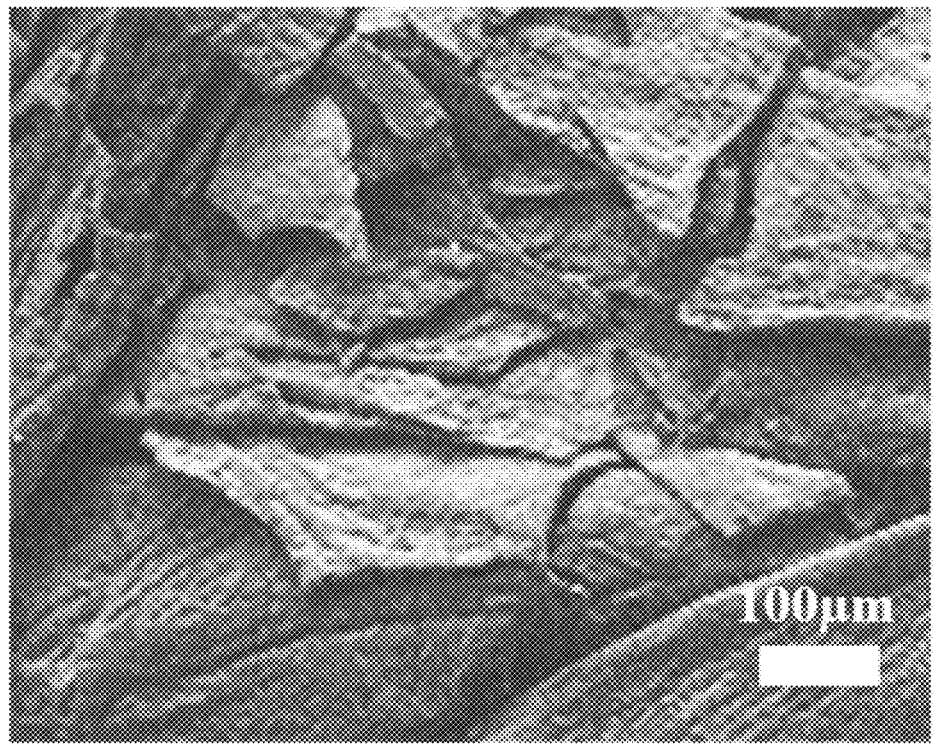
FIG. 25 is a SEM image of the chitosan thermal decomposition residues.
Figure 26:
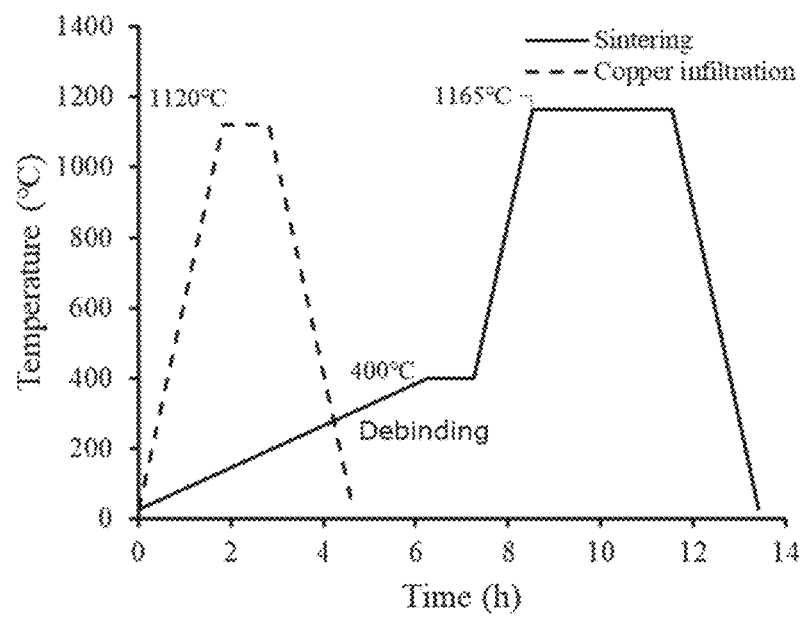
FIG. 26 shows the temperature profiles of the thermal treatment processes.
Figure 27:
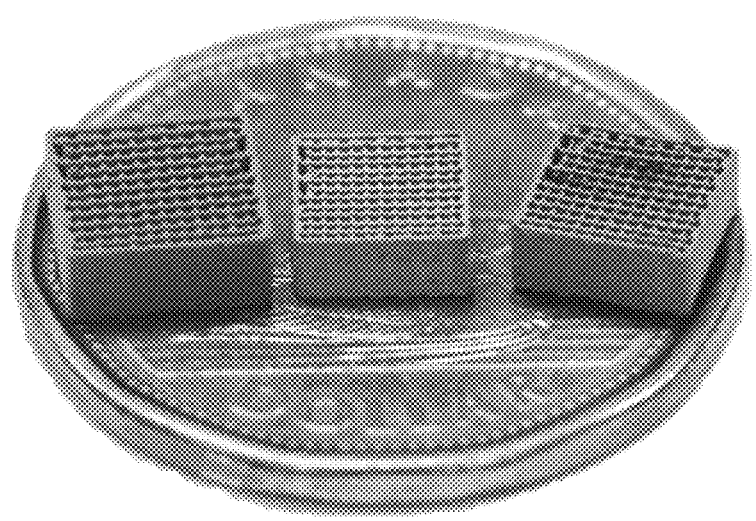
FIG. 27 is shows, from left to right, the as-printed, sintered and copper infiltrated CHI scaffolds on a Canadian dollar.

To determine the temperature profile of the thermal treatments, the decomposition temperatures of the polymer binders were investigated by conducting thermal gravity analysis (TGA) in a nitrogen atmosphere (FIG. 24). The commonly used polymer binder, PLA, degraded below 400° C. Chitosan lost 10% of its weight under 100° C. due to loss of moisture. It partially decomposed at around 300° C. where the weight dropped by another 40%. Then, the decomposition speed slowed down and around 30% of the weight was left until 800° C. This coincides with the results reported by the previous researcher—see C. Peniche-Covas, W. Argüelles-Monal, J. S. Román, A kinetic study of the thermal degradation of chitosan and a mercaptan derivative of chitosan, Polym. Degrad. Stab., 1993, 39, 21-28, incorporated herein by reference. The residues (seen in FIG. 25) contained mainly carbon according to the elemental test result. The carbon could diffuse into the HAS powders during the thermal treatments, hardening the sintered steel—see E. P. DeGarmo, J. T. Black, R. A. Kohser, B. E. Klamecki, Materials and process in manufacturing. Prentice Hall, 1997, incorporated herein by reference. The petroleum jelly, which acted as a releasing agent, completely decomposed at around 400° C. FIG. 26 shows the sintering temperature profile which consists of a polymer debinding plateau at 400° C. for 1 h and a metal sintering plateau at 1165° C. for 3 h. An optional copper infiltration can be conducted on the sintered structures at 1120° C. for 1 h. FIG. 27 shows the as-printed, sintered and copper infiltrated scaffolds thermally treated following this temperature profile.

Figure 28:
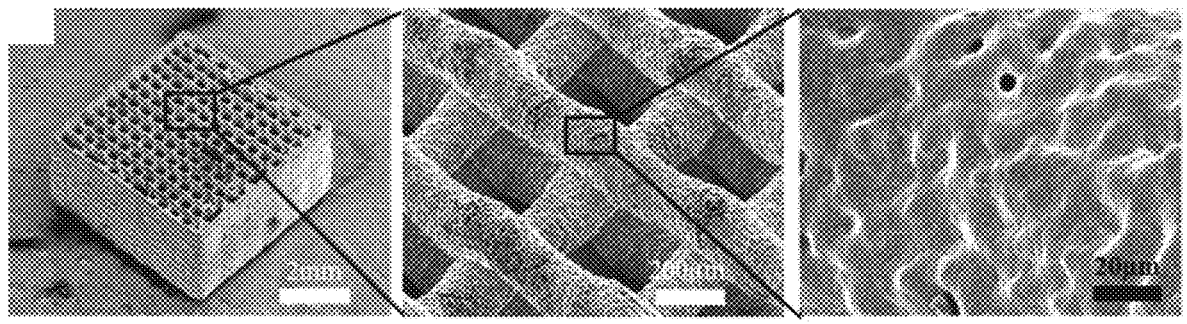
FIG. 28 shows SEM images of a sintered CHI scaffold at increasing magnifications from left to right.
Figure 29:
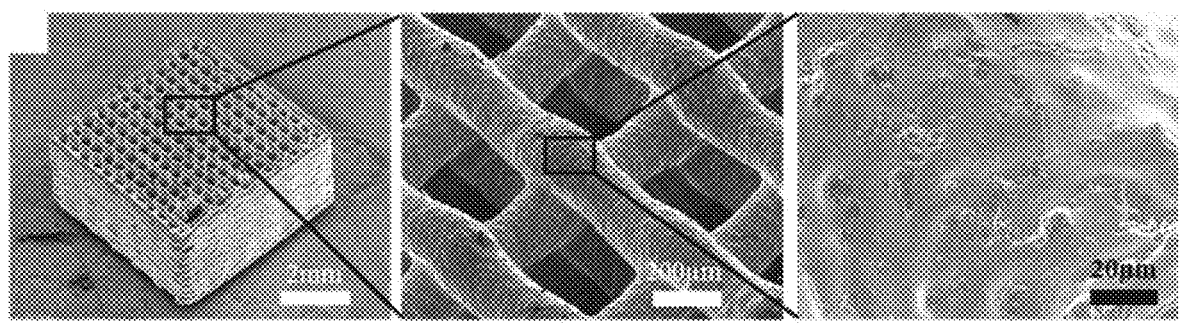
FIG. 29 shows SEM images of a copper infiltrated CHI scaffold at increasing magnifications from left to right.
Figure 30:
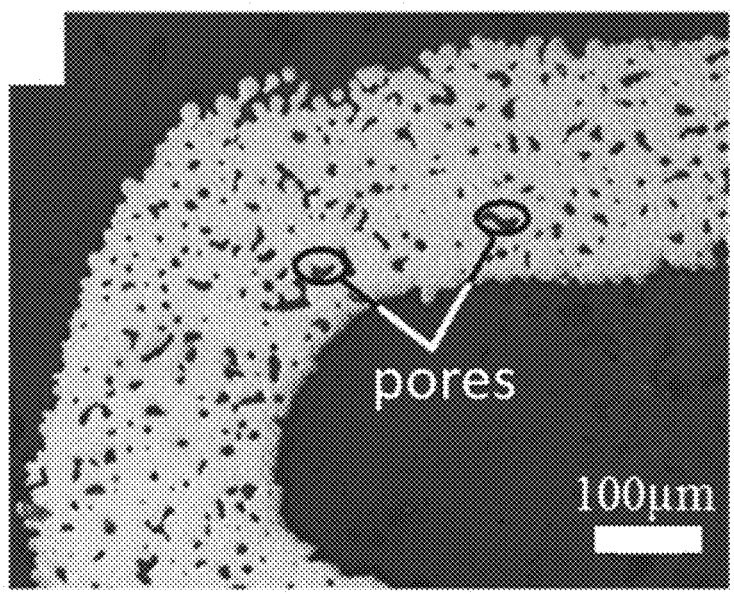
FIG. 30 shows a polished filament cross section of a sintered CHI sample.
Figure 31:
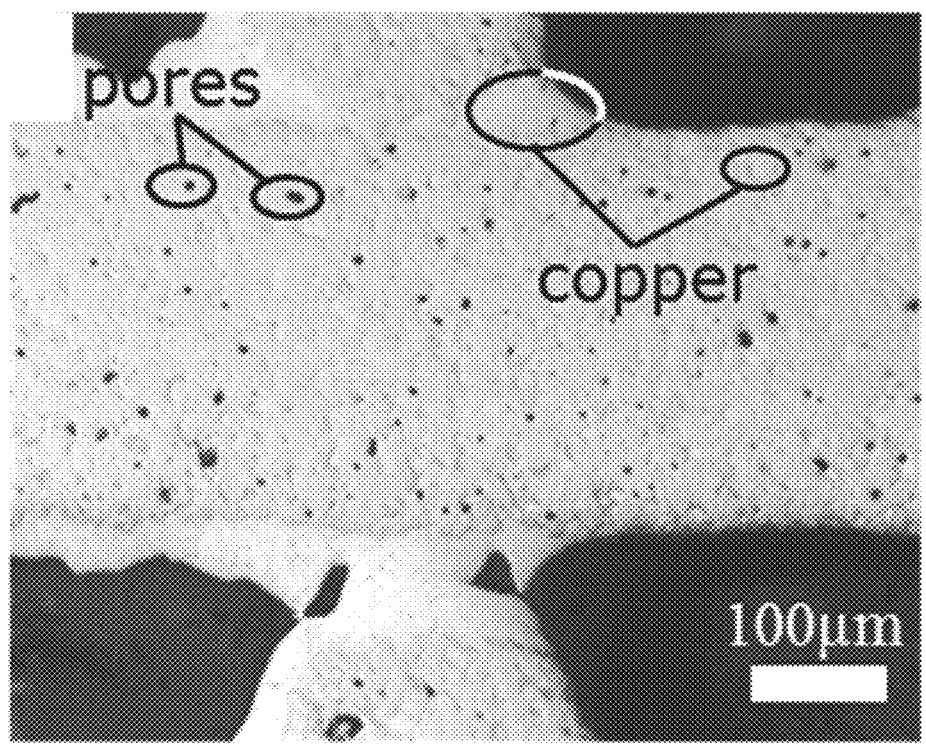
FIG. 31 shows a polished filament cross section of a copper infiltrated CHI sample.

To determine the performance of chitosan/acetic acid as a polymer binder solution, the properties of sintered and copper infiltrated samples (printed from chitosan/acetic acid based metallic ink, hereafter referred to CHI) and samples (printed from PLA/DCM based metallic ink, hereafter referred to PLA) are compared. The comparison is based on the optimized ink recipes (CHI and PLA) for best printing quality. The results of ink filament morphology, size reduction, filament porosity and electrical properties are shown in FIGS. 28-34. The SEM images of sintered and copper infiltrated scaffolds (CHI) reveal the finer details of the structure, filaments and fused metal powders (FIGS. 28 and 29). Both scaffolds keep the shape from the as-printed scaffold (FIG. 20, top left) without distortion and the filaments are aligned uniformly and well organized. The individual filament has cylindrical shape. No obvious deformation is observed even for spanning structure. In FIGS. 30 and 31, the filaments of the copper infiltrated scaffold show better bonding between neighboring layers than those from sintered ones. It is observed that the melted copper only fills the pores inside the filament instead of spacing between deposited filaments. By properly tailoring the amount of copper, the copper infiltration can be applied to enhance the fine porous structure—see Example 1.

Figure 32:
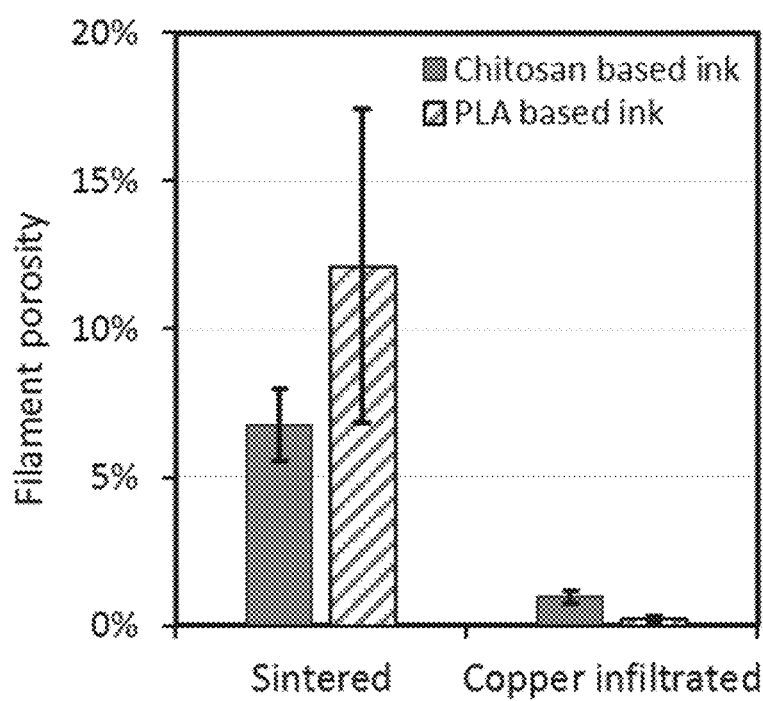
FIG. 32 shows the filament porosity of sintered and copper infiltrated scaffolds printed from a chitosan based metallic ink and a PLA based metallic ink from Example 1.

The metal powders fused together through the sintering, but there were some pores left in the sintered filaments due to the removal of the polymer binder and sintering itself. The pores can be filled by melted copper and the filament surface becomes smoother. The filament porosity was studied by analyzing the optical microscope images of the cross section of the sintered and copper infiltrated scaffolds (FIGS. 30 and 31). Pores of similar sizes were uniformly scattered inside the sintered filament. In the copper infiltrated scaffold, melted copper filled most of the pores in the filaments and the gap between contacting filaments. The porosity significantly decreased after copper infiltration. The filament porosities of sintered and copper infiltrated samples are 6.8%±1.2% and 1.0%±0.2% respectively (FIG. 32 and Table 5). Compared to the structures (PLA) in Example 1, the sintered scaffold (CHI) has less porosity, while the copper infiltrated one exhibits slightly higher porosity. The reason is that the polymer content of the as-printed samples (CHI) (6 vol. %) is much lower than that of the as-printed samples (PLA) (25 vol. %—see Example 1). After polymer decomposition, there are less pores resulting from polymer removal. The sintered filament (CHI) is less porous after sintering in the same conditions and duration. The lower porosity hinders the melted copper from infiltrating into the sintered filaments in the subsequent copper infiltration. This resulted in a higher porosity than in the structure printed from PLA based ink, but the porosity was still under 1%.

TABLE 5

Filament porosity of the sintered and copper infiltrated samples printed from chitosan-based ink and PLA-based ink from Example 1

|  | Sintered | Copper infiltrated |
| --- | --- | --- |
| CHI based ink | 6.8% ± 1.2% | 1.0% ± 0.2% |
| PLA based ink* | 12.1% ± 5.3% | 0.2% ± 0.1% |

Figure 33:
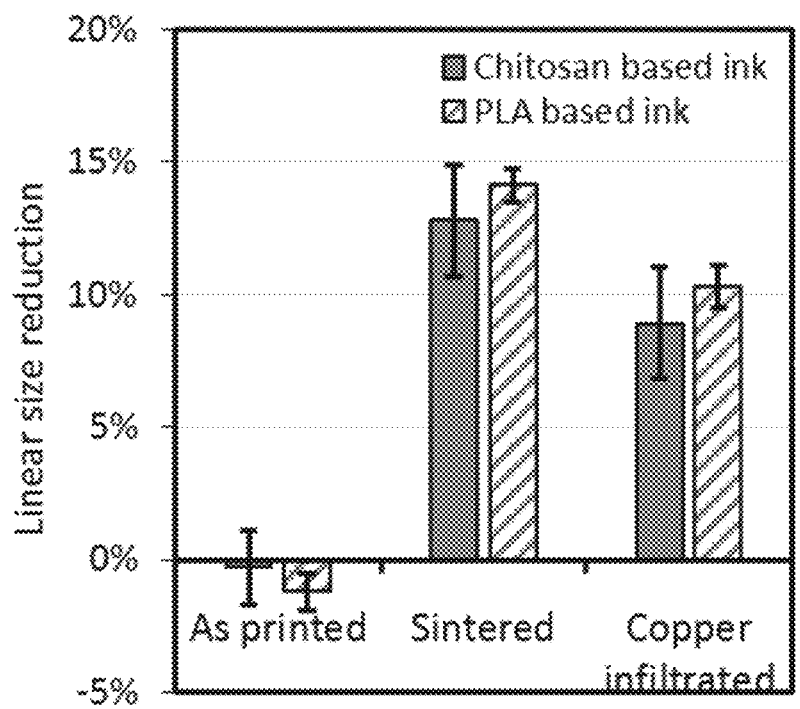
FIG. 33 shows the linear size reduction of sintered and copper infiltrated scaffolds printed from a chitosan based metallic ink and a PLA based metallic ink from Example 1.

FIG. 33 shows the linear size reduction of the as-printed, sintered and copper infiltrated samples (CHI and PLA) compared to the designed size. The size changes are caused by the expansion upon extrusion, solvent evaporation, polymer decomposition, sintering and copper infiltration. Table 6 summarizes the linear size reduction values. The extruded ink filament expands because of the pressure drop and then shrinks due to the solvent evaporation. The dried as-printed sample had similar size as designed (0.3%±1.4% linear expansion). After polymer decomposition and metal sintering, the sintered structure exhibited a linear reduction of 12.8%±2.1% compared to the designed size. The copper infiltrated sample had a sintering duration for 1 h instead of 3-6 h for the sintered samples. More pores were left to allow the melted copper to easily infiltrate the sintered filament. As a result, the copper infiltrated sample exhibited less size reduction (8.9%±2.1% linear reduction) than the sintered one. The samples (CHI) showed less size change compared to the samples (PLA) in every stage, as they contained less polymer contents.

TABLE 6

Compared to the designed size, linear shrinkage of the as-printed, sintered and copper infiltrated samples printed from CHI-based ink and PLA-based ink from Example 1

|  | As-printed | Sintered | Copper infiltrated |
| --- | --- | --- | --- |
| CHI based ink | −0.3% ± 1.4% | 12.8% ± 2.1% | 8.9% ± 2.1% |
| PLA based ink* | −1.2% ± 0.7% | 14.1% ± 0.6% | 10.3% ± 0.8% |

Figure 34:
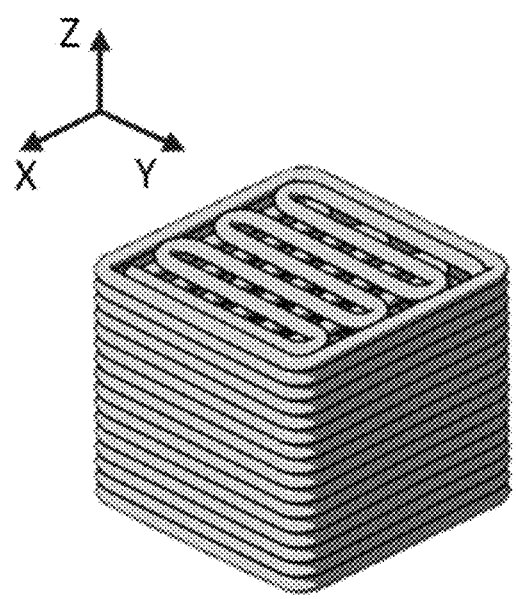
FIG. 34 is a schematic of a scaffold defining the three axes x, y, and z.
Figure 35:
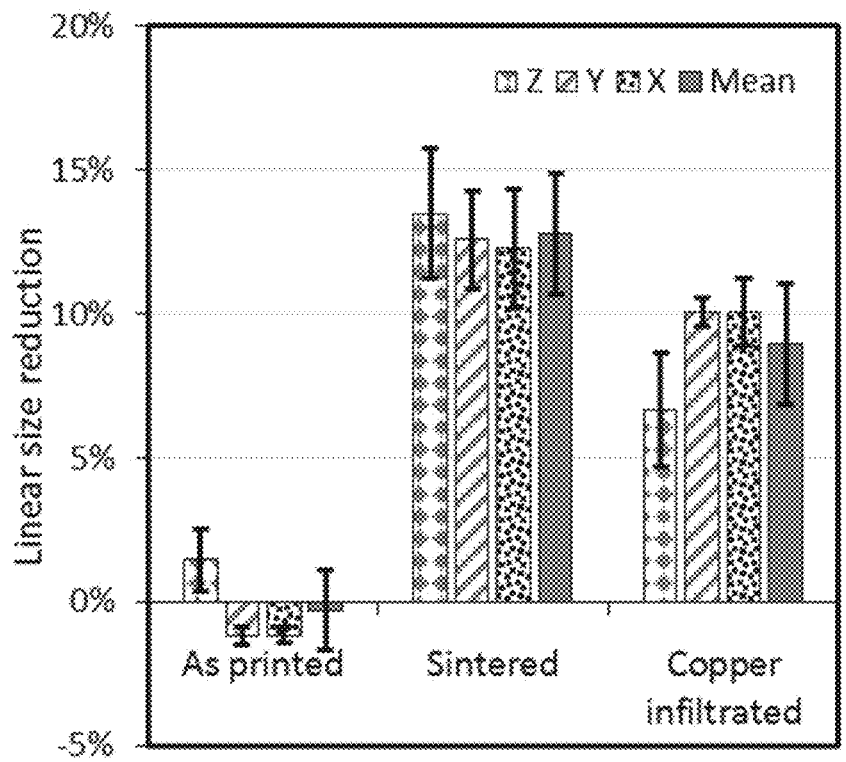
FIG. 35 shows the linear size reduction of the as-printed, sintered and copper infiltrated CHI samples compared to the designed size along the x, y, z axes and in average.

The size reduction in three dimensions was also studied, FIG. 34 is a schematic of the scaffold indicating the three axes x, y, and z. FIG. 35 shows linear size reduction of the as-printed, sintered and copper infiltrated samples compared to the designed size in x, y, z axis. These results indicate that the size reduction does not show significant differences along the directions.

Figure 36:
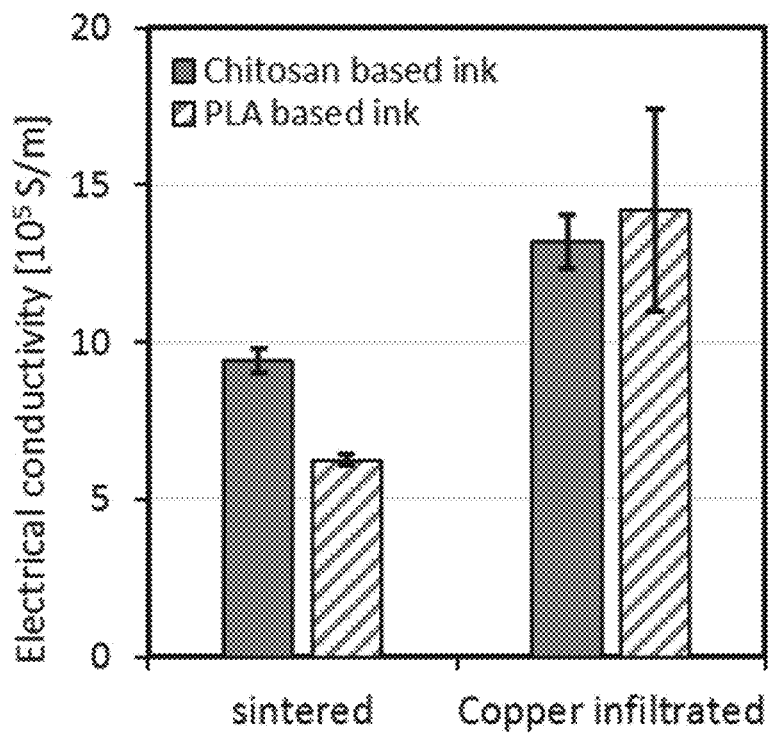
FIG. 36 shows the electrical conductivity of sintered and copper infiltrated scaffolds printed from a chitosan based metallic ink and a PLA based metallic ink.
Figure 37:
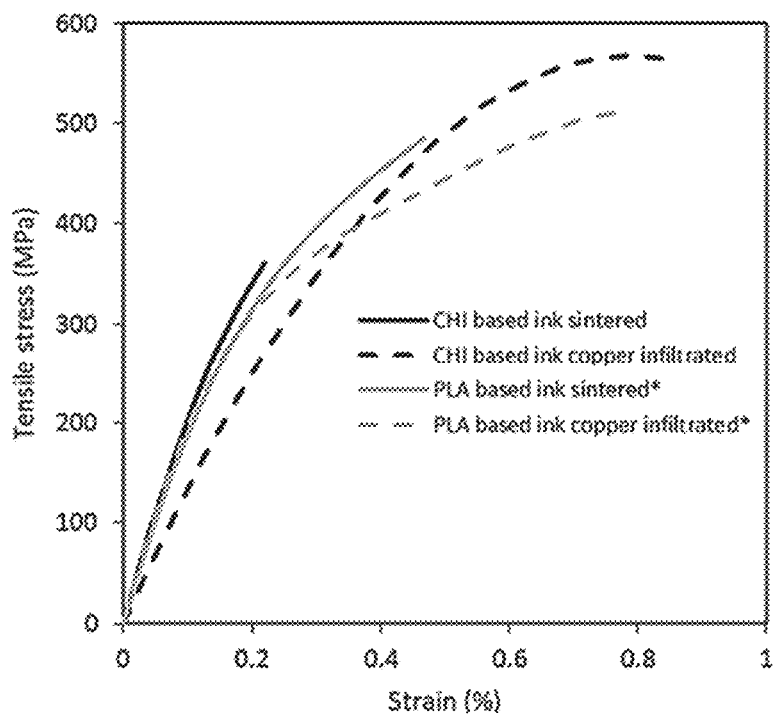
FIG. 37 shows the tensile stress versus strain curves for sintered and copper infiltrated tensile samples printed using a chitosan-based ink and a PLA based ink.
Figure 38:
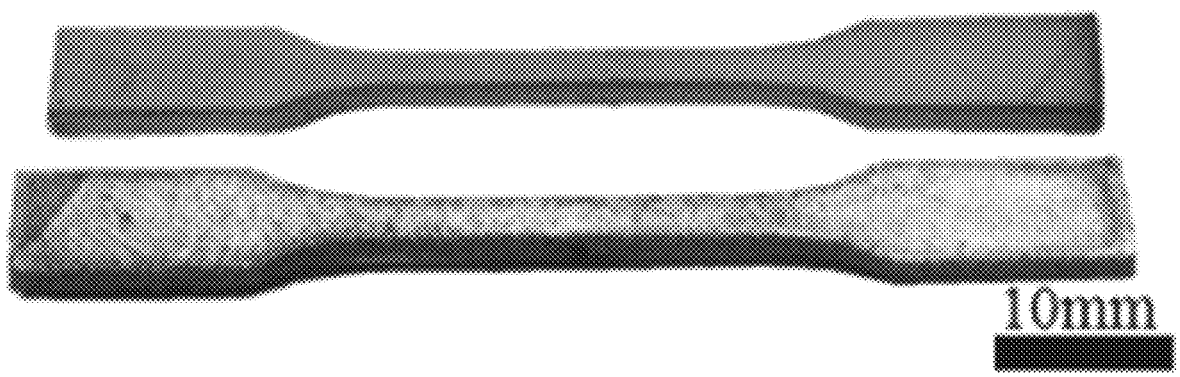
FIG. 38 is an optical image of the sintered (top) and copper infiltrated (bottom) tensile CHI samples.

The sintered and copper infiltrated samples (CHI) had electrical conductivities of $(9.4±0.4)×10^5$ S/m and $(1.3±0.9)×10^6$ S/m, respectively (FIG. 36 and Table 7). Compared to the samples (PLA), the sintered samples (CHI) were 51% more conductive, while the copper infiltrated samples (CHI) were 7% less conductive. In CHI ink, the polymer volume fraction was lower. As a result, the sintered sample (CHI) had denser structure resulting in a higher electrical conductivity. The copper infiltrated sample (CHI) contained less copper, as its low porosity hindered the copper infiltration. Since copper is more conductive than steel, the copper infiltrated structure (CHI) was slightly less conductive than the structure printed from PLA-based ink.

TABLE 7

Electrical conductivity of the sintered and copper infiltrated samples printed from chitosan-based ink and PLA-based ink of Example 1

| Electrical conductivity [S/m] | Sintered | Copper infiltrated |
|---|---|---|
| CHI based ink | $(9.4 \pm 0.4) \times 10^5$ | $(1.3 \pm 0.9) \times 10^6$ |
| PLA based ink* | $(6.2 \pm 0.2) \times 10^5$ | $(1.4 \pm 0.3) \times 10^6$ |

Tensile tests were conducted on the sintered and copper infiltrated tensile bars to investigate their mechanical properties. FIGS. 37 to 40 show representative tensile stress-strain curves, optical images of representative tensile bars and SEM images of the tensile fracture surfaces. The observed Young's modulus E, ultimate tensile strength (UTS) and elongation at breakage (%) are summarized in Table 8. The previous tensile test results of the samples printed from PLA-based ink (from Example 1) are also listed for comparison. As can be seen from FIG. 37, the E modulus of the sintered samples (CHI) was ~205 GPa, which was improved by 5% when compared with the samples printed from PLA-based ink. The UTS and elongation at break, however, are were by 32% and 60% respectively. The stiffness (E) was increased, while the ductility (UTS and elongation at break) was compromised. Compared to the sintered samples, the copper infiltrated samples (CHI) exhibited better UTS (522 MPa) and elongation at break (0.69%). The infiltrated copper improved the ductility of the sintered samples. As the copper infiltrated samples go through a shorter sintering duration (1 h), the E modulus (160 GPa) was lower than for the sintered samples. As the chitosan binder introduced extra carbon in the sintered metal structure, it hardened the structure. It is them more advantageous for low carbon content metal alloys, where it can improve the stiffness without compromising the ductility.

Figure 39:
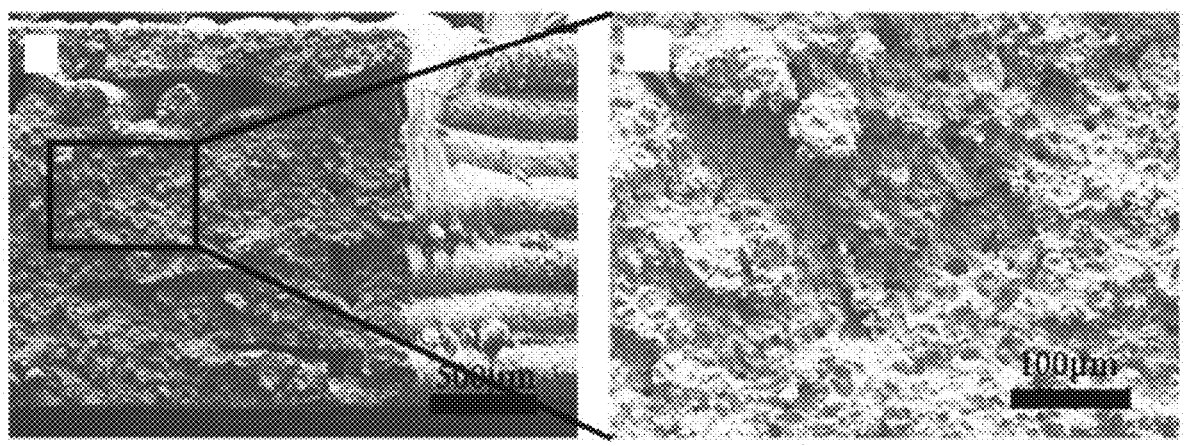
FIG. 39 shows SEM images of the tensile fracture surface of a sintered tensile bar at low and high magnification.
Figure 40:
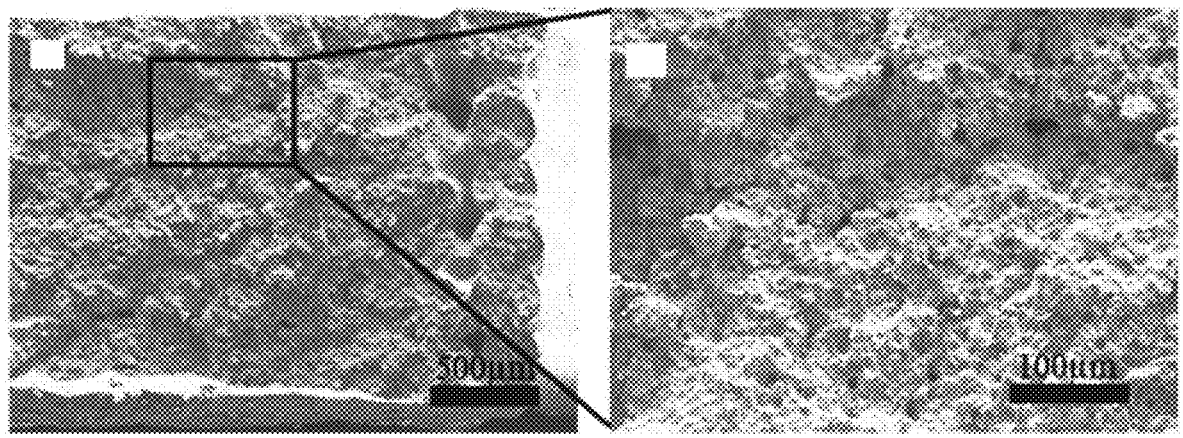
FIG. 40 shows SEM images of the tensile fracture surface of a copper infiltrated tensile bar at low and higher magnification.
Figure 41A:
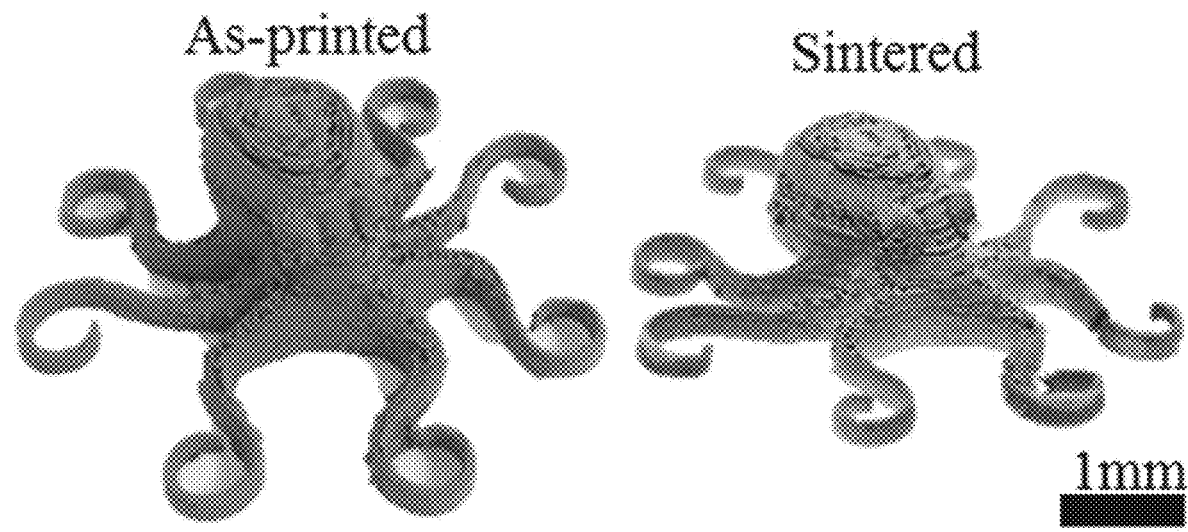
FIG. 41A) shows an as-printed and sintered octopus.
Figure 41B:
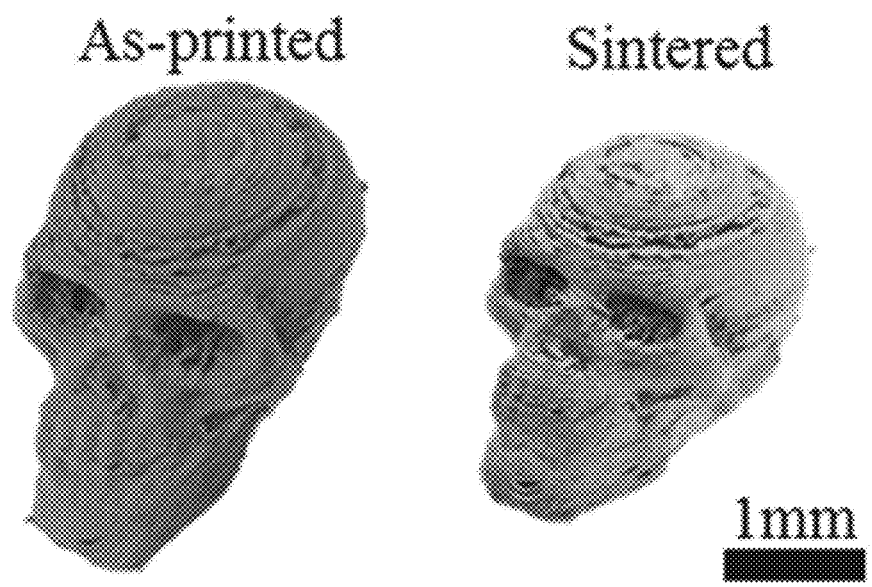
FIG. 41B) shows an as-printed and sintered skull.
Figure 42A:
FIG. 42A) shows a replica of Mayan pyramid as an example of a fully dense sintered structure.
Figure 42B:
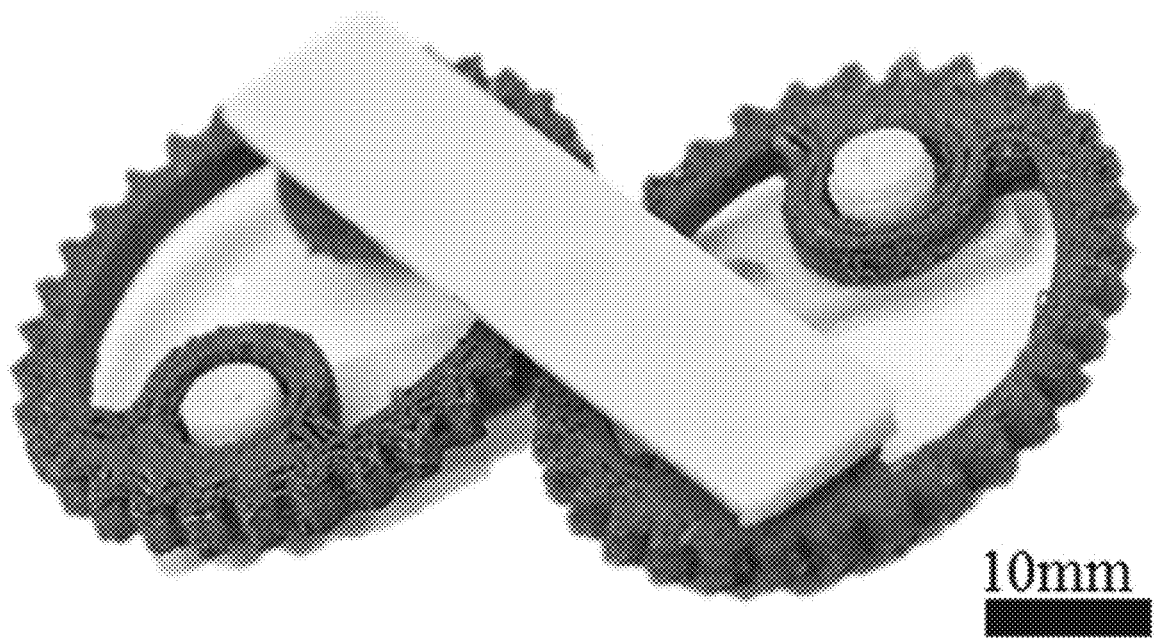
FIG. 42B) shows a pair of elliptical gears as another example of a fully dense sintered structure.

The tensile fracture surfaces of the sintered and copper infiltrated samples was studied for better understanding the mechanism (FIGS. 39-40). In the sintered sample (FIG. 39, left), most of the filaments from the same and different layers merged together, although some tiny pores were left in the structure. The copper infiltrated sample (FIG. 40, left) had a denser structure. The high magnification SEM images (FIGS. 39 and 40, right) show the details of the tensile fracture surface. All the metal powders fused and merged together. No individual metal particle was visible under SEM. The structure was a single entity with a few tiny pores.

TABLE 8

Tensile test results of the sintered and copper infiltrated samples printed from CHI-based ink and PLA-based ink of Example 1

| | Young's modulus (GPa) | Ultimate tensile stress (MPa) | Elongation at break (%) |
|---|---|---|---|
| CHI based ink sintered | 205 ± 22 | 329 ± 35 | 0.19 ± 0.03 |
| CHI based ink copper infiltrated | 160 ± 29 | 522 ± 83 | 0.69 ± 0.13 |
| PLA based ink sintered* | 196 ± 16 | 485 ± 70 | 0.47 ± 0.06 |
| PLA based ink copper infiltrated* | 195 ± 16 | 511 ± 57 | 0.77 ± 0.07 |

Figure 43:
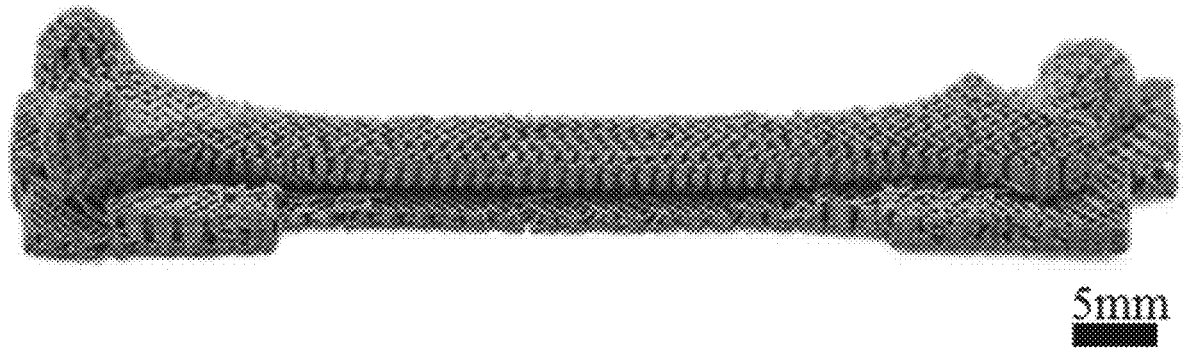
FIG. 43 shows a porous femur bone with a designed porosity of 50%.
Figure 44:
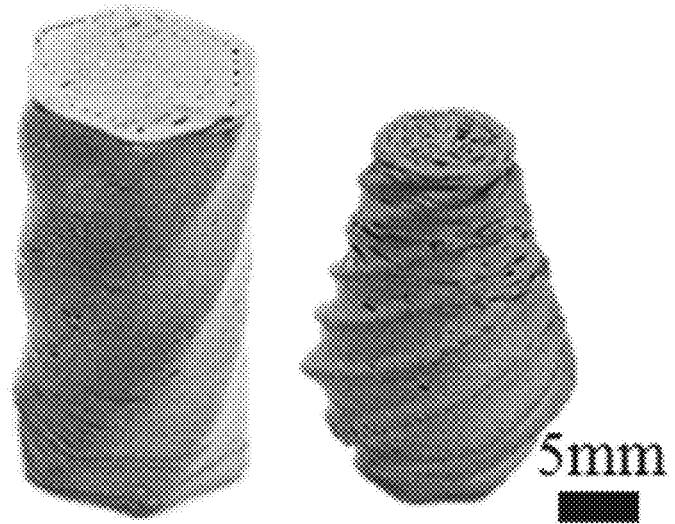
FIG. 44 shows twisted vases with a porous infill and a solid surface layer.

FIGS. 41 to 44 show various 3D metallic structures fabricated. As-printed and sintered 3D structures are shown in FIGS. 41A) and B). Relatively complex structures, such as the octopus and skull, could be easily printed and maintained their fine features after sintering in spite of a size reduction. The size reduction appears to be reproducible for a specific temperature profile and could be compensated by introducing an offset in the design stage. FIGS. 42A) and B) shows fully dense sintered structures: a replica of Mayan pyramid and a pair of elliptical gears. The steps along the side of the pyramid are clear and the corners are relatively sharp. The elliptical gears mesh well with each other without any post sintering surface treatments. Our extrusion-based approach was also compatible with the fabrication of porous metallic structures, which is not always possible with power-bed methods. A fine porous femur bone with a designed porosity of 50% was fabricated (see FIG. 43). The pores and tunnels in the structure were designed in the CAD model. The filling density could be tailored from 20% to 100% using the slicing software, achieving a porous structure with desired effective stiffness and weight. The porous structures were printed at room-temperature and could withstand subsequent sintering. 3D twisted vases with a porous infill and a solid surface layer are shown in FIG. 44. Their surface is smoother than porous structures and they weigh less than fully dense structures.

The structures without a flat bottom surface have to be printed with the assistance of supporting structures (e.g. the femur bone of FIG. 43).

Conclusion

We have developed an environment-friendly and reusable metallic ink for 3D printing of highly dense metallic structures. The metallic ink contains steel micro powders, a biodegradable polymer: chitosan, acetic acid and deionized water. It can be applied in a low-cost SC-3DP method to fabricate metallic structures and overcome the use of toxic solvent. The ink is reusable which improves the metallic materials utilization. An airflow system is used to counterbalance the shortcomings of SC-3DP methods by accelerating solvent evaporation and shortening the solidification duration of the extruded ink filament, reducing the sagging and the shape deformation. The morphology, size reduction, filament porosity, electrical conductivity and mechanical properties of the fabricated structures are characterized. Comparing with commonly used more toxic PLA/DCM based metallic ink, our ink produces 3D metal structures with less size reduction, lower filament porosity while demonstrating comparable electrical and mechanical performances. We envision that the chitosan polymer solution system could apply to diverse metallic materials, metal oxides and ceramics to obtain green and reusable 3D-printable inks. The structures built using this approach can be potentially used in biomedical and aerospace fields since geometrically complex shapes are porous configurations are often preferred. We foresee that artificial bone implants with fine and uniform pores, as well as complex 3D porous aerospace structures featuring light weight and high mechanical performance can be fabricated using this ink in a very economical fashion.

The scope of the claims should not be limited by the preferred embodiments set forth in the examples, but should be given the broadest interpretation consistent with the description as a whole.

REFERENCES

The present description refers to a number of documents, the content of which is herein incorporated by reference in their entirety. These documents include, but are not limited to, the following:

M. Elahinia, N. S. Moghaddam, M. T. Andani, A. Amerinatanzi, B. A. Bimber, R. F. Hamilton, *Prog. Mater. Sci.*, 2016, 83, 630-663.

D. Hong, D. T. Chou, O. I. Velikokhatnyi, A. Roy, B. Lee, I. Swink, I. Issaev, H. A. Kuhn, P. N. Kumta, *Acta Biomater.*, 2016, 45, 375-386.

S. Dadbakhsh, M. Speirs, H. J. Van, J. P. Kruth, *MRS Bull.*, 2016, 41(10), 765-774.

J. Hu, M. F. Yu, *Science*, 2010, 329(5989), 313-316.

C. Ladd, J. H. So, J. Muth, M. D. Dickey, *Adv Mater*, 2013, 25(36), 5081-5085.

Y. S. Rim, S. H. Bae, H. Chen, N. De Marco, Y. Yang, *Adv Mater*, 2016, DOI: 10.1002/adma.201505118

B. Y. Ahn, E. B. Duoss, M. J. Motala, X. Guo, S. I. Park, Y. Xiong, J. Yoon, R. G. Nuzzo, J. A. Rogers, J. A. Lewis, *Science*, 2009, 323(5921), 1590-1593.

J. Lessing, A. C. Glavan, S. B. Walker, C. Keplinger, J. A. Lewis, G. M. Whitesides, *Adv. Mater.*, 2014, 26(27), 4677-4682.

M. G. Mohammed, R. Kramer, *Adv. Mater.*, 2017, 29(19), DOI: 10.1002/adma.201604965

L. Thijs, K. Kempen, J. P. Kruth, J. Van Humbeeck, *Acta Mater.*, 2013, 61(5), 1809-1819.

S. Hong, J. Yeo, G. Kim, D. Kim, H. Lee, J. Kwon, H. Lee, P. Lee, S. H. Ko, *ACS Nano*, 2013, 7(6), 5024-5031.

D. D. Gu, W. Meiners, K. Wissenbach, R. Poprawe, *Int. Mater. Rev.*, 2012, 57(3), 133-164.

L. Thijs, F. Verhaeghe, T. Craeghs, J. Van Humbeeck, J. P. Kruth, *Acta Mater.*, 2010, 58(9), 3303-3312.

D. Gu, Y. C. Hagedorn, W. Meiners, G. Meng, R. J. S. Batista, K. Wissenbach, R. Poprawe, *Acta Mater.*, 2012, 60(9), 3849-3860.

S. Van Bael, Y. C. Chai, S. Truscello, M. Moesen, G. Kerckhofs, H. Van Oosterwyck, J. P. Kruth, J. Schrooten, *Acta Biomater.*, 2012, 8(7), 2824-2834.

K. McAleal, Materials and applications for the SLS selective laser sintering process. *Proceedings of the 7th International Conference on Rapid Prototyping*, 1997, pp 23-33

V. Seyda, N. Kaufmann, C. Emmelmann, *Phys. Procedia*, 2012, 39, 425-431.

H. Gong, K. Rafi, H. Gu, G. J. Ram, T. Starr, B. Stucker, *Mater. Des.*, 2015, 86, 545-554.

E. O. T. Olakanmi, R. F. Cochrane, K. W. Dalgarno, *Mater. Sci.*, 2015, 74, 401-477.

J. A Lewis, G. M. Gratson, *Mater. Today*, 2004, 7(7), 32-39.

D. Therriault, S. R. White, J. A. Lewis, *Nat. Mater.*, 2003, 2(4), 265-271.

D. Therriault, R. F. Shepherd, S. R. White, J. A. Lewis, *Adv. Mater.*, 2005, 17(4), 395-399.

S. Z Guo, F. Gosselin, N. Guerin, A. M. Lanouette, M. C. Heuzey, D. Therriault, *Small*, 2013, 9(24), 4118-4122.

K. Chizari, M. A. Daoud, A. R. Ravindran, D. Therriault, *Small*, 2016, 12(44), 6076-6082.

S. Z. Guo, M. C. Heuzey, D. Therriault, *Langmuir*, 2014, 30(4), 1142-1150.

S. Bodkhe, G. Turcot, F. P. Gosselin, D. Therriault, *ACS App. Mater. Interfaces*, 2017, DOI: 10.1021/acsami.7b04095

G. Postiglione, G. Natale, G. Griffini, M. Levi, S. Turri, *Composites, Part A*, 2015, 76, 110-114.

B. G. Compton, J. A. Lewis, *Adv. Mater.*, 2014, 26(34), 5930-5935.

B. Y. Ahn, D. Shoji, C. J. Hansen, E. Hong, D. C. Dunand, J. A. Lewis, *Adv. Mater.*, 2010, 22(20), 2251-2254.

W. J. Hyun, S. Lim, B. Y. Ahn, J. A. Lewis, C. D. Frisbie, L. F. Francis, *ACS Appl. Mater. Interfaces*, 2015, 7(23), 12619-12624.

E. Hong, B. Y. Ahn, D. Shoji, J. A. Lewis, D. C. Dunand, *Adv. Eng. Mater.*, 2011, 13(12), 1122-1127.

M. A. Skylar-Scott, S. Gunasekaran, J. A. Lewis, Laser-assisted direct ink writing of planar and 3D metal architectures, *Proc. Natl. Acad. Sci.*, 2016, 113, 6137-6142.

L. L. Lebel, B. Aissa, M. A. E. Khakani, D. Therriault, *Adv. Mater.*, 2010, 22(5), 592-596.

I. W. Chen, X. H. Wang, *Nature*, 2000, 404(6774), 168-171.

P. Beaulieu, Ph.D Thesis, Polytechnique Montreal, 2012

K. I. Winey, R. A. Vaia, *MRS bull.*, 2007, 32(04), 314-322.

L. Francis, Aerial view of the Montreal's Olympic stadium, http://francislepine.photoshelter.com/image/I00005iyrD3WYZ28, (accessed May 2017)

D. Peckner, Handbook of stainless steels. 1977

J. R. Davis, K. M. Mills, S. R. Lampman, Metals handbook. Vol. 1. Properties and selection: Irons, steels, and high-performance alloys. *ASM International, Materials Park, Ohio 44073, USA*, 1990, 1063.

R. G. P. I. Molding, I. Pressing, Metal Powder Industries Federation, Princeton, N.J., 1990, 3-22.

M. M. Dewidar, K. A. Khalil, J. K. Lim, *Trans. Nonferrous Met. Soc. China*, 2007, 17(3), 468-473.

M. M. Dewidar, K. W. Dalgarno, C. S. Wright, *Proc Inst. Mech. Eng., Part B*, 2003, 217(12), 1651-1663.

K. Kempen, E. Yasa, L. Thijs, J. P. Kruth, J. Van Humbeeck, *Phys. Procedia*, 2011, 12, 255-263.

J. H. Martin, B. D. Yahata, J. M. Hundley, J. A. Mayer, T. A. Schaedler, T. M. Pollock, 3D printing of high-strength aluminium alloys, *Nature*, 2017, 549, 365-369.

X. Wang, S. Xu, S. Zhou, W. Xu, M. Leary, P. Choong, M. Qian, M. Brandt, Y. M. Xie, Topological design and additive manufacturing of porous metals for bone scaffolds and orthopaedic implants: a review, *Biomaterials*, 2016, 83, 127-141.

A. Basalah, Y. Shanjani, S. Esmaeili, E. Toyserkani, Characterizations of additive manufactured porous titanium implants, *J. Biomed. Mater. Res., Part B*, 2012, 100, 1970-1979.

R. Bernasconi, F. Cuneo, E. Carrara, G. Chatzipirpiridis, M. Hoop, X. Chen, B. J. Nelson, S. Pané, C. Credi, M. Levi, L. Magagnin, Hard-magnetic cell microscaffolds from electroless coated 3D printed architectures, *Mater. Horiz.*, 2018, 5, 699-707.

Y. S. Rim, S. H. Bae, H. Chen, N. D. Marco, Y. Yang, Recent progress in materials and devices toward printable and flexible sensors, *Adv. Mater.*, 2016, 28, 4415-4440.

B. M. Sánchez, Y. Gogotsi, Synthesis of Two-Dimensional Materials for Capacitive Energy Storage, *Adv. Mater.*, 2016, 28, 6104-6135.

A. E. Jakus, S. L. Taylor, N. R. Geisendorfer, D. C. Dunand, R. N. Shah, Metallic architectures from 3D-printed powder-based liquid inks, *Adv. Funct. Mater.*, 2015, 25, 6985-6995.

R. D. Farahani, M. Dubé, D. Therriault, Three-dimensional printing of multifunctional nanocomposites: manufacturing techniques and applications, *Adv. Mater.*, 2016, 28, 5794-5821.

H. Gong, K. Rafi, H. Gu, G. D. J. Ram, T. Starr, B. Stucker, Influence of defects on mechanical properties of Ti-6Al-4 V components produced by selective laser melting and electron beam melting, *Mater. Des.*, 2015, 86, 545-554.

E. O. Olakanmi, R. F. Cochrane, K. W. Dalgarno, A review on selective laser sintering/melting (SLS/SLM) of aluminium alloy powders: Processing, microstructure, and properties, *Prog. Mater. Sci.*, 2015, 74, 401-477.

R. Chou, J. Milligan, M. Paliwal, M. Brochu, Additive manufacturing of Al-12Si alloy via pulsed selective laser melting, *JOM,* 2015, 67, 590-596.

A. B. Yeop, D. Shoji, C. J. Hansen, E. Hong, D. C. Dunand, J. A. Lewis, Printed origami structures, *Adv. Mater.,* 2010, 22, 2251-2254.

E. Peng, X. Wei, T. S. Herng, U. Garbe, D. Yu, J. Ding, Ferrite-based soft and hard magnetic structures by extrusion free-forming, *RSC Adv.,* 2017, 7, 27128-27138.

Q. Wu, M. Maire, S. Lerouge, D. Therriault, M. C. Heuzey, 3D printing of microstructured and stretchable chitosan hydrogel for guided cell growth, *Adv. Biosyst.,* 2017, 1, 1700058.

C. Peniche-Covas, W. Argüelles-Monal, J. S. Roman, A kinetic study of the thermal degradation of chitosan and a mercaptan derivative of chitosan, *Polym. Degrad. Stab.,* 1993, 39, 21-28.

E. P. DeGarmo, J. T. Black, R. A. Kohser, B. E. Klamecki, Materials and process in manufacturing. Prentice Hall, 1997.

The invention claimed is:

1. A metallic ink for solvent-cast 3D printing, the ink comprising:
   a gel of chitosan in a volatile solvent, and
   heat-sinterable metallic particles dispersed in the gel,
   wherein the particles are present in a particles:polymer weight ratio of more than about 85:15.

2. The ink of claim 1, wherein the particles are present in a particles:polymer weight ratio of about 95:5 to about 99:1.

3. The ink of claim 1, wherein the heat-sinterable metallic particles are steel, cast iron, titanium, silver, copper, zinc, gold, platinum, aluminum, nickel, bronze, or brass particles.

4. The ink of claim 1, wherein the heat-sinterable metallic particles are steel particles.

5. The ink of claim 1, wherein the heat-sinterable metallic particles are microparticles.

6. The ink of claim 1, wherein the heat-sinterable metallic particles are spheroidal.

7. The ink of claim 1, comprising between about 10 and about 50 w/w % of the solvent (based on the total weight of the ink).

8. A method of manufacturing a solvent-cast metallic 3D printed material, the method comprising the steps of:
   a) providing the metallic ink for solvent-cast 3D printing of claim 1,
   b) using a 3D printer, extruding the ink through a nozzle into a controlled pattern;
   c) allowing solvent evaporation, thereby producing a printed material;
   d) removing the polymer from the printed material by heating the printed material to a polymer degradation temperature or above, thereby leaving the particles arranged into the controlled pattern; and
   e) heat-sintering the particles, thereby producing the solvent-cast metallic 3D printed material.

9. The method of claim 8, wherein step b) is carried out at about room temperature.

10. The method of claim 8, wherein step c) is partly or completely carried out at about room temperature.

11. The method of claim 8, wherein step c) is partly or completely carried out under a flow of air.

12. The method of claim 8, wherein steps d) and e) are performed in a single heat treatment comprising increasing the temperature to a sintering temperature and then holding the temperature at the sintering temperature.

13. The method of claim 12, wherein a heating rate up to a temperature T between:
   about the polymer degradation temperature and
   up to about 100° C. above the polymer degradation temperature,
is lower than a heating rate from the temperature T to the sintering temperature.

14. The method of claim 8, further comprising the step f) of partly or completely filling the pores created in-between the particles by the removal of the polymer in step d) with a second metal or alloy, the second metal or alloy having a melting point lower than the melting point of the metal or alloy constituting the particles.

15. The method of claim 14, wherein step f) comprises contacting part of the solvent-cast metallic 3D printed material with the second metal or alloy, the second metal or alloy being in the molten state, and allowing the second metal or alloy to diffuse by capillarity into the pores.

16. The method of claim 15, wherein the second metal or alloy is steel, cast iron, titanium, silver, copper, zinc, gold, platinum, aluminum, nickel, bronze, or brass.

17. The ink of claim 1, wherein the particles are present in a particles:polymer weight ratio between about 90:10 to about 99:1.

* * * * *